(12) United States Patent
Takahashi et al.

(10) Patent No.: US 12,022,361 B2
(45) Date of Patent: Jun. 25, 2024

(54) POSITION ESTIMATION SYSTEM, POSITION ESTIMATION DEVICE, AND POSITION ESTIMATION METHOD

(71) Applicant: Panasonic Intellectual Property Management Co., Ltd., Osaka (JP)

(72) Inventors: Hiroshi Takahashi, Kanagawa (JP); Mei Okamoto, Kanagawa (JP); Kazuma Nishiyasu, Osaka (JP); Naganori Shirakata, Kanagawa (JP); Junichi Morita, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 399 days.

(21) Appl. No.: 17/472,341

(22) Filed: Sep. 10, 2021

(65) Prior Publication Data
US 2021/0409909 A1    Dec. 30, 2021

Related U.S. Application Data

(63) Continuation of application No. PCT/JP2020/010896, filed on Mar. 12, 2020.

(30) Foreign Application Priority Data

Mar. 12, 2019 (JP) .................................. 2019-044763
Mar. 25, 2019 (JP) .................................. 2019-056719
Mar. 29, 2019 (JP) .................................. 2019-068607

(51) Int. Cl.
*H04W 4/029* (2018.01)
*H04B 17/318* (2015.01)
*H04W 4/33* (2018.01)

(52) U.S. Cl.
CPC .......... *H04W 4/029* (2018.02); *H04B 17/318* (2015.01); *H04W 4/33* (2018.02)

(58) Field of Classification Search
CPC ..... H04W 84/12; H04W 76/10; H04W 4/021; H04W 8/005; H04W 4/023; H04W 4/33
See application file for complete search history.

(56) References Cited

U.S. PATENT DOCUMENTS 10,659,919 B1 * 5/2020 Li ........................ H04L 61/5038
2013/0273938 A1   10/2013 Ng et al.
(Continued)

FOREIGN PATENT DOCUMENTS

| JP | 2011-004225 A | 1/2011 |
| JP | 2014509381 A | 4/2014 |

(Continued)

OTHER PUBLICATIONS

International Search Report, dated Jun. 16, 2020, for International Application No. PCT/JP2020/010896, 6 pages.

*Primary Examiner* — Kwasi Karikari
(74) *Attorney, Agent, or Firm* — Seed IP Law Group LLP

(57) ABSTRACT

This position estimation system comprises a first wireless node for forming a wireless area; second wireless nodes which move within the wireless area; a plurality of third wireless nodes which are provided within the wireless area; and a position estimation device which estimates the position of the second wireless nodes on the basis of information indicating wireless reception quality at the third wireless nodes and the second wireless nodes. The position estimation device determines, for each of section areas, and on the basis of information pertaining to time resource capacity for wireless communication directed towards second wireless nodes, section areas which collect, in place of the first wireless node, information containing wireless reception quality at the second wireless nodes, and transmits, to one of third wireless nodes provided in the determined section area, (Continued)

and instruction to collect wireless reception quality at second wireless nodes within said section area.

8 Claims, 56 Drawing Sheets

(56) References Cited

U.S. PATENT DOCUMENTS

| | | | |
|---|---|---|---|
| 2015/0351071 A1* | 12/2015 | Pandey | H04W 4/02 |
| | | | 455/456.1 |
| 2017/0234962 A1 | 8/2017 | Yang et al. | |
| 2017/0265037 A1* | 9/2017 | Sawada | H04W 64/003 |

FOREIGN PATENT DOCUMENTS

| | | |
|---|---|---|
| JP | 2016-200466 A | 12/2016 |
| JP | 2017-531169 A | 10/2017 |

* cited by examiner

3143

| DISTANCE (m) | RSS1 | | | |
|---|---|---|---|---|
| | −30dBm | −29dBm | ... | 0dBm |
| AREA 1 | 12.4 | 311.6 | | 0.2 |
| AREA 2 | 13.2 | 12.5 | | 0.3 |
| : | | | | |
| AREA N | 11.5 | 10.9 | | 0.2 |

| AREA | PRIORITY |
|---|---|
| 1 | 2, 3, 5, 4, 6 ... |
| 2 | 1, 3, 7, 4, 6 ... |
| 3 | 2, 5, 6, 4, 7 ... |
| 4 | 3, 7, 2, 1, 5 ... |
| ... | ... |
| N | 2, 3, 4, 6, 5 ... |

| AREA | PREFERRED POSITION ESTIMATION ACCURACY [m] | THRESHOLD |
|---|---|---|
| 1 | 1 | |
| 2 | 1 | |
| 3 | 2 | |
| 4 | 3 | |
| ... | ... | |
| N | 1 | |

| AREA | PREFERRED POSITION ESTIMATION ACCURACY [m] | THRESHOLD |
|---|---|---|
| 1 | 1 | 40 |
| 2 | 1 | 43 |
| 3 | 2 | 55 |
| 4 | 3 | 60 |
| ... | ... | ... |
| N | 1 | 10 |

FIG. 42B

REFERENCE STATIONS: ANCHORS 330-1, 330-3, 330-4, AND 330-6

POSITION ESTIMATION SYSTEM, POSITION ESTIMATION DEVICE, AND POSITION ESTIMATION METHOD

TECHNICAL FIELD

The present disclosure relates to a position estimation system, a position estimation apparatus, and a position estimation method.

BACKGROUND ART

An exemplary known communication system using radio communication is a system in which a radio terminal radio-connects to a radio access point connected to a communication network. When the radio terminal leaves a communication area of the radio access point in such a communication system, the radio terminal avoids disconnection by switching a connection destination to another radio access point (Patent Literature (hereinafter, referred to as "PTL") 1).

CITATION LIST

Patent Literature

PTL1
Japanese Patent Application Laid-Open No. 2011-4225
PTL2
Japanese Unexamined Patent Application Publication (Translation of PCT Application) No. 2017-531169
PTL 3
Japanese Patent Application Laid-Open No. 2016-200466

SUMMARY OF INVENTION

Technical Problem

One non-limiting and exemplary embodiment facilitates providing an improved position estimation system, position estimation apparatus, and position estimation method, for collecting reception quality information.

Solution to Problem

A position estimation system according to the present disclosure adopts a configuration including: a first radio node, which in operation, forms a radio area; one or more second radio nodes, which in operation, move within the radio area; a plurality of third radio nodes installed in the radio area; and a position estimation apparatus, which in operation, estimates positions of the one or more second radio nodes based on information that is collected by the first radio node and indicates radio reception quality at the one or more second radio nodes and the plurality of third radio nodes, wherein, the position estimation apparatus comprises: determination circuitry, which, in operation, determines a division area where information including the radio reception quality at the one or more second radio nodes is collected by a substitute for the first radio node, based on information on a time resource capacity for radio communication with the one or more second radio nodes in each of a plurality of the division areas into which the radio area is divided; and transmission circuitry, which, in operation, transmits, to any of the plurality of third radio nodes installed in the determined division area, an indication for collecting the radio reception quality at the one or more second radio nodes located in the determined division area.

A position estimation apparatus according to the present disclosure adopts a configuration including: determination circuitry, which, in operation, determines a division area where information including radio reception quality at one or more second radio nodes that move within a radio area is collected by a substitute for a first radio node that forms the radio area, based on information on a time resource capacity for radio communication with the one or more second radio nodes in each of a plurality of the division areas into which the radio area is divided; transmission circuitry, which, in operation, transmits, to at least one of a plurality of third radio nodes installed in the determined division area among the plurality of third radio nodes installed in the radio area, an indication for collecting the radio reception quality at the one or more second radio nodes located in the determined division area; and estimation circuitry, which, in operation, estimates positions of the one or more second radio nodes using information indicating the radio reception quality at the one or more second radio nodes, the information being collected by the at least one of the plurality of third radio nodes that has received the indication.

A position estimation method according to the present disclosure adopts a configuration including: determining a division area where information including radio reception quality at one or more second radio nodes that move within a radio area is collected by a substitute for a first radio node that forms the radio area, based on information on a time resource capacity for radio communication with the one or more second radio nodes in each of a plurality of the division areas into which the radio area is divided; transmitting, to at least one of a plurality of third radio nodes installed in the determined division area among the plurality of third radio nodes installed in the radio area, an indication for collecting the radio reception quality at the one or more second radio nodes located in the determined division area; and estimating positions of the one or more second radio nodes using information indicating the radio reception quality at the one or more second radio nodes, the information being collected by the at least one of the plurality of third radio nodes that has received the indication.

It should be noted that general or specific embodiments may be implemented as a system, an apparatus, a method, an integrated circuit, a computer program, a storage medium, or any selective combination thereof.

Advantageous Effects of Invention

According to a non-limiting embodiment of the present disclosure, it is possible to provide an improved position estimation system, position estimation apparatus, and position estimation method, for collecting reception quality information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 39 illustrates an exemplary RSSI-distance conversion table;

FIG. 40 illustrates an exemplary priority list;

FIG. 42A illustrates an exemplary threshold list according to Embodiment 3;

FIG. 42B illustrates another exemplary threshold list according to Embodiment 3;

DESCRIPTION OF EMBODIMENTS

In recent years, there has been a growing need for fine and individualized control of radio devices (access points) built into lighting fixtures installed on a ceiling of an office, for example, based on positions and states of employees working in the office.

In an office, for example, a plurality of radio communication areas are assigned to departments or functions respectively in some cases. The plurality of radio communication areas are partitioned by rooms sometimes, or assigned without physical boundaries on a single floor other times.

In some cases, there are a plurality of radio communication areas on a single floor without physical boundaries, a radio access point is provided for each of the radio communication areas, and a radio device that is connected to the radio access point for each area and built into a lighting fixture is provided. Such a case causes switching (handover) processing of connection destinations when packets are transmitted to or received from the radio devices that are connected to the different radio access points and built into the lighting fixtures or radio terminals (or mobile terminals) moving around the floor. That is, the larger the number of the radio terminals in the radio communication areas is, the larger the number of transmission packets of the radio access points is, because of transmission and reception of control packets for the switching processing of the connection destinations as well as control packets for estimating positions of the radio terminals. In a case where radio devices for the specified low power radio communication are built into the lighting fixtures installed in a relatively large space such as a single floor, the transmission time per time unit (e.g., one hour) is limited. Thus, the transmission time will be exhausted by performing control of the lighting fixtures and control for estimating the positions of the radio devices built into the lighting fixtures and the radio terminals, with a few radio access points.

The description hereinafter is based on the following case by way of example: a certain floor in an office or a shop is divided into two areas A1 and A2, and positions of mobile terminals carried by people moving in the office are estimated using radio devices built into lighting fixtures respectively installed on the ceilings of the plurality of areas. More specifically, the positions are estimated using Received Signal Strength Indicators (hereinafter, RSSIs) collected from the radio devices built into the lighting fixtures and the mobile terminals. The same applies to a case where the area is divided into three or more areas.

Figure 13A:
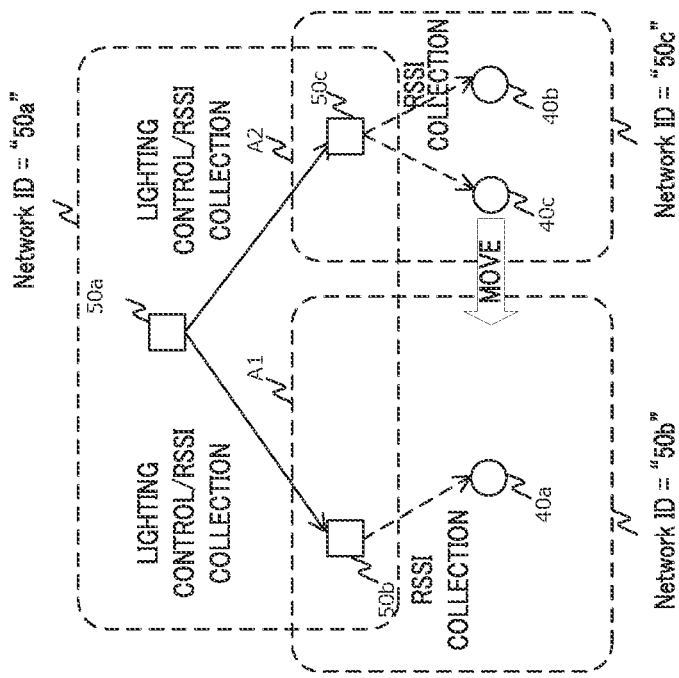
FIG. 13A illustrates a network topology and RSSI collection before a mobile terminal moves between areas.

FIG. 13A illustrates a network topology and RSSI collection before mobile terminal 40*c* moves between areas A1 and A2.

As illustrated in FIG. 13A, access points 50*b* and 50*c* with lighting functions are provided in each area. Mobile terminals 40*a*, 40*b*, and 40*c* in the areas are connected to access point 50*b* or 50*c* that manages a radio network of the area, and transmit and receive packets.

Access point 50*b* with the lighting function is defined with a network ID: "50*b*" for identifying the radio network, having area A1 as its communication area. As illustrated in FIG. 13A, mobile terminal 40*a* is located in area A1 and connected to access point 50*b*.

Likewise, access point 50*c* with the lighting function is defined with a network ID: "50*c*" for managing the radio network, having area A2 as its communication area. As illustrated in FIG. 13A, mobile terminals 40*b* and 40*c* are located in area A2 and connected to access point 50*c*.

Figure 13B:
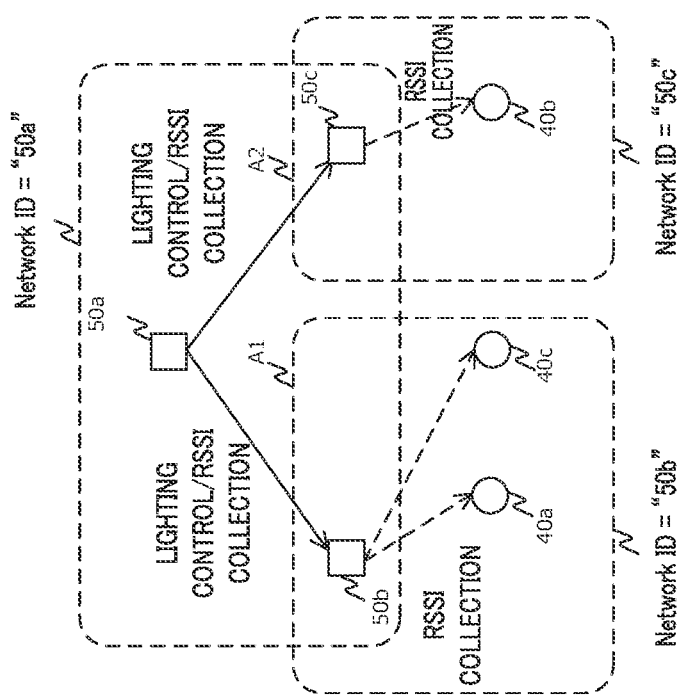
FIG. 13B illustrates a network topology and RSSI collection after the mobile terminal moves between areas.

FIG. 13B illustrates a network topology and RSSI collection after mobile terminal 40*c* moves between areas A1 and A2.

After moving from area A2 to area A1, mobile terminal 40*c* connects to access point 50*b* and is out of the communication area of access point 50*c*, as illustrated in FIG. 13B. It is thus required for access point 50*c* to perform connection processing (handover) to access point 50*b* when mobile terminal 40*c* moves.

That is, the movement of mobile terminal 40*c* to another area A1 causes a change of the network ID due to the handover processing. Additionally, mobile terminal 40*c* is limited to communicate with mobile terminal 40*a* or access point 50*b* in the same network ID. Thus, it is difficult to receive an RSSI request packet with another network ID.

In the network topologies illustrated in FIG. 13A and FIG. 13B, access point 50*a* for managing access points 50*b* and 50*c* is provided in some cases, in order to manage two areas A1 and A2. Access point 50*a* is sometimes referred to as an access point controller. In order for access point 50*a* to acquire information such as the RSSIs from mobile terminals 40*a*, 40*b*, and 40*c*, access point 50*b* or 50*c* may relay the information. A cumulative transmission time of access points 50*a*, 50*b*, and 50*c* increases with the relay processing.

Consideration of the above-mentioned reasons has led to a disclosure of a technique capable of preventing increase in the number of mobile terminals in each of areas A1 and A2 or preventing concentration of transmission opportunities of access point 50*c* and increase in the cumulative transmission time, and capable of eliminating the handover processing.

Hereinafter, embodiments of the present disclosure will be described in detail with reference to the accompanying drawings. Note that the embodiments to be described below are merely examples, and the present disclosure is not limited by the following embodiments.

Embodiment 1

The embodiment of the present disclosure will be described in detail with reference to the accompanying drawings. Note that, in the following, Embodiment 1 will be described by taking the RSSI as an example of information indicating radio reception quality (reception quality information) for simplicity. However, the reception quality information may be any information usable for position estimation, including a radio wave arrival direction or a radio wave arrival time, for example.

Figure 14A:
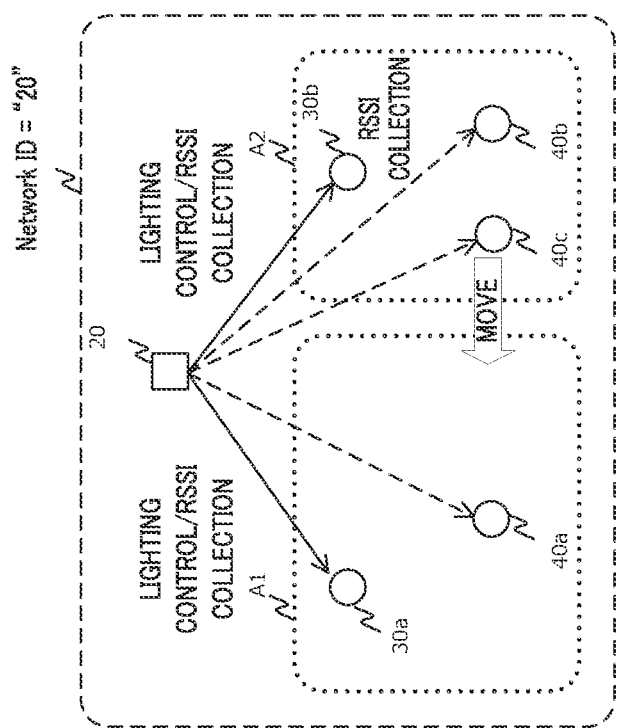
FIG. 14A illustrates a network topology and RSSI collection according to Embodiment 1.
Figure 14B:
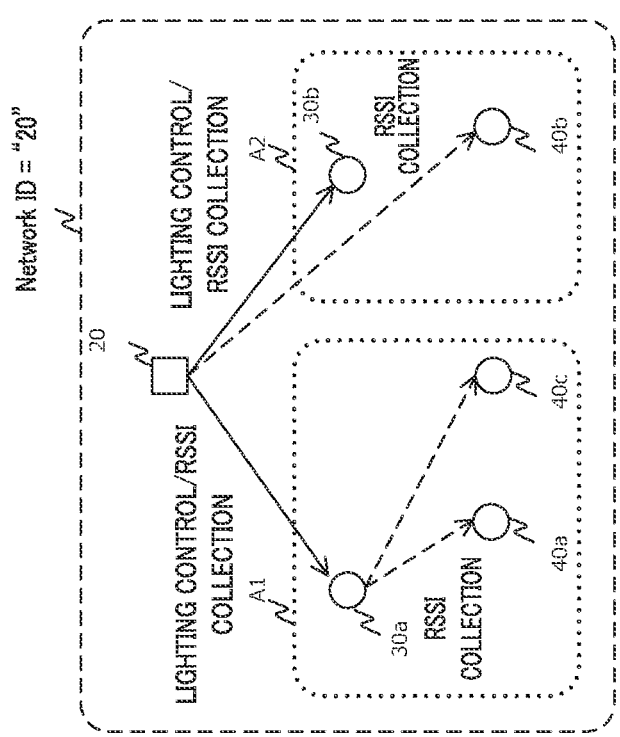
FIG. 14B illustrates another network topology and RSSI collection according to Embodiment 1.

FIG. 14A and FIG. 14B illustrate network topologies and RSSI collection according to Embodiment 1.

FIGS. 14A and 14B are different from FIGS. 13A and 13B, and access point 20 manages the radio network and radio nodes (lighting apparatuses 30*a* and 30*b* with radio communication functions, and mobile terminals 40*a*, 40*b*, and 40*c* with radio communication functions) located in a communication area of access point 20. Area A1 and area A2 are, for example, areas into which a single floor in an office is divided. Area A1 and area A2 may not correspond to ranges of communication areas of the radio nodes.

Figure 1:
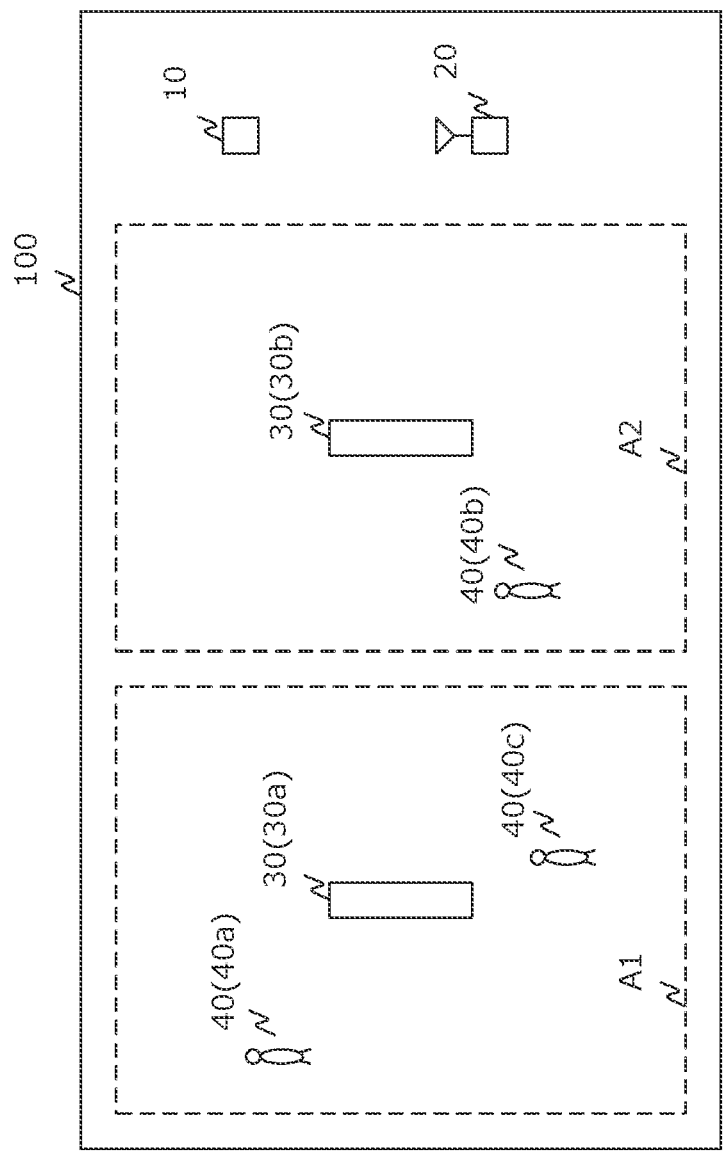
FIG. 1 illustrates an exemplary configuration of a position estimation system according to Embodiment 1.

FIG. 1 illustrates an exemplary configuration of position estimation system 100 according to Embodiment 1. Position estimation system 100 includes lighting control apparatus (position estimation apparatus) 10 with a radio communication function, access point (first radio node) 20, lighting apparatuses (third radio nodes) 30 (30*a* and 30*b*) with radio communication functions, and mobile terminals (second radio nodes) 40 (40*a*, 40*b*, and 40*c*) with radio communication functions. Lighting control apparatus 10 performs wired or radio communication with access point 20. Access point 20 performs radio communication with lighting apparatuses 30*a* and 30*b*, and mobile terminals 40*a*, 40*b*, and

40c. Access point 20 manages a star radio network composed with lighting apparatuses 30a and 30b, and mobile terminals 40a, 40b, and 40c.

<Relation Between Area and Lighting Fixture>

A communication area of position estimation system 100 is an area (radio area) in which radio waves satisfying a predetermined reception quality can reach from access point 20. In FIG. 14A and FIG. 14B, for example, lighting apparatuses 30a and 30b and mobile terminals 40a, 40b, and 40c are in the communication area, in which radio waves satisfying a predetermined reception quality can reach from access point 20, and thus can communicate with access point 20. The communication area is configured by being divided into two areas (division areas) A1 and A2 surrounded by broken lines illustrated in FIG. 1. Lighting apparatus 30a is installed in area A1, and lighting apparatus 30b is installed in area A2.

<Position of Mobile Terminal>

Mobile terminals 40a, 40b, and 40c can move within the communication area of access point 20. For example, mobile terminals 40a and 40c are located in area A1, and mobile terminal 40b is located in area A2 as illustrated in FIG. 14B.

<Radio Node>

In Embodiment 1, lighting apparatuses 30a and 30b and mobile terminals 40a, 40b, and 40c are referred to as radio nodes, excluding access point 20. Additionally, lighting apparatuses 30a and 30b and mobile terminals 40a, 40b, and 40c are collectively referred to as a radio node group. The radio nodes are respectively assigned identifiers (hereinafter, referred to as ID), and can be identified by the identifiers. The identifier may include, for example, a Media Access Control (MAC) address, a device address, or an IP address.

<Overview of Operation of Position Estimation System>

Figure 2:
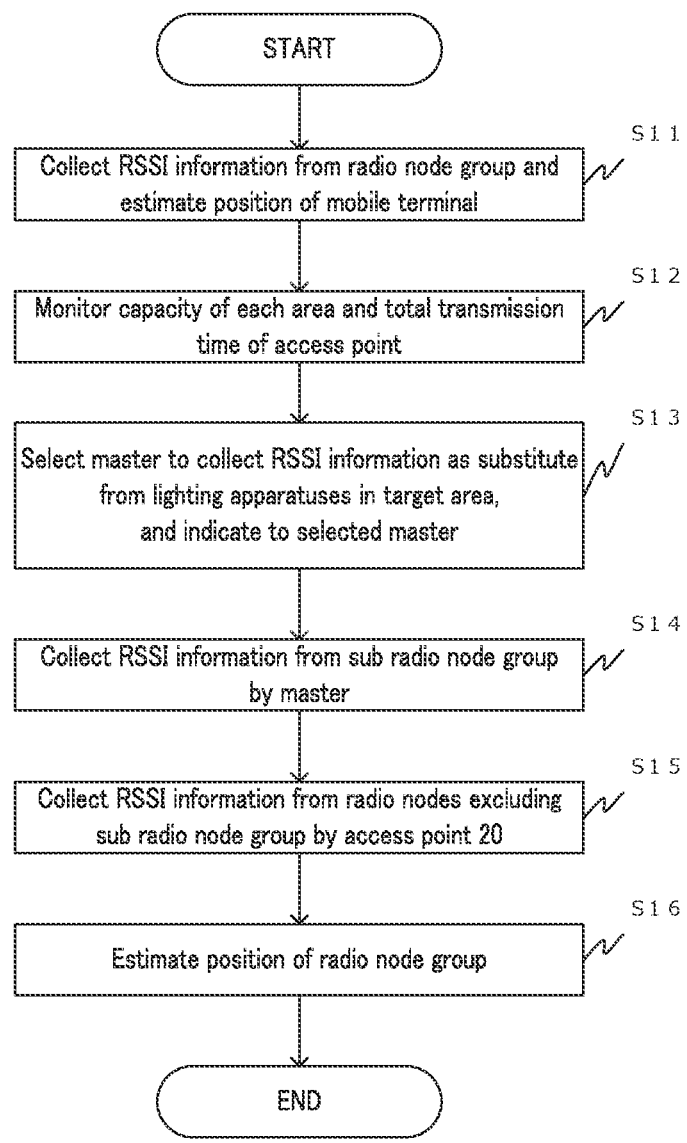
FIG. 2 is a flowchart describing an exemplary operation of the position estimation system according to Embodiment 1.

FIG. 2 is a flowchart describing an exemplary operation of position estimation system 100 according to Embodiment 1.

In step S11, lighting control apparatus 10 causes access point 20 to collect RSSIs from collection target nodes in the radio node group. The collection target nodes here are radio nodes targeted for RSSI information collection. The RSSI information is information including the ID of a radio node and the RSSI between the radio node and the collection target node. By way of example, the RSSI information further includes the ID of the collection target node.

For example, access point 20 transmits, to lighting apparatus 30, RSSI request packets for requesting transmission of the RSSI information in addition to a signal for turning the light on or off. Access point 20 then receives RSSI response packets including the RSSI information transmitted from the radio node group in response to reception of the RSSI request packets, collects the RSSI information, and transmits the information to lighting control apparatus 10. Note that a packet is an example of a signal in the present disclosure.

Next, lighting control apparatus 10 estimates positions of mobile terminals 40a, 40b, and 40c based on the collected RSSI information. Lighting control apparatus 10, for example, acquires distances between radio nodes based on the RSSI information, and estimates the positions of mobile terminals 40a, 40b, and 40c using the principle of three-point positioning and the known position information of lighting apparatus 30.

In step S12, lighting control apparatus 10 monitors a capacity (time resource capacity) of each area of access point 20 and a total transmission time of access point 20. The capacity here is a capacity of time resources used by access point 20 to transmit and receive radio signals to and from mobile terminal 40. The total transmission time is a total time taken by access point 20 to transmit packets to the radio node group. For example, lighting control apparatus 10 determines whether the capacity exceeds a capacity threshold for each area based on an attribute of each area.

By way of example, the capacity of the area is proportional to the number of mobile terminals 40 located in the area. The proportionality factor is 1, for example. In this case, the capacity threshold is determined, for example, according to the maximum number of mobile terminals 40 located in the area, and the maximum number is based on a case where access point 20 directly collects the RSSI information from mobile terminal 40 in the area. In other words, when the capacity of the area exceeds the capacity threshold, lighting control apparatus 10 causes lighting apparatus 30 in the area to collect the RSSI information from mobile terminal 40 in the area as a substitute.

By way of another example, the capacity of the area is proportional to the weighted number of mobile terminals 40 located in the area. The proportionality factor is 1, for example. The weighted number here is a sum of weightings respectively determined for mobile terminals 40 in the area. The weighting is determined according to the frequency of position estimation, for example. In this case, the capacity threshold is determined, for example, according to the maximum weighted number of mobile terminals 40 located in the area, and the maximum weighted number is based on a case where access point 20 directly collects the RSSI information from mobile terminal 40 in the area.

By way of example, the weighting may be corrected according to an attribute of mobile terminal 40. For example, the weighting may be multiplied by a correction factor for mobile terminal 40 held by a visitor in an office. In addition, the weighting may be multiplied by a correction factor according to an amount of movement of mobile terminal 40 (how far mobile terminal 40 moves per time unit). For example, the correction factor of mobile terminal 40 held by a person seated in a fixed seat where the person seated is specified may be smaller than the correction factor of mobile terminal 40 held by a person seated in a seat other than the fixed seat, and the correction factor may be 0.1, for example.

A description will be given below of a case where the capacity of the area is measured by the number of mobile terminals 40 located in the area, for simplicity. In this case, the capacity threshold is, for example, the maximum number of mobile terminals 40 located in the area when access point 20 directly collects the RSSIs from mobile terminals 40 in the area.

By way of example, lighting control apparatus 10 further determines whether the transmission time remains for access point 20 based on the total transmission time acquired from access point 20.

Lighting control apparatus 10 then determines, based on the determination, an area where transmission of the RSSI request packets is decentralized from access point 20 to lighting apparatus 30.

In step S13, lighting control apparatus 10 selects lighting apparatus 30 (referred to as a master) to collect the RSSI information as a substitute from among lighting apparatuses 30 present in the determined area where the transmission of the RSSI request packets is decentralized. Lighting control apparatus 10 then causes the master to collect the RSSI information as a substitute by transmitting, to the selected master via access point 20, an RSSI collection substitution indication including a list of radio nodes (referred to as a sub radio node group) from which the RSSI is to be collected.

The RSSI collection substitution indication is an indication causing an addressed radio node to collect the RSSI information as a substitute.

In step S14, the master collects the RSSI information from the sub radio node group included in the RSSI collection substitution indication. The collected RSSI information is transmitted to lighting control apparatus 10 via access point 20.

In step S15, lighting control apparatus 10 causes access point 20 to collect the RSSI information from the radio nodes in the radio node group, except for the sub radio node group from which the master has collected the RSSI information in step S14. For example, access point 20 transmits the RSSI request packets to the radio nodes other than the sub radio node group. Access point 20 then receives the RSSI response packets including the RSSI information transmitted from the radio nodes in response to reception of the RSSI request packets, collects the RSSI information, and transmits the information to lighting control apparatus 10.

In step S16, lighting control apparatus 10 estimates the positions of mobile terminals 40 whose RSSI information has been collected from access point 20. Lighting control apparatus 10 terminates the processing afterward.

Position estimation system 100 is configured by a single radio network as illustrated in FIG. 14A and FIG. 14B. Further, position estimation system 100 causes the master selected by lighting control apparatus 10 to perform the function of collecting the RSSI information as a substitute, as described above with reference to FIG. 2. This allows the RSSI information from mobile terminal 40 to be collected without changing the topology of the network (e.g., the network address) and while preventing accumulation of the transmission time of access point 20.

<Description of Each Apparatus>

Figure 3:
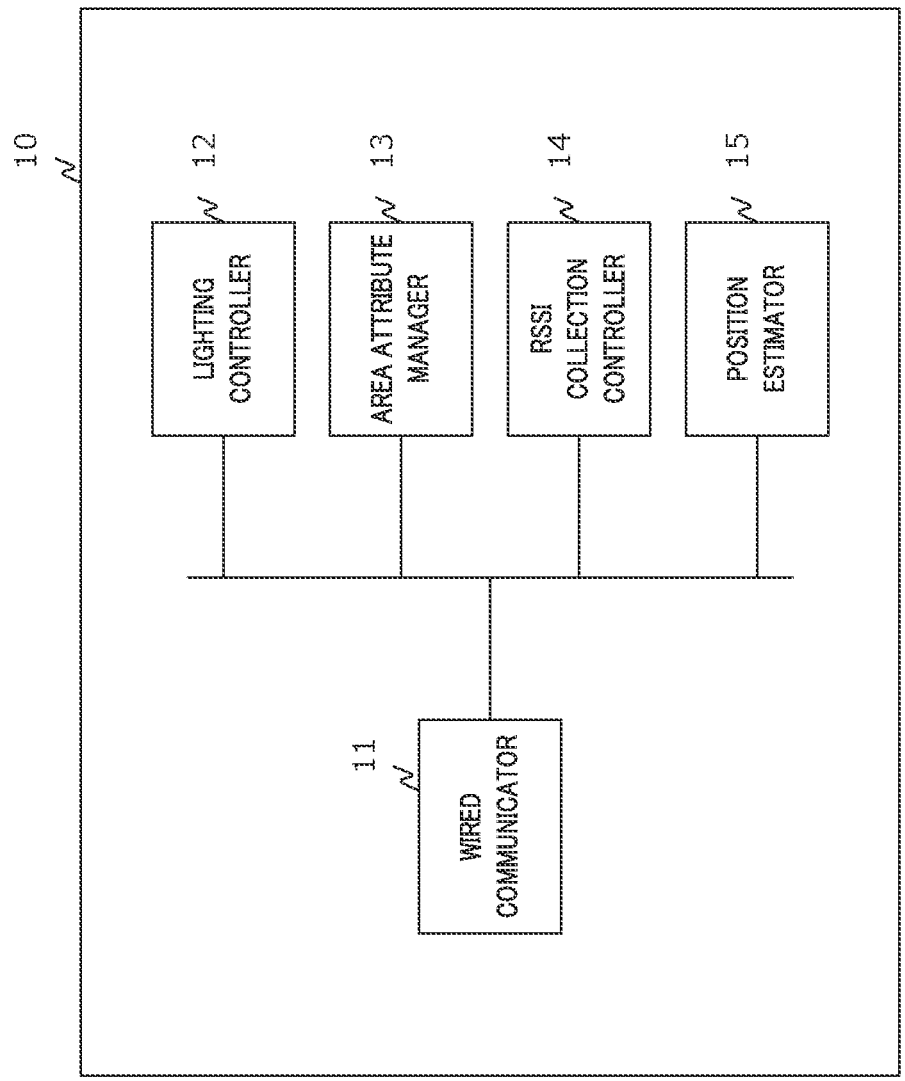
FIG. 3 illustrates an exemplary configuration of a lighting control apparatus according to Embodiment 1.

FIG. 3 illustrates an exemplary configuration of lighting control apparatus 10 according to Embodiment 1. Lighting control apparatus 10 includes wired communicator 11, lighting controller 12, area attribute manager (determination circuitry) 13, RSSI collection controller (transmission circuitry) 14, and position estimator (estimation circuitry) 15. By way of example, the components in lighting control apparatus 10 are connected by a bus, for example, and communication between the components is performed via the bus, as illustrated in FIG. 3.

Wired communicator 11 communicates with access point 20 via wired communication to transmit and receive control signals and data signals to and from access point 20 and the radio nodes that radio-communicate with access point 20. The wired communication is, for example, communication using Ethernet (registered trademark).

Lighting controller 12 controls lighting apparatuses 30a and 30b by generating a control signal for turning lighting apparatuses 30a and 30b on or off, and transmitting the control signal to lighting apparatuses 30a and 30b through wired communicator 11 and access point 20. Lighting controller 12 may generate a control signal for light control or color adjustment, in addition to the control signal for turning lighting apparatuses 30a and 30b on or off.

Area attribute manager 13 monitors whether the number of mobile terminals 40 located in the area exceeds a capacity threshold defined for each area, based on the attribute of the area given to each area. The attribute of an area is defined as a moving area or a non-moving area. The moving area as the attribute of the area means an area where mobile terminals 40 move around. The moving area in an office includes, for example, a hot desking area.

The non-moving area as the attribute of the area means an area where mobile terminals 40 move less than those in the moving area. For example, the non-moving area includes an area where individual booths or individual desks are concentrated in an office.

For example, when the capacity threshold of area A1 is 1, and the capacity threshold of area A2 is 2 in position estimation system 100, area attribute manager 13 determines that the number of mobile terminals 40 does not exceed the capacity threshold of area A1 since area A1 includes single mobile terminal 40a as illustrated in FIG. 1. Likewise, area attribute manager 13 determines that the number of mobile terminals 40 does not exceed the capacity threshold of area A2 since area A2 includes two mobile terminals 40b and 40c in FIG. 1. Configuring the capacity threshold for each area makes it possible to appropriately collect the RSSI information held by mobile terminals 40 and used for position estimation, according to an area where high estimation accuracy is required or an area where high estimation frequency is required.

RSSI collection controller 14 issues an RSSI collection request command or an RSSI collection substitution indication command based on control signals from area attribute manager 13 and a total transmission time acquired from access points 20. The RSSI collection request command here is a command indicating collection of the RSSI information of collection target nodes to access point 20, and includes a collection target ID list that is a list of the IDs of the collection target nodes. In addition, the RSSI collection substitution indication command is a command indicating, to access point 20, transmission of an RSSI collection substitution indication to a master, and includes the collection target ID list and the ID of the master (master ID). Note that a command is an example of a control signal in the present disclosure.

RSSI collection controller 14 outputs the RSSI collection request command or the RSSI collection substitution indication command to access point 20 via wired communicator 11. An example where the use of the RSSI collection substitution indication command allows lighting control apparatus 10 to prevent the number of signal transmissions of access point 20 will be described later with reference to FIG. 12.

Position estimator 15 estimates positions of mobile terminals 40 based on the RSSI information received from the radio nodes via access point 20. For example, position estimator 15 calculates distances between mobile terminals 40a, 40b, and 40c, lighting apparatuses 30a and 30b, and access point 20 based on the collected RSSI information. Next, position estimator 15 calculates relative positions of mobile terminals 40a, 40b, and 40c, lighting apparatuses 30a and 30b, and access point 20 based on the calculated distances. Position estimator 15 then estimates the positions of mobile terminals 40a, 40b, and 40c based on the absolute positions of the radio nodes (e.g., lighting apparatuses 30a and 30b) with known absolute positions, and the calculated relative positions.

Figure 4:
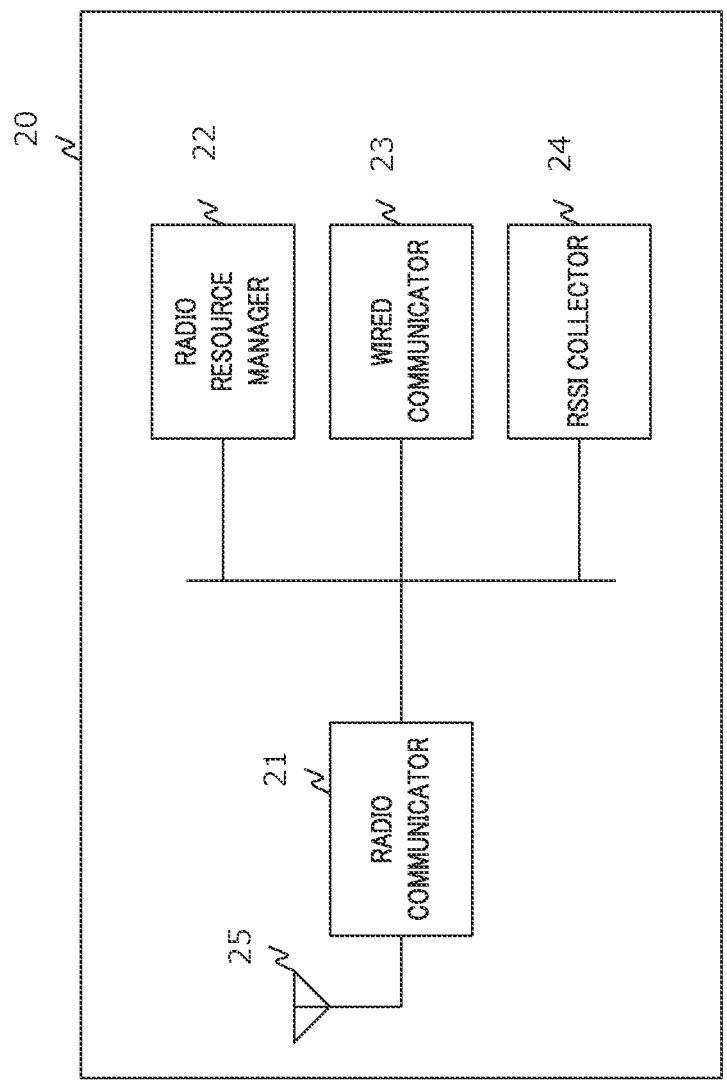
FIG. 4 is a block diagram illustrating an exemplary configuration of an access point according to Embodiment 1.

FIG. 4 is a block diagram illustrating an exemplary configuration of access point 20 according to Embodiment 1. Access point 20 includes radio communicator 21, radio resource manager 22, wired communicator 23, RSSI collector 24, and antenna 25. By way of example, the components in access point 20 are connected by a bus, for example, and communication between the components is performed via the bus, as illustrated in FIG. 4.

Radio communicator 21 performs radio communication with at least one of lighting apparatuses 30a and 30b and mobile terminals 40a, 40b, and 40c via antenna 25. By way of example, radio communicator 21 uses a Carrier Sense Multiple Access (CSMA) method as an access method. The radio communication method using the CSMA method includes, for example, a wireless Local Area Network (LAN), Bluetooth (registered trademark), WiGig, specified low power radio, or a Low Power Wide Area (LPWA). Radio communicator 21 may also use Time Division Multiple Access (TDMA) as a radio communication method.

Radio resource manager 22 performs connection processing and bandwidth control for radio communication with lighting apparatuses 30a and 30b and mobile terminals 40a, 40b, and 40c. Additionally, radio resource manager 22 measures time taken by access point 20 to transmit packets, and stores a cumulative value of the transmission time.

Wired communicator 23 performs wired communication with lighting control apparatus 10. The wired communication is, for example, communication using Ethernet (registered trademark).

RSSI collector 24 transmits an RSSI request packet for requesting transmission of the RSSI information to a radio node whose ID is on the collection target ID list included in the RSSI collection request command indicated from lighting control apparatus 10. RSSI collector 24 then collects the RSSI information included in an RSSI response packet according to reception of the RSSI response packet. Additionally, RSSI collector 24 transmits an RSSI collection substitution indication packet to a radio node (master) identified by the destination ID included in the RSSI collection substitution indication command. RSSI collector 24 then collects the RSSI information included in an RSSI collection result indication packet according to reception of the RSSI collection result indication packet. By way of example, RSSI collector 24 temporarily stores the collected RSSI information. RSSI collector 24 transmits the collected RSSI information to lighting control apparatus 10 via wired communicator 23.

Figure 5:
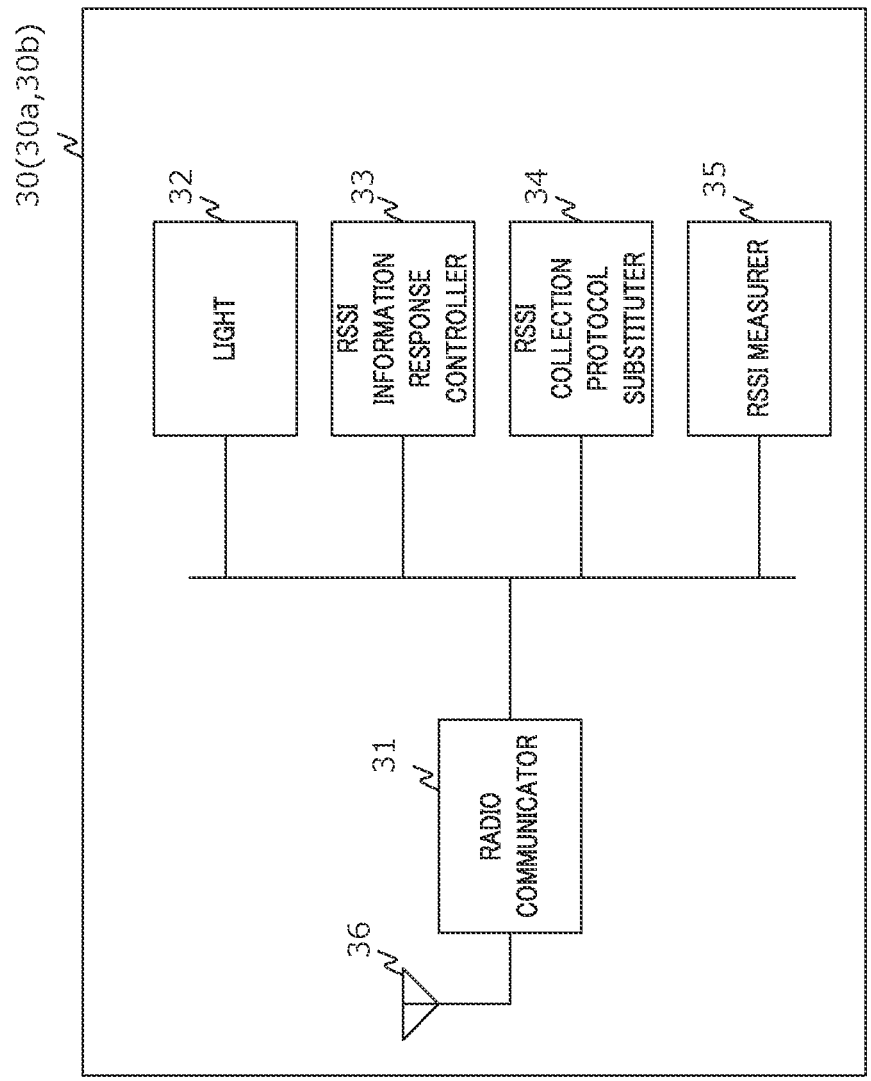
FIG. 5 is a block diagram illustrating an exemplary configuration of a lighting apparatus according to Embodiment 1.

FIG. 5 is a block diagram illustrating an exemplary configuration of lighting apparatus 30 (30a and 30b) according to Embodiment 1.

Lighting apparatus 30 (30a and 30b) includes radio communicator 31, antenna 36, light 32, RSSI measurer 35, RSSI information response controller 33, and RSSI collection protocol substituter 34. Lighting apparatuses 30a and 30b have a common configuration. By way of example, the components in lighting apparatus 30 are connected by a bus, for example, and communication between the components is performed via the bus, as illustrated in FIG. 5.

Radio communicator 31 performs radio communication with access point 20 via antenna 36. The access method of radio communicator 31 corresponds to the access method used by radio communicator 21 of access point 20.

Light 32 turns the light on, changes the gradation, changes the color, or turns the light off, based on the control signal received from lighting control apparatus 10. Light 32 is, for example, a Light Emitting Diode (LED) or a fluorescent light.

RSSI measurer 35 measures the RSSI in response to reception (interception) of the RSSI request packet addressed to a radio node other than lighting apparatus 30. Additionally, RSSI measurer 35 extracts the ID of the source radio node (hereinafter, referred to as a source ID) included in the RSSI request packet, and stores the RSSI information including the extracted source ID and the measured RSSI.

RSSI information response controller 33 generates an RSSI response packet including the RSSI information stored by RSSI measurer 35 in response to reception of the RSSI request packet addressed to lighting apparatus 30, and transmits the RSSI response packet to access point 20 via radio communicator 31.

RSSI collection protocol substituter 34 transmits the RSSI request packet to a radio node whose ID is included in the RSSI collection substitution indication packet, in response to reception of the RSSI collection substitution indication packet from access point 20. Next, RSSI collection protocol substituter 34 receives the RSSI response packet from the radio node whose ID is included in the RSSI collection substitution indication packet. RSSI collection protocol substituter 34 then collects the RSSI information from the RSSI response packet, and transmits an RSSI collection result indication packet including the collected RSSI information to access point 20.

Figure 6:
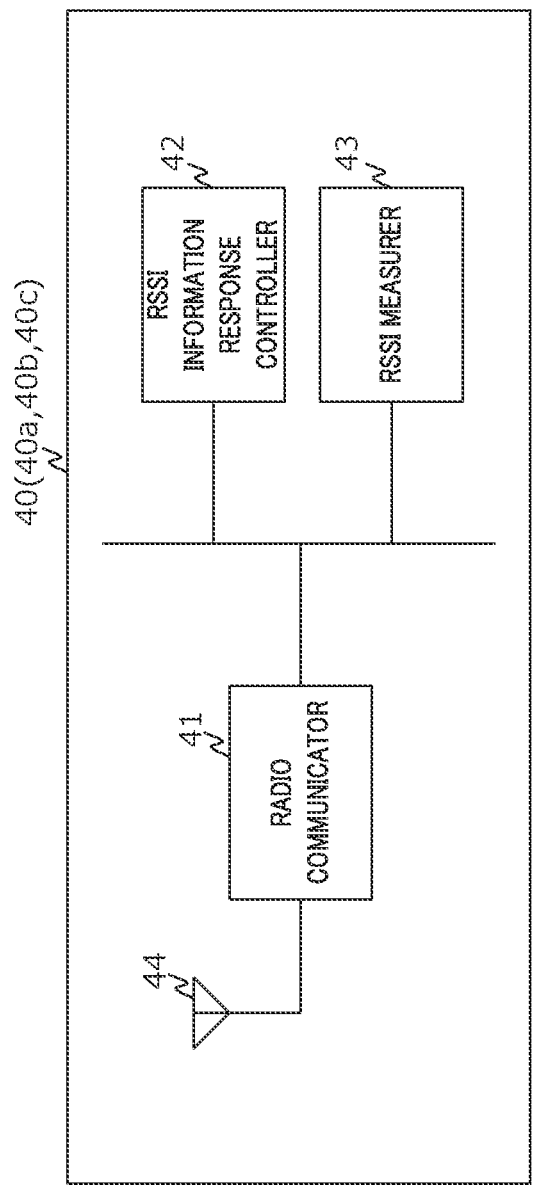
FIG. 6 is a block diagram illustrating an exemplary configuration of a mobile terminal according to Embodiment 1.

FIG. 6 is a block diagram illustrating an exemplary configuration of mobile terminal 40 (40a, 40b, and 40c) according to Embodiment 1.

Mobile terminal 40 (40a, 40b, and 40c) includes radio communicator 41, antenna 44, RSSI measurer 43, and RSSI information response controller 42. Mobile terminals 40a, 40b, and 40c have a common configuration. By way of example, the components in mobile terminal 40 are connected by a bus, for example, and communication between the components is performed via the bus, as illustrated in FIG. 6.

Radio communicator 41 performs radio communication with at least one of access point 20 and lighting apparatuses 30a and 30b via antenna 44.

RSSI measurer 43 measures the RSSI in response to reception (interception) of the RSSI request packet addressed to a radio node other than mobile terminal 40. Additionally, RSSI measurer 43 extracts the source ID included in the RSSI request packet, and stores the RSSI information including the extracted source ID and the measured RSSI.

RSSI information response controller 42 generates an RSSI response packet including the RSSI information stored by RSSI measurer 43 in response to reception of the RSSI request packet addressed to mobile terminal 40, and transmits the RSSI response packet to access point 20 via radio communicator 41.

<Operation of Lighting Control Apparatus 10>

Figure 7:
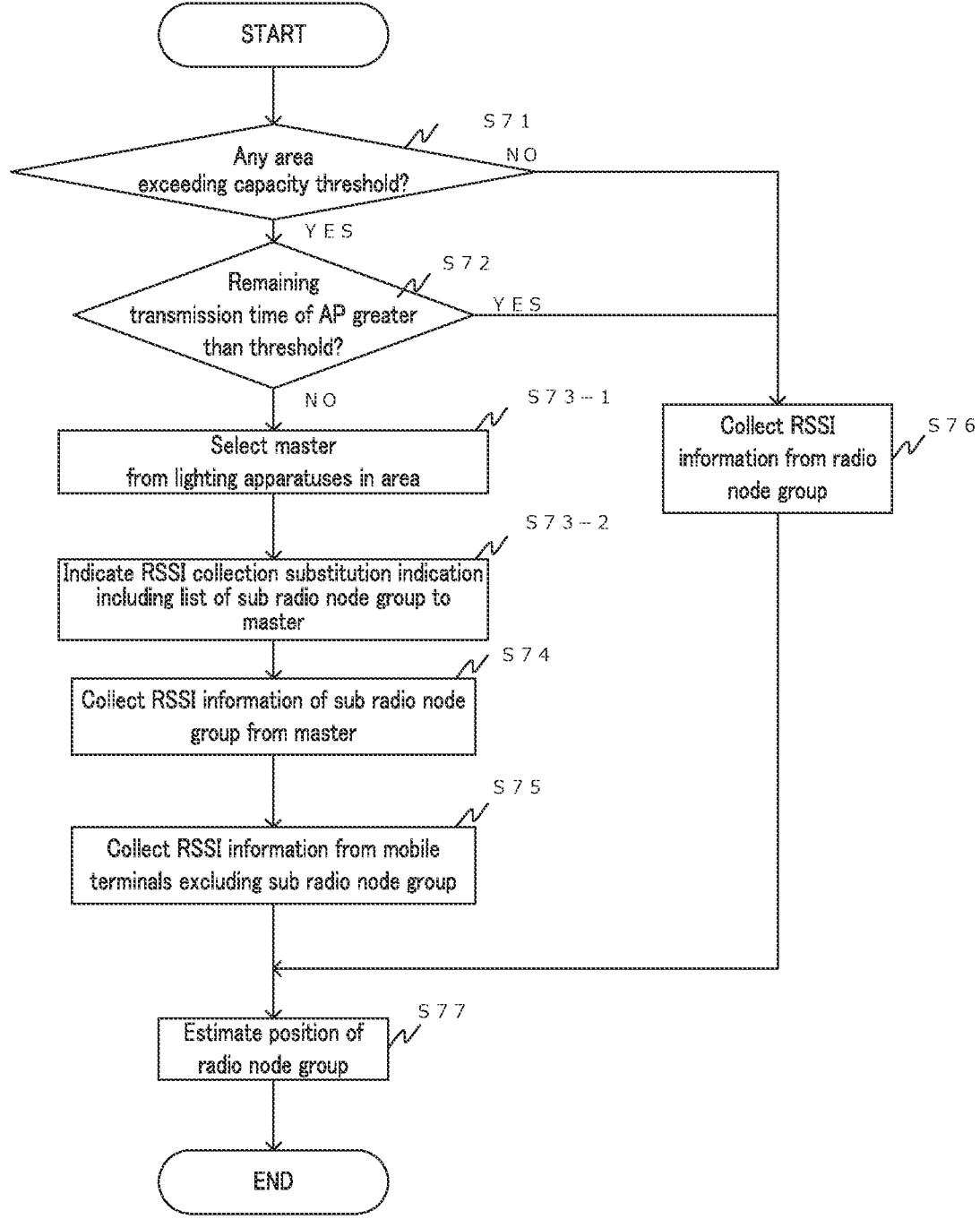
FIG. 7 is a flowchart describing an exemplary operation of the lighting control apparatus according to Embodiment 1.

FIG. 7 is a flowchart describing an exemplary operation of lighting control apparatus 10 according to Embodiment 1.

In step S71, area attribute manager 13 of lighting control apparatus 10 determines whether any area includes mobile terminals 40 exceeding the capacity threshold.

When any area includes mobile terminals 40 exceeding the capacity threshold (YES in step S71), RSSI collection controller 14 of lighting control apparatus 10 acquires the total transmission time from access point 20, and determines whether the remaining transmission time is greater than a threshold, in step S72. The threshold of the remaining transmission time in the specified low power radio using the 920 MHz band may be 180 seconds, which is 50% of the total transmission time of 360 seconds, 270 seconds, which is 75%, or 90 seconds, which is 25%, for example.

When the remaining transmission time is not greater than the threshold (NO in step S72), area attribute manager 13 of lighting control apparatus 10 selects a master to collect the RSSI as a substitute from among the lighting apparatuses installed in the area, in step S73-1.

In step S73-2, RSSI collection controller 14 of lighting control apparatus 10 creates the collection target ID list including the IDs of the radio nodes (sub radio node group) which are present in the area and from which lighting apparatus 30 collects the RSSI information as a substitute, and transmits the RSSI collection substitution indication command including the collection target ID list and the master ID to access point 20.

In step S74, RSSI collection controller 14 of lighting control apparatus 10 collects the RSSI information of the sub radio node group from the master. The processing contents of the collection will be described later with reference to FIG. 12.

In step S75, RSSI collection controller 14 of lighting control apparatus 10 collects the RSSI information from the radio nodes, which are not included in the sub radio node group, in the radio node group via access point 20, and then proceeds to step S77. The processing contents of the collection will be described later with reference to FIG. 12.

Meanwhile, when no area includes mobile terminals 40 exceeding the capacity threshold (NO in step S71), or when the remaining transmission time is greater than the threshold (YES in step S72), lighting control apparatus 10 proceeds to step S76.

In step S76, RSSI collection controller 14 of lighting control apparatus 10 collects the RSSI information from the radio node group via access point 20.

In step S77, position estimator 15 of lighting control apparatus 10 estimates the positions of the mobile terminals based on the collected RSSI information. Lighting control apparatus 10 terminates the processing afterward.

Figure 8:
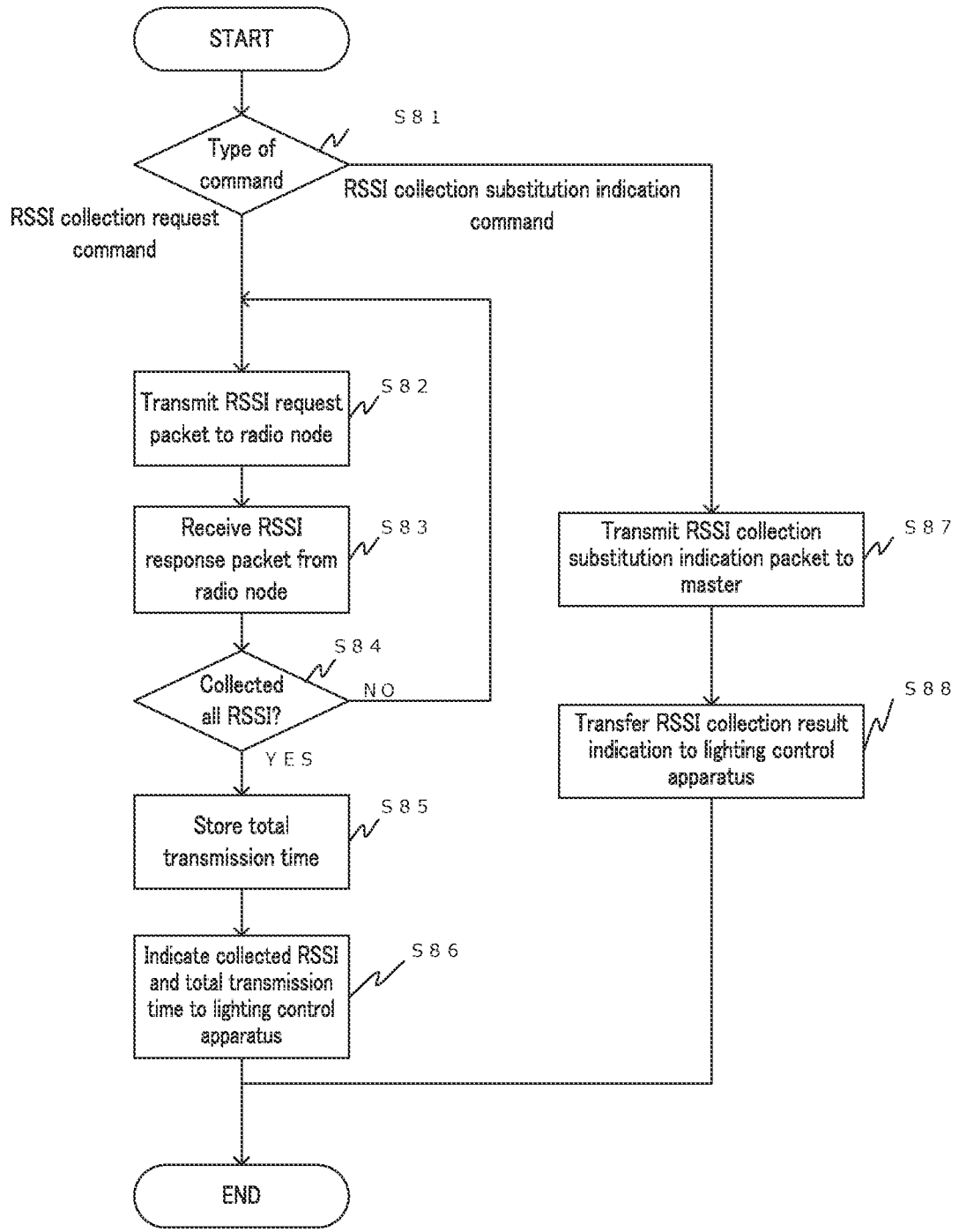
FIG. 8 is a flowchart describing an exemplary operation of the access point according to Embodiment 1.

FIG. 8 is a flowchart describing an exemplary operation of access point 20 according to Embodiment 1.

In step S81, access point 20 determines a type of a command received from lighting control apparatus 10. When the type of the command is the RSSI collection request command (RSSI collection request command in step S81), access point 20 generates the RSSI collection request packets with the collection target ID list included in the RSSI collection request command, in step S82. Access point 20 then transmits the RSSI request packets to the radio nodes whose IDs are included in the collection target ID list.

In step S83, access point 20 receives the RSSI response packets transmitted from the radio nodes, and stores the RSSI information included in the RSSI response packets.

In step S84, access point 20 determines whether the RSSI information has been collected from all the radio nodes whose IDs are included in the collection target ID list. When the RSSI information has not been collected from all the radio nodes (NO in step S84), the process proceeds to step S82.

Meanwhile, when the RSSI information has been collected from all the radio nodes (YES in step S84), access point 20 stores the total transmission time taken for the transmission of the RSSI request packets, and the transmission of the RSSI collection substitution indication packet and the control packet, for example, in step S85.

In step S86, access point 20 transmits, to lighting control apparatus 10, the RSSI collection result indication command including the RSSI information collected in step S83 and the total transmission time stored in step S85. Access point 20 terminates the processing afterward.

In contrast, when the command received from lighting control apparatus 10 is the RSSI collection substitution indication command (RSSI collection substitution indication command in step S81), access point 20 transmits the RSSI collection substitution indication packet with the collection target ID list included in the RSSI collection substitution indication command to the radio node (master) identified by the destination ID included in the RSSI collection substitution indication command, in step S87.

In step S88, access point 20 generates the RSSI collection result indication command with the RSSI information included in the RSSI collection result indication packet received from the master, and transmits the RSSI collection result indication command to lighting control apparatus 10 (forwards the RSSI collection result indication). Access point 20 terminates the processing afterward.

Figure 9:
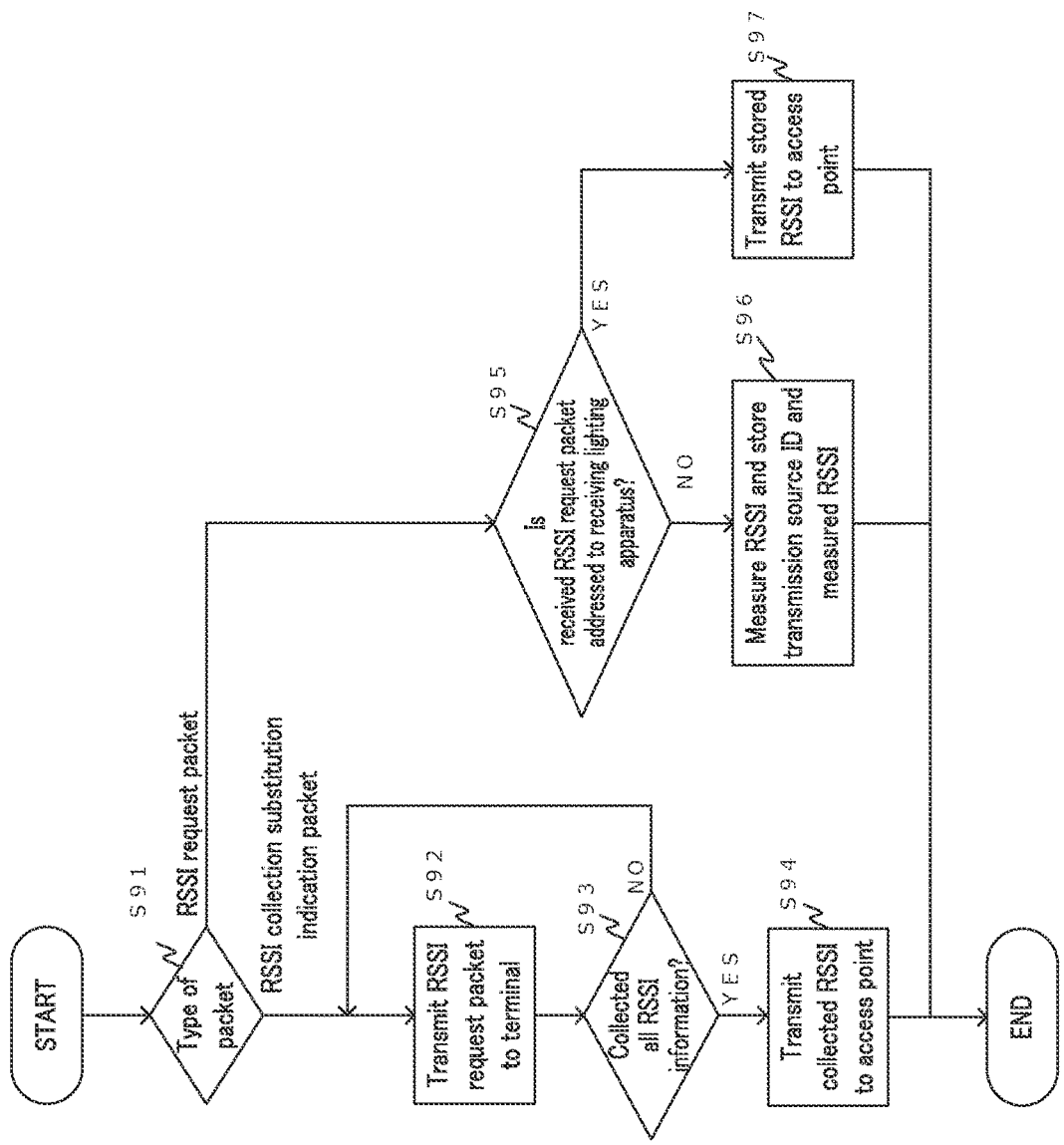
FIG. 9 is a flowchart describing an exemplary operation of the lighting apparatus according to Embodiment 1.

FIG. 9 is a flowchart describing an exemplary operation of lighting apparatuses 30a and 30b according to Embodiment 1. The operation of lighting apparatus 30b is common to the operation of lighting apparatus 30a. The operation of lighting apparatus 30a will be described below.

In step S91, lighting apparatus 30a determines a type of a packet received from access point 20. When the type of the received packet is the RSSI collection substitution indication packet (RSSI collection substitution indication packet in step S91), lighting apparatus 30a transmits the RSSI request packets to the radio nodes (sub radio nodes) whose IDs are on the collection target ID list included in the RSSI collection substitution indication packet, in step S92.

In step S93, lighting apparatus 30a determines whether the RSSI information has been collected from all the sub radio nodes. When the RSSI information has not been collected from all the sub radio nodes (NO in step S93), lighting apparatus 30a proceeds to step S92.

When the RSSI information has been collected from all the sub radio nodes (YES in step S93), the process proceeds to step S94. In step S94, lighting apparatus 30a transmits the RSSI information collected in step S92 to access point 20. Lighting apparatus 30a terminates the processing afterward.

In contrast, when the type of the received packet is the RSSI request packet (RSSI request packet in step S91), lighting apparatus 30a determines whether the RSSI request packet is addressed to lighting apparatus 30a in step S95.

When the RSSI request packet is not addressed to lighting apparatus 30a (NO in step S95), lighting apparatus 30a stores the source ID included in the received RSSI request packet and the measured RSSI linking with each other, in step S96. Lighting apparatus 30a terminates the processing afterward.

Meanwhile, when the RSSI request packet is addressed to lighting apparatus 30a (YES in step S95), lighting apparatus 30a generates the RSSI response packet including the stored RSSI information, and transmits the generated RSSI response packet to access point 20, in step S97. Lighting apparatus 30a terminates the processing afterward.

Figure 10:
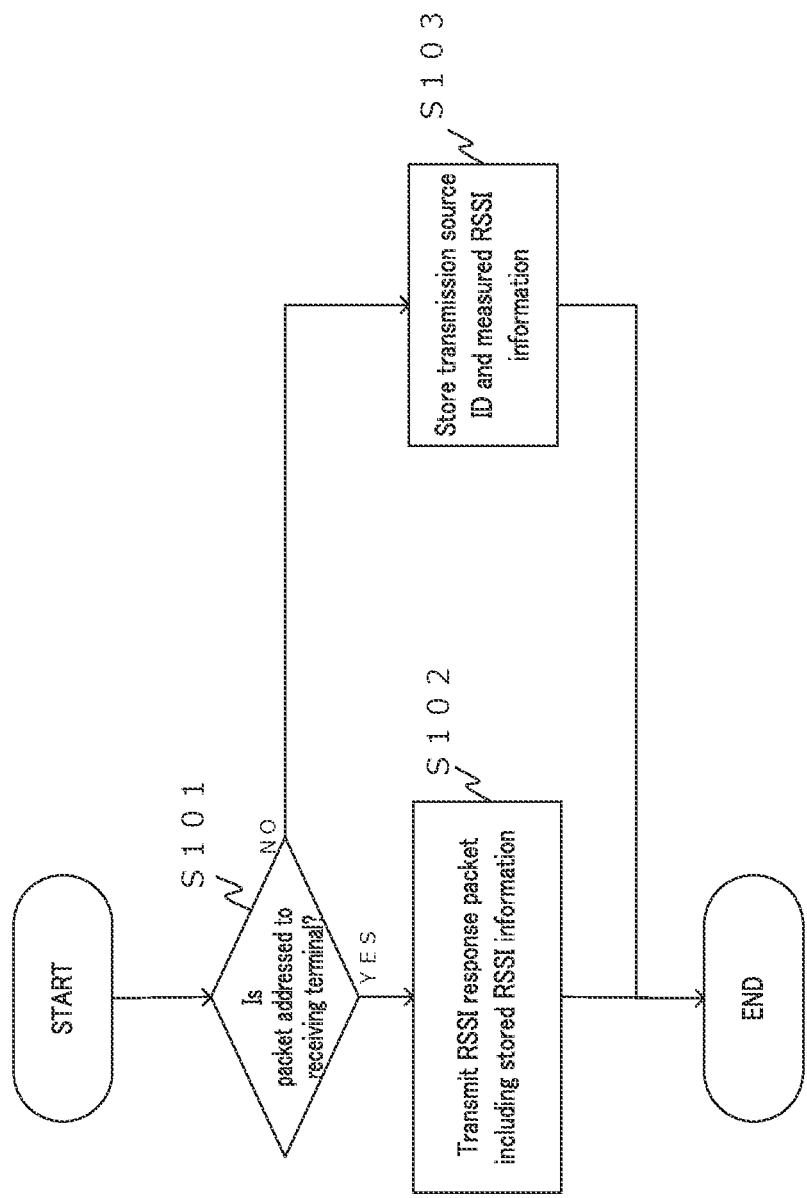
FIG. 10 is a flowchart describing an exemplary operation of the mobile terminal according to Embodiment 1.

FIG. 10 is a flowchart describing an exemplary operation of mobile terminals 40a, 40b, and 40c according to Embodiment 1. The operations of mobile terminals 40b and 40c are common to the operation of mobile terminal 40a. The operation of mobile terminal 40a will be described below.

In step S101, mobile terminal 40a determines whether the received RSSI request packet is addressed to mobile terminal 40a. When the RSSI request packet is addressed to mobile terminal 40a (YES in step S101), mobile terminal 40a transmits the RSSI response packet including the stored RSSI information in step S102, and terminates the processing.

When the received RSSI request packet is not addressed to mobile terminal 40a (NO in step S101), however, mobile terminal 40a stores the RSSI information linked with the source ID included in the RSSI request packet and the measured RSSI in step S103, and terminates the processing.

<Description of Operation Sequence of Whole Position Estimation System>

The operation sequence of position estimation system 100 from time T0 to time T2 will be described below.

Figure 11A:
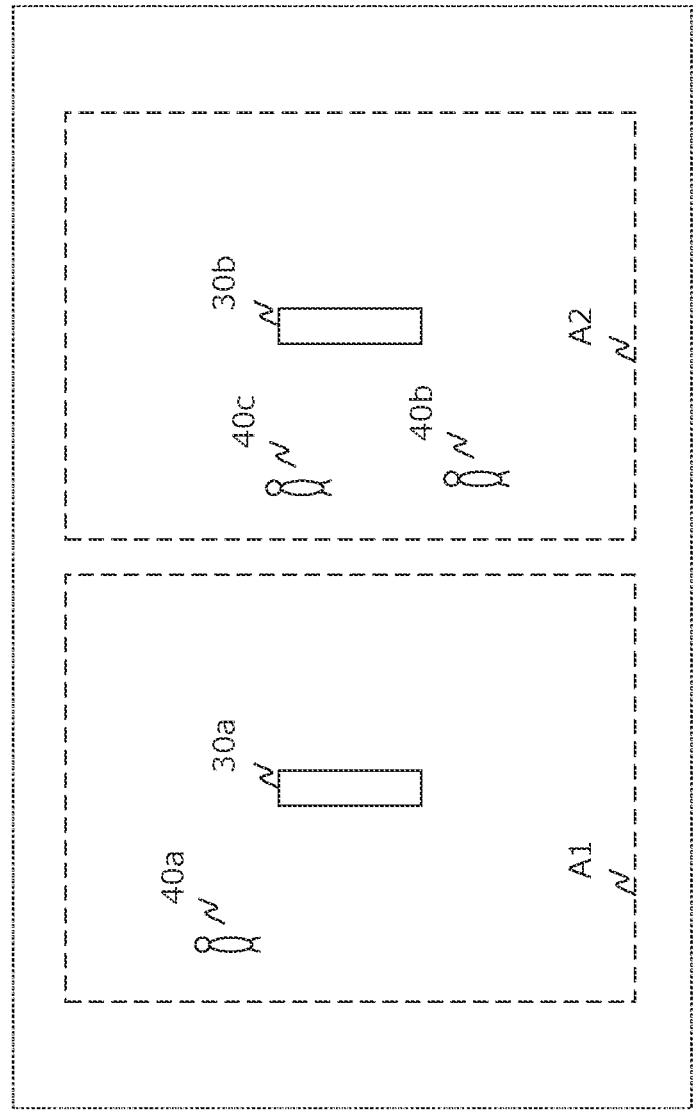
FIG. 11A is a layout diagram illustrating exemplary positions of the mobile terminals corresponding to time according to Embodiment 1.
Figure 11B:
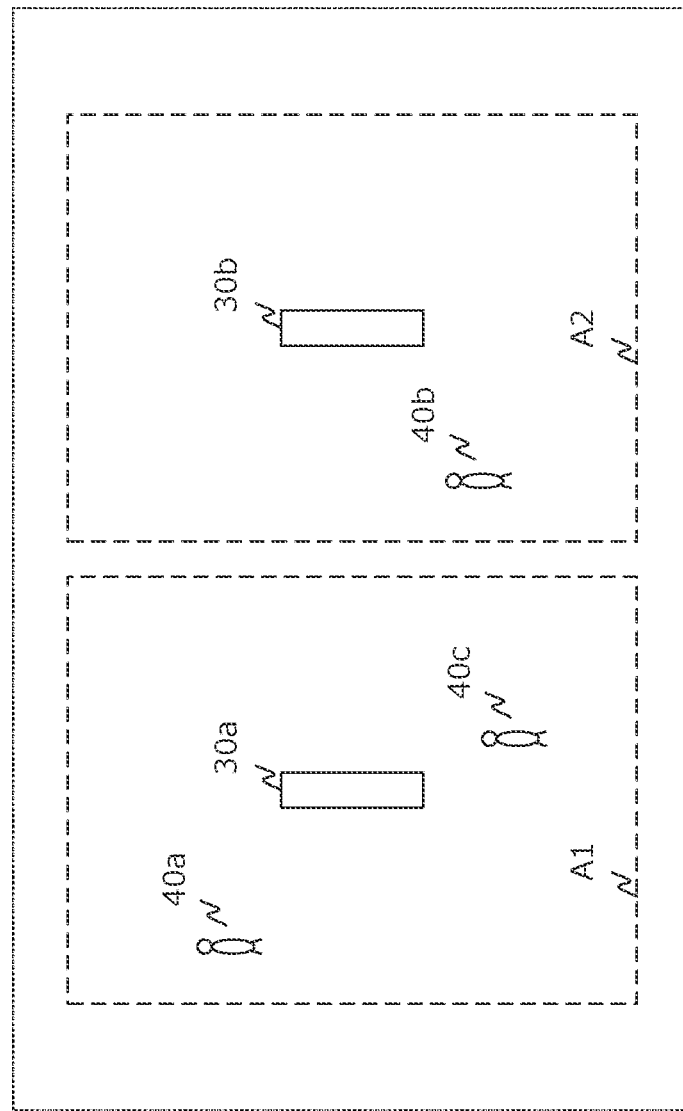
FIG. 11B is another layout diagram illustrating exemplary positions of the mobile terminals corresponding to time according to Embodiment 1.

FIG. 11A is a layout diagram illustrating exemplary positions of mobile terminals 40a, 40b, and 40c corresponding to times T0 and T1 according to Embodiment 1. FIG. 11B is another layout diagram illustrating exemplary positions of mobile terminals 40a, 40b, and 40c corresponding to time T2 according to Embodiment 1. Lighting control apparatus 10 and access point 20 are not illustrated in FIG. 11A and FIG. 11B.

As illustrated in FIG. 11A, mobile terminal 40a is located in area A1, and mobile terminals 40b and 40c are located in area A2 at time T0. Mobile terminal 40c then starts moving from area A2 to area A1 at time T1, and completes the movement from area A2 to area A1 at time T2 illustrated in FIG. 11B. Thus, mobile terminals 40a and 40c are located in area A1, and mobile terminal 40b is located in area A2 at time T2.

Figure 12:
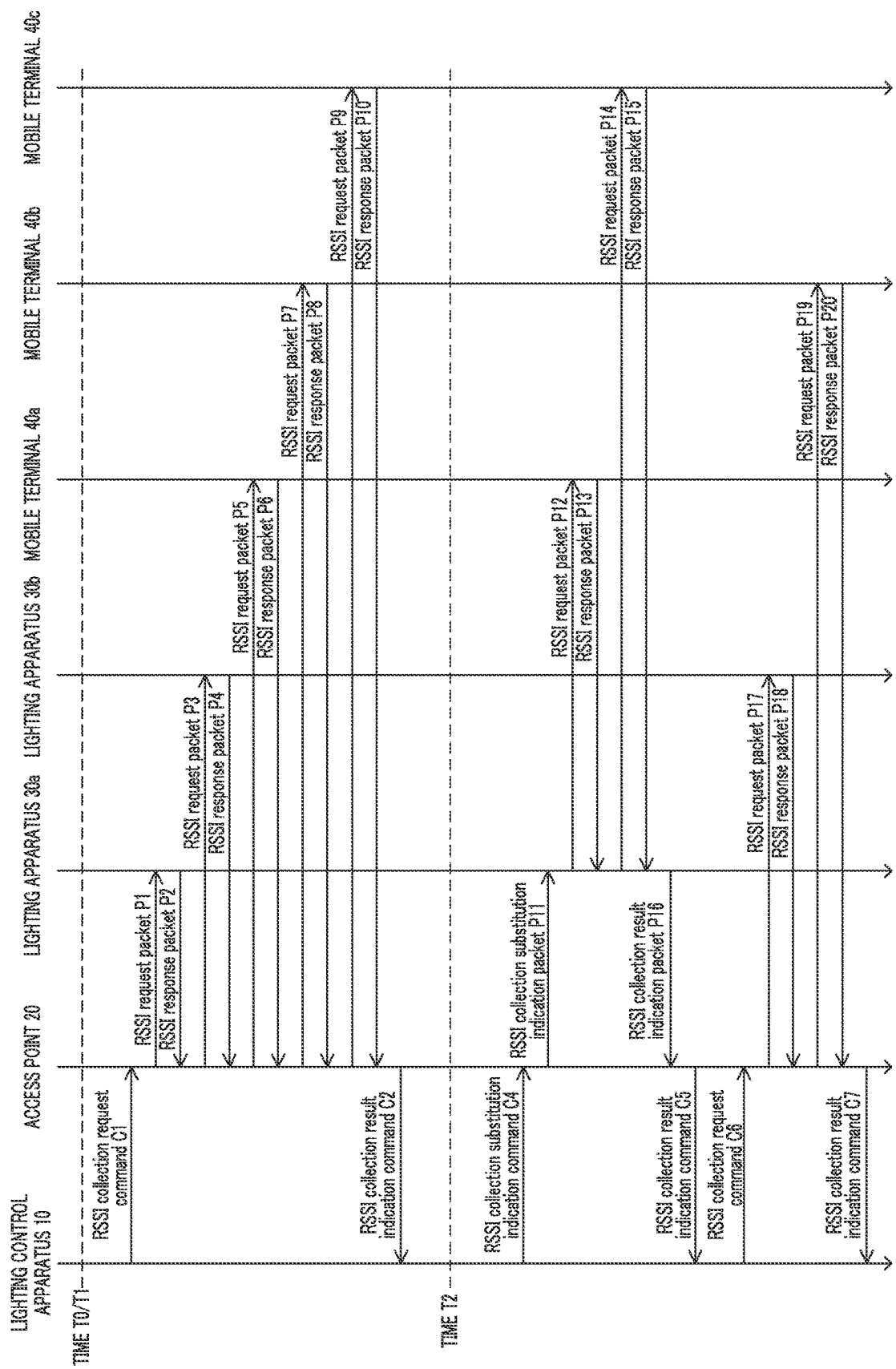
FIG. 12 is a sequence diagram describing an exemplary operation of the position estimation system according to Embodiment 1.

FIG. 12 is a sequence diagram describing an exemplary operation of position estimation system 100 according to Embodiment 1.

FIG. 12 illustrates the operation of position estimation system 100 in a case where area A1 and area A2 illustrated in FIG. 11A and FIG. 11B have the capacity threshold of one and three respectively. At time T0, lighting apparatuses 30a and 30b and mobile terminals 40a, 40b, and 40c are connected to access point 20, and the positions of mobile terminals 40a, 40b, and 40c are already estimated by lighting control apparatus 10.

Lighting control apparatus 10 determines whether the number of mobile terminals 40 located in each area exceeds the capacity threshold at time T0. The numbers of mobile terminals 40 located in area A1 and area A2 are both within the respective capacity thresholds. Lighting control apparatus 10 then generates RSSI collection request command C1 including a list of the IDs of collection target nodes, which are lighting apparatuses 30a and 30b and mobile terminals 40a, 40b, and 40c, and transmits RSSI collection request command C1 to access point 20.

In response to reception of RSSI collection request command C1, access point 20 collects the RSSI information from the collection target nodes (e.g., lighting apparatuses 30a and 30b and mobile terminals 40a, 40b, and 40c) whose IDs are on the collection target ID list included in RSSI collection request command C1.

Access point 20 transmits RSSI request packet P1 to lighting apparatus 30a in order to collect the RSSI information from lighting apparatus 30a. In response to reception of RSSI request packet P1, lighting apparatus 30a generates RSSI response packet P2 including the RSSI information stored in lighting apparatus 30a, and transmits RSSI response packet P2 to access point 20.

Likewise, access point 20 respectively transmits RSSI request packets P3, P5, P7, and P9 to lighting apparatus 30b and mobile terminals 40a, 40b, and 40c in order to collect the RSSI information from lighting apparatus 30b and mobile terminals 40a, 40b, and 40c. In response to reception of RSSI request packets P3, P5, P7, and P9, lighting apparatus 30b and mobile terminals 40a, 40b, and 40c respectively generate RSSI response packets P4, P6, P8, and P10 including the respectively-stored RSSI information, and transmit the response packets to access point 20.

Access point 20 collects the RSSI information from the collection target nodes, and transmits RSSI collection result indication command C2 including the collected RSSI information to lighting control apparatus 10. Lighting control apparatus 10 then estimates the positions of the radio nodes based on the collected RSSI information.

Mobile terminal 40c starts moving from A2 to A1 at time T1, and completes the movement from A2 to A1 at time T2

Lighting control apparatus 10 estimates the position of mobile terminal 40c. The number of the radio apparatuses present in area A1 becomes two, and is determined to exceed the capacity threshold of area A1. Thus, lighting control apparatus 10 selects lighting apparatus 30a in area A1 as a master, and selects mobile terminals 40a and 40c as a sub radio node group.

Lighting control apparatus 10 generates RSSI collection substitution indication command C4 including the collection target ID list with the IDs of the radio nodes belonging to the sub radio node group, and the master ID of the master, which is lighting apparatus 30a. Next, lighting control apparatus 10 transmits the generated RSSI collection substitution indication command C4 to access point 20. In response to reception of RSSI collection substitution indication command C4, access point 20 generates RSSI collection substitution indication packet P11 with the collection target ID list included in RSSI collection substitution indication command C4, and transmits RSSI collection substitution indication packet P11 to lighting apparatus 30a.

In response to reception of RSSI collection substitution indication packet P11, lighting apparatus 30a collects the RSSI information from the collection target nodes (sub radio node group) whose IDs are on the collection target ID list included in RSSI collection substitution indication packet P11.

Lighting apparatus 30a transmits RSSI request packet P12 to mobile terminal 40a in order to collect the RSSI information from mobile terminal 40a. Lighting apparatus 30a may include, in RSSI request packet P12, a flag indicating that lighting apparatus 30a collects the RSSI information as a substitute for access point 20.

In response to reception of RSSI request packet P12, mobile terminal 40a generates RSSI response packet P13 including the RSSI information stored in mobile terminal 40a, and transmits RSSI response packet P13 to lighting apparatus 30a.

Likewise, lighting apparatus 30a transmits RSSI request packet P14 to mobile terminal 40c in order to collect the RSSI information from mobile terminal 40c.

In response to reception of RSSI requesting packet P14, mobile terminal 40c generates RSSI response packet P15 including the RSSI information stored in mobile terminal 40c, and transmits RSSI response packet P15 to lighting apparatus 30a.

Lighting apparatus 30a collects the RSSI information from the collection target nodes, and transmits RSSI collection result indication packet P16 including the collected RSSI information to access point 20. In response to reception of RSSI collection result indication packet P16, access point 20 generates RSSI collection result indication command C5 with the RSSI information included in RSSI collection result indication packet P16, and transmits RSSI collection result indication command C5 to lighting control apparatus 10.

In response to reception of RSSI collection result indication command C5, lighting control apparatus 10 generates RSSI collection request command C6 in order to collect the RSSI information from the radio nodes other than the sub radio nodes. RSSI collection request command C6 includes the IDs of lighting apparatus 30b and mobile terminal 40b, which are the radio nodes other than the sub radio nodes, in the collection target ID list. Lighting control apparatus 10 then transmits the generated RSSI collection request command C6 to access point 20.

In response to reception of RSSI collection request command C6, access point 20 collects the RSSI information from the collection target nodes (e.g., lighting apparatuses 30b and mobile terminal 40b) whose IDs are on the collection target ID list included in RSSI collection request command C6.

Access point 20 transmits RSSI request packet P17 to lighting apparatus 30b in order to collect the RSSI information from lighting apparatus 30b. In response to reception of RSSI request packet P17, lighting apparatus 30b generates RSSI response packet P18 including the RSSI information stored in lighting apparatus 30b, and transmits RSSI response packet P18 to access point 20.

Likewise, access point 20 transmits RSSI request packet P19 to mobile terminal 40b in order to collect the RSSI information from mobile terminal 40b. In response to reception of RSSI request packet P19, mobile terminal 40b generates RSSI response packet P20 including the RSSI information stored in mobile terminal 40b, and transmits RSSI response packet P20 to access point 20.

Access point 20 collects the RSSI information from the collection target nodes, and transmits RSSI collection result indication command C7 including the collected RSSI information to lighting control apparatus 10. Lighting control apparatus 10 then estimates the positions of the radio nodes based on the collected RSSI information. Position estimation system 100 terminates the processing afterward.

According to Embodiment 1, the total transmission time of access point 20 can be reduced by causing lighting apparatus 30 to perform the function of collecting the RSSI information as a substitute. In addition, since lighting apparatus 30 is installed on the ceiling, it is unlikely to have an obstruction between itself and a person carrying mobile terminal 40. Thus, using the RSSI information collected by lighting apparatus 30 allows lighting control apparatus 10 to improve accuracy in the position estimation.

Further, according to Embodiment 1, position estimation system 100 can be configured by a single radio network (e.g., network ID: "20"), and can be managed by access point 20 using the single radio network. Access point 20 can thus transmit lighting control signals directly to lighting apparatus 30, or collect the RSSI directly from lighting apparatus 30 and mobile terminal 40. In addition, the handover processing due to the movement of mobile terminal 40 can be eliminated. This prevents the change of the network ID caused by the handover processing. Furthermore, even when mobile terminals 40 concentrate in single area A1 or A2 and it increases the number of packet transmissions for acquiring the RSSI information, it is possible to cause lighting apparatus 30 to perform the function of collecting the RSSI information as a substitute without changing the network address. This prevents, avoids, or decreases concentration of the transmission in the access point.

Variations of Embodiment 1

Although single lighting apparatus 30a (30b) is installed in each area A1 (A2) in Embodiment 1 described above, it is also conceivable to install two or more lighting apparatuses 30 in a single area as a variation. When two or more lighting apparatuses 30 are installed in each area, lighting control apparatus 10 may select a predetermined master for each area, or may select lighting apparatus 30 that best estimates the positions of mobile terminals 40 as a master.

In Embodiment 1 described above, the threshold of the remaining transmission time is 180 seconds, which is half of the total transmission time of 360 seconds in the specified low power radio using the 920 MHz band. However, it is also conceivable as a variation that lighting control apparatus 10 changes the threshold of the remaining transmission time according to moving history of mobile terminal 40. The threshold of the remaining transmission time may be changed based on the amount of the movement of the mobile terminal per hour, for example.

In the example illustrated in FIG. 12, lighting control apparatus 10 collects the RSSI information directly or indirectly from the radio nodes included in areas A1 and A2 via access point 20. Alternatively, lighting control apparatus 10 may collect the RSSI information directly or indirectly from some of the radio nodes included in areas A1 and A2 via access point 20, as a variation. Some of the radio nodes are, for example, mobile terminals 40a, 40b, and 40c included in areas A1 and A2.

Embodiment 1 has described the case where lighting apparatus 30 serves as the radio node (anchor node) located in a known position. A variation is also conceivable, however, where another apparatus installed in a fixed position indoors serves as the anchor node. Such an apparatus may include, for example, a speaker, a fire alarm, an alarm annunciator, an emergency light, a clock, an air purifier, or an air conditioner. Further, both the lighting apparatus and such an apparatus may be used together.

In Embodiment 1 described above, lighting control apparatus 10 transmits RSSI collection substitution indication command C4, receives RSSI collection result indication command C5, transmits RSSI collection request command C6, and receives RSSI collection result indication command C7, as illustrated in FIG. 12. However, RSSI collection substitution indication command C4 and RSSI collection request command C6 may be transmitted in reverse order as a variation. Further, RSSI collection substitution indication command C4 and RSSI collection request command C6 may be transmitted simultaneously as still another variation.

In Embodiment 1 described above, wired communicator 11 (see FIG. 3) of lighting control apparatus 10 performs wired communication with wired communicator 23 (see FIG. 4) of access point 20. It is also conceivable as an alternative that lighting control apparatus 10 and access point 20 perform radio communication.

In Embodiment 1 described above, lighting control apparatus 10 and access point 20 are provided separately as illustrated in FIG. 1. However, some or all of the components of lighting control apparatus 10 may be integrated with access point 20 as a variation.

Summary of Embodiment 1

A position estimation system according to the present disclosure includes: a first radio node, which in operation, forms a radio area; one or more second radio nodes, which in operation, move within the radio area; a plurality of third radio nodes installed in the radio area; and a position estimation apparatus, which in operation, estimates positions of the one or more second radio nodes based on information that is collected by the first radio node and indicates radio reception quality at the one or more second radio nodes and the plurality of third radio nodes, wherein, the position estimation apparatus comprises: determination circuitry, which, in operation, determines a division area where information including the radio reception quality at the one or more second radio nodes is collected by a substitute for the first radio node, based on information on a time resource capacity for radio communication with the one or more second radio nodes in each of a plurality of the division areas into which the radio area is divided; and transmission circuitry, which, in operation, transmits, to any of the plurality of third radio nodes installed in the determined division area, an indication for collecting the radio reception quality at the one or more second radio nodes located in the determined division area.

In the position estimation system, the plurality of third radio nodes each have a communication area including at least one of the plurality of division areas, and a threshold is specified for each of the at least one of the plurality of division areas, at least one of the plurality of third radio nodes is selected for each division area, and the transmission circuitry transmits the indication to the at least one of the plurality of selected third radio nodes when the time resource capacity exceeds the threshold specified for each division area.

In the position estimation system, the time resource capacity is proportional to a number of the one or more second radio nodes located in each division area.

In the position estimation system, the time resource capacity is proportional to a sum of weightings applied to the one or more second radio nodes.

In the position estimation system, the first radio node is an access point, and the transmission circuitry transmits the indication to the plurality of third radio nodes in accordance with a total transmission time of the access point.

In the position estimation system, the plurality of third radio nodes are lighting apparatuses.

In the position estimation system, the information indicating the radio reception quality is a Received Signal Strength Indicator (RSSI).

A position estimation apparatus according to the present disclosure includes: determination circuitry, which, in operation, determines a division area where information including radio reception quality at one or more second radio nodes that move within a radio area is collected by a substitute for a first radio node that forms the radio area, based on information on a time resource capacity for radio communication with the one or more second radio nodes in each of a plurality of the division areas into which the radio area is divided; transmission circuitry, which, in operation, transmits, to at least one of a plurality of third radio nodes installed in the determined division area among the plurality of third radio nodes installed in the radio area, an indication for collecting the radio reception quality at the one or more second radio nodes located in the determined division area; and estimation circuitry, which, in operation, estimates positions of the one or more second radio nodes using information indicating the radio reception quality at the one or more second radio nodes, the information being collected by the at least one of the plurality of third radio nodes that has received the indication.

A position estimation apparatus according to the present disclosure includes: determining a division area where information including radio reception quality at one or more second radio nodes that move within a radio area is collected by a substitute for a first radio node that forms the radio area, based on information on a time resource capacity for radio communication with the one or more second radio nodes in each of a plurality of the division areas into which the radio area is divided; transmitting, to at least one of a plurality of third radio nodes installed in the determined division area among the plurality of third radio nodes installed in the radio area, an indication for collecting the radio reception quality at the one or more second radio nodes located in the determined division area; and estimating positions of the one or more second radio nodes using information indicating the radio reception quality at the one or more second radio nodes, the information being collected by the at least one of the plurality of third radio nodes that has received the indication.

Embodiment 2

The present disclosure relates to a position estimation apparatus, a position estimation system, and a position estimation method.

In recent years, there has been a growing need for estimating a position of a radio communication terminal carried by a user moving indoors using a lighting fixture installed indoors. An exemplary system that has been proposed is a system estimating a position of a mobile terminal present in a communication area using a lighting fixture that is installed in a predefined position and has a radio communication apparatus mounted thereon (PTL 2).

One non-limiting and exemplary embodiment facilitates providing an improved position estimation apparatus, position estimation system, and position estimation method each estimating a position of a radio communication terminal using a plurality of radio communication apparatuses.

A position estimation apparatus according to the present disclosure adopts a configuration including: selection circuitry, which, in operation, selects, in a terminal mode where first positions of a plurality of first radio communication apparatuses are estimated by a second radio communication apparatus, a first radio communication apparatus group including at least one of the plurality of first radio communication apparatuses from the plurality of first radio communication apparatuses based on the first positions and first reception quality information of first radio signals transmitted from the plurality of first radio communication apparatuses at the second radio communication apparatus; control circuitry, which, in operation, generates a signal indicating, to the first radio communication apparatus group, a switch from the terminal mode to an anchor mode of estimating a second position of a third radio communication apparatus; and estimation circuitry, which, in operation, estimates the second position of the third radio communication apparatus based on the first positions of the plurality of first radio communication apparatuses included in the first radio communication apparatus group estimated in the terminal mode and second reception quality information of a second radio signal transmitted from the third radio communication apparatus at the second radio communication apparatus and the first radio communication apparatus group in the anchor mode.

A position estimation system according to the present disclosure adopts a configuration including: a plurality of first radio communication apparatuses that transmit first radio signals; a second radio communication apparatus that measures first reception quality information of the first radio signals transmitted from the plurality of first radio communication apparatuses; a third radio communication apparatus that transmits a second radio signal; and a control apparatus that selects, in a terminal mode where first positions of the plurality of first radio communication apparatuses are estimated by the second radio communication apparatus, a first radio communication apparatus group including at least one of the plurality of first radio communication apparatuses from the plurality of first radio communication apparatuses based on the first positions and the first reception quality information, indicates, to the first radio communication apparatus group, a switch from the terminal mode to an anchor mode of estimating a second position of the third radio communication apparatus, and estimates the second position of the third radio communication apparatus based on the first positions of the plurality of first radio communication apparatuses included in the first radio communication apparatus group estimated in the terminal mode and second reception quality information of the second radio signal transmitted from the third radio communication apparatus at the second radio communication apparatus and the first radio communication apparatus group in the anchor mode.

A position estimation method according to the present disclosure adopts a configuration including: selecting, in a terminal mode where first positions of a plurality of first radio communication apparatuses are estimated by a second radio communication apparatus, a first radio communication apparatus group including at least one of the plurality of first radio communication apparatuses from the plurality of first radio communication apparatuses based on the first positions and first reception quality information of first radio signals transmitted from the plurality of first radio communication apparatuses at the second radio communication apparatus; generating a signal indicating, to the first radio communication apparatus group, a switch from the terminal mode to an anchor mode of estimating a second position of a third radio communication apparatus; and estimating the second position of the third radio communication apparatus based on the first positions of the plurality of first radio communication apparatuses included in the first radio communication apparatus group estimated in the terminal mode and second reception quality information of a second radio signal transmitted from the third radio communication apparatus at the second radio communication apparatus and the first radio communication apparatus group in the anchor mode.

It should be noted that general or specific embodiments may be implemented as a system, an apparatus, a method, an integrated circuit, a computer program, a storage medium, or any selective combination thereof.

According to a non-limiting embodiment of the present disclosure, it is possible to provide an improved position estimation apparatus, position estimation system, and position estimation method each estimating a position of a radio communication terminal using a plurality of radio communication apparatuses.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

In a terminal position estimation system using radio communication, the position estimation accuracy improves with more radio communication apparatuses (hereinafter, referred to as anchors) whose installation positions are known and used as reference positions of the position estimation. In the position estimation system disclosed in PTL 2, however, it is difficult to increase the number of the anchors to be used for estimating a position of a mobile terminal from the initial installation of the system.

The present disclosure makes it possible to increase the number of anchors with high reliability for position estimation and improve accuracy in the position estimation for a mobile terminal.

Hereinafter, Embodiment 2 will be described in detail with reference to the accompanying drawings. Note that the embodiments to be described below are merely examples, and the present disclosure is not limited by the following embodiments.

Description of Embodiment 2

<Configuration of Position Estimation System>

An exemplary configuration of a position estimation system according to Embodiment 2 will be described with reference to FIG. 15.

Figure 15:
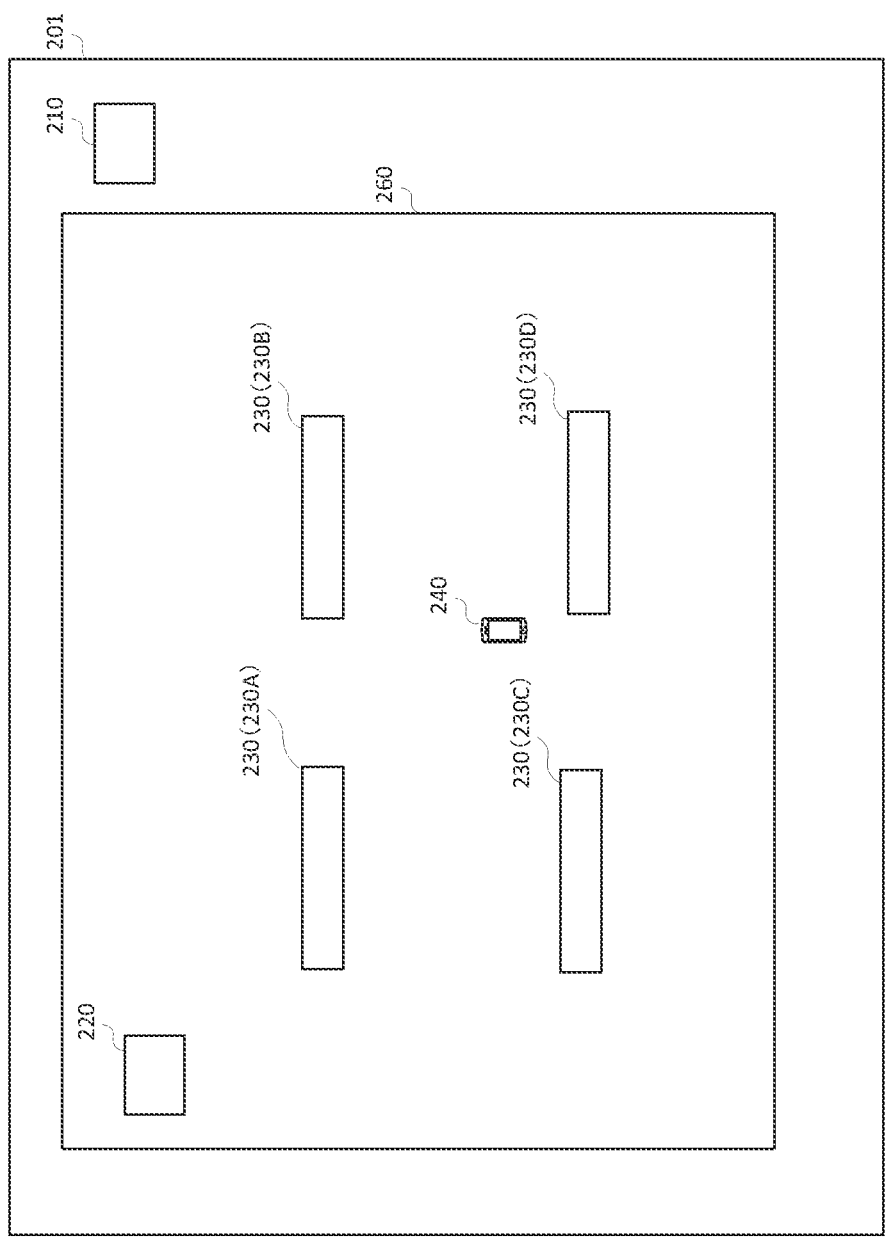
FIG. 15 illustrates an exemplary configuration of a position estimation system according to Embodiment 2.

FIG. 15 illustrates an exemplary configuration of position estimation system 201 according to Embodiment 2. Position estimation system 201 includes control apparatus (position estimation apparatus) 210, anchor (second radio communication apparatus) 220, a plurality of lighting fixtures (a plurality of first radio communication apparatuses) 230 (230A to 230D), and mobile terminal (third radio communication apparatus) 240. The configurations of control apparatus 210, anchor 220, lighting fixture 230, and mobile terminal 240 will be described later in detail with reference to FIGS. 17 to 20 respectively.

Hereinafter, Embodiment 2 will be described with four lighting fixtures 230A to 230D by way of example, although the number of lighting fixtures 230 may be any number equal to or greater than two. Estimation area 260 is any indoor or outdoor area where position estimation for lighting fixtures 230 or mobile terminal 240 is to be performed.

<Overview of Position Estimation System>

Position estimation system 201 estimates positions of lighting fixtures 230 each including a radio communication terminal and a position of mobile terminal 240. For example, a plurality of lighting fixtures 230 installed on an indoor ceiling may be used as anchors.

In position estimation system 201, anchor 220 is capable of performing radio communication with control apparatus 210. The plurality of lighting fixtures 230 are installed based on a predefined lighting layout (a plurality of installation positions). The plurality of lighting fixtures 230 are installed in a grid at regular intervals on a ceiling of an office, for example. Each of the plurality of lighting fixtures 230 may be installed in any position of the lighting layout in an initial state of position estimation system 201, and the installation position may be unknown.

Position estimation for radio communication terminals (lighting fixtures 230 or mobile terminal 240) is performed based on reception quality information of radio signals transmitted to and received from anchor 220 and the installation positions of lighting fixtures 230. The position of the radio communication terminal can be estimated by, for example, determining distances to at least three anchors based on reception strength information, and using three-point positioning. More anchors make it easier to improve the accuracy in the position estimation.

Processing in the position estimation system is composed of the following three main phases. In phase 1, positions of lighting fixtures 230 are estimated using anchor 220. In phase 2, an additional anchor is selected from lighting fixtures 230. In phase 3, a position of mobile terminal 240 is estimated using anchor 220 and the additional anchor. Phases 1, 2, and 3 are performed in this order.

In phase 1, the reception strength information between anchor 220 and the plurality of lighting fixtures 230 is collected and the positions of lighting fixtures 230 are estimated based on the collected reception strength information. Control apparatus 210 individually transmits a call signal (e.g., request signal for transmitting a lighting fixture ID) to lighting fixtures 230. The ID here is a specific identifier or specific identification information for identifying the radio communication apparatus (anchor 220, lighting fixtures 230, and mobile terminal 240). Lighting fixtures 230 transmit response signals in response to reception of the call signals. Anchor 220 receives (intercepts) the response signals, and can measure reception quality information between itself and lighting fixtures 230 based on the intercepted response signals. Control apparatus 210 collects the reception quality information from anchor 220, and estimates the positions of lighting fixtures 230 based on the collected reception quality information. Hereafter, phase 1 is referred to as lighting layout estimation.

In phase 2, control apparatus 210 selects lighting fixture 230 that can be used as the additional anchor from lighting fixtures 230 whose positions have been estimated in phase 1, based on reliability of lighting fixtures 230. The reliability of lighting fixtures 230 is described later with reference to FIG. 27 to FIG. 30C. For example, control apparatus 210 determines the reliability of each lighting fixture 230 based on a position estimation result of lighting fixtures 230 and the predefined lighting layout. For a certain lighting fixture 230, for example, the reliability of the position estimation is determined to be high when the predefined lighting layout and the estimation result have a small error (difference). Control apparatus 210 then selects a predetermined number of lighting fixtures 230 with high reliability. Next, control apparatus 210 instructs the selected lighting fixtures 230 to operate as the additional anchors. This allows using lighting fixtures 230 determined to have high reliability as the additional anchors in phase 3.

In phase 3, control apparatus 210 estimates the position of mobile terminal 240 using anchor 220, which is used in phase 1, and the additional anchors (lighting fixtures 230 selected in phase 2). Lighting fixtures 230 selected in phase 2 operate as the anchors. As in phase 1, control apparatus 210 transmits a call signal (e.g., request signal for transmitting a mobile terminal ID) to mobile terminal 240. Mobile terminal 240 transmits a response signal in response to reception of the call signal. The anchors receive (intercept) the response signal, and can measure reception quality information between themselves and mobile terminal 240 based on the intercepted response signal. Control apparatus 210 collects the reception quality information from the anchors, and estimates the position of mobile terminal 240 based on the collected reception quality information. Hereinafter, phase 3 is referred to as mobile terminal position estimation.

<Procedure for Measuring Reception Quality Information Required for Position Estimation>

A procedure for measuring the reception quality information to be used for estimating the positions of lighting fixtures 230 or mobile terminal 240 will be described.

First, control apparatus 210 transmits a request signal for starting reception quality information measurement to anchor 220. The request signal for starting reception quality information measurement is a signal causing an addressed radio communication apparatus to start interception of a communication signal between control apparatus 210 or anchor 220 and lighting fixtures 230 or mobile terminal 240 in a radio communication section. In response to reception of the request signal for starting reception quality information measurement, anchor 220 measures the reception quality information of the radio communication signal intercepted in the radio communication section, and stores the reception quality information linking with an ID included in the radio communication signal.

Control apparatus 210 then transmits a request signal for transmitting a lighting fixture ID or a request signal for transmitting a mobile terminal ID to lighting fixtures 230 or mobile terminal 240. The request signal for transmitting a lighting fixture ID or the request signal for transmitting a mobile terminal ID is a signal for a terminal with an unknown ID to request transmission of the ID by control apparatus 210 in order to establish communication for measuring the reception quality information.

In response to reception of the request signal for transmitting a lighting fixture ID or the request signal for transmitting a mobile terminal ID, lighting fixtures 230 or mobile terminal 240 performs response transmission of a signal including the ID of lighting fixtures 230 or mobile terminal 240 to the control apparatus.

Control apparatus 210 then transmits a request signal for transmitting a measurement result to the anchor. The request signal for transmitting a measurement result is a signal for requesting transmission, to control apparatus 210, of the IDs and the reception quality information (hereinafter, collectively referred to as a measurement result) stored after the anchor receives the request signal for starting reception quality information measurement.

In response to reception of the request signal for transmitting a measurement result, the anchor performs response transmission of the stored measurement result to control apparatus 210.

In the following, the present disclosure will be described by taking a Received Signal Strength Indicator (RSSI) as an example of the reception quality information, but the reception quality information may include a Signal-Noise Ratio (SNR), a Signal-to-Interference plus Noise power Ratio (SINR), or a packet error rate.

<Processing in Position Estimation System>

Processing in position estimation system 201 according to Embodiment 2 will be described with reference to FIG. 16.

Figure 16:
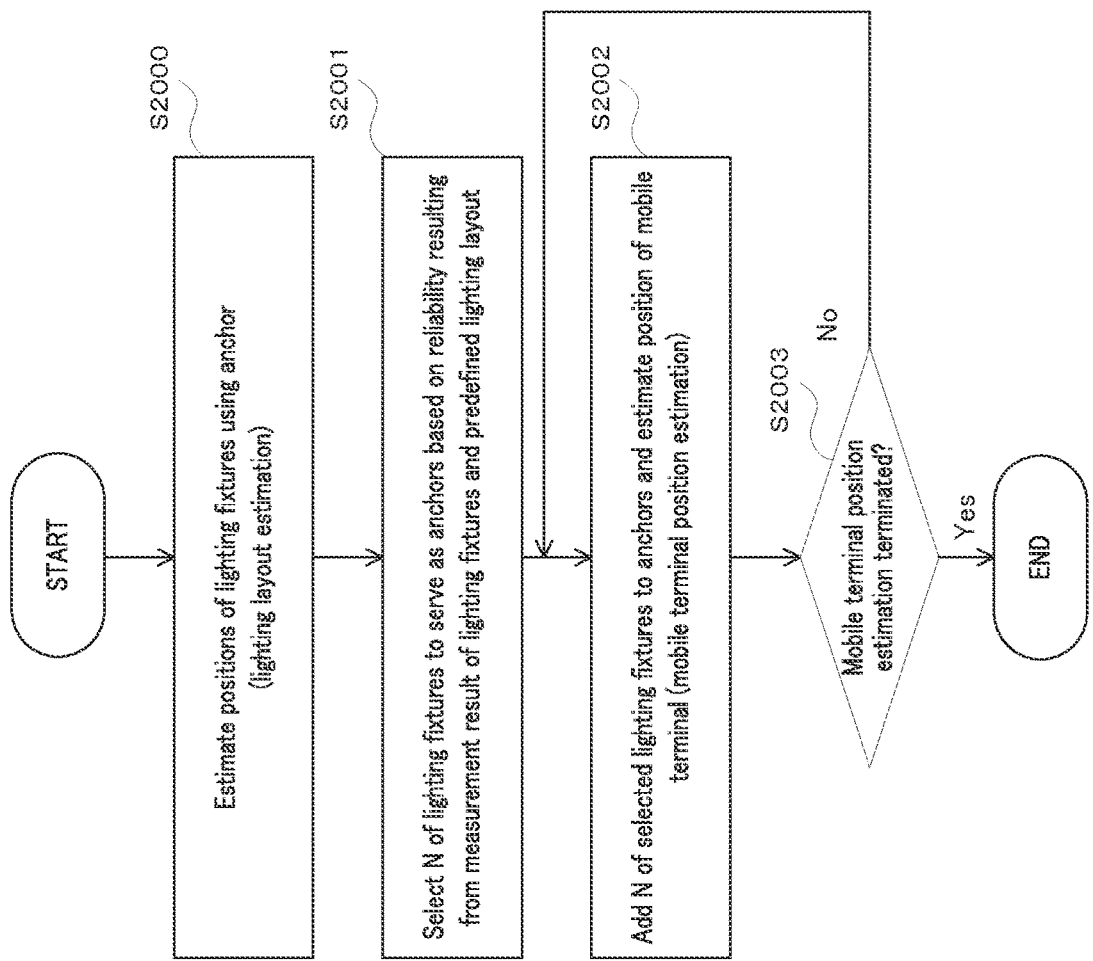
FIG. 16 is a flowchart describing exemplary processing in the position estimation system according to Embodiment 2.

FIG. 16 is a flowchart describing exemplary processing in position estimation system 201 according to Embodiment 2.

In step S2000, control apparatus 210 performs position estimation for lighting fixtures 230 using the measurement result (first reception quality information) collected based on the radio communication with lighting fixtures 230 installed in a known position (first position). Step S2000 corresponds to the lighting layout estimation in phase 1 described above.

In step S2001, control apparatus 210 determines reliability of each lighting fixture 230 using the result of the position estimation and the predefined lighting layout information. Control apparatus 210 then selects N of lighting fixtures 230 (first radio communication apparatus group) to be used as anchors for the mobile terminal position estimation in step S2002 based on the determined reliability. Herein, the N represents an integer equal to or greater than 1. Step S2001 corresponds to phase 2 described above.

In step S2002, control apparatus 210 performs the position estimation for mobile terminal 240 (second position estimation) using the measurement result (second reception quality information) collected based on the radio communication between mobile terminal 240 and anchor 220 on one hand and the N of lighting fixtures 230 selected in step S2001 on the other. Step S2002 corresponds to the mobile terminal position estimation in phase 3 described above.

In step S2003, control apparatus 210 determines whether to terminate the mobile terminal position estimation. When mobile terminal position estimation is terminated (Yes in step S2003), control apparatus 210 terminates the processing. When the mobile terminal position estimation is continued (No in step S2003), in contrast, control apparatus 210 returns the processing to step S2002.

Note that steps S2002 and S2003 may be performed by replacing all or some of anchors 220 with the N of lighting fixtures selected in step S2001.

<Control Apparatus>

Control apparatus 210 performs radio communication with anchor 220, lighting fixtures 230, and mobile terminal 240. Control apparatus 210 also controls the measurement of the reception quality information used for the position estimation, collects the measurement result, and estimates the positions of lighting fixtures 230 and mobile terminal 240 based on the measurement result. In addition, control apparatus 210 determines reliability of each lighting fixture 230, and controls the operations of lighting fixtures 230 based on the reliability. A reliability determination method and a procedure for controlling the operations of lighting fixtures 230 based on the reliability will be described later with reference to FIGS. 27 and 28.

Figure 17:
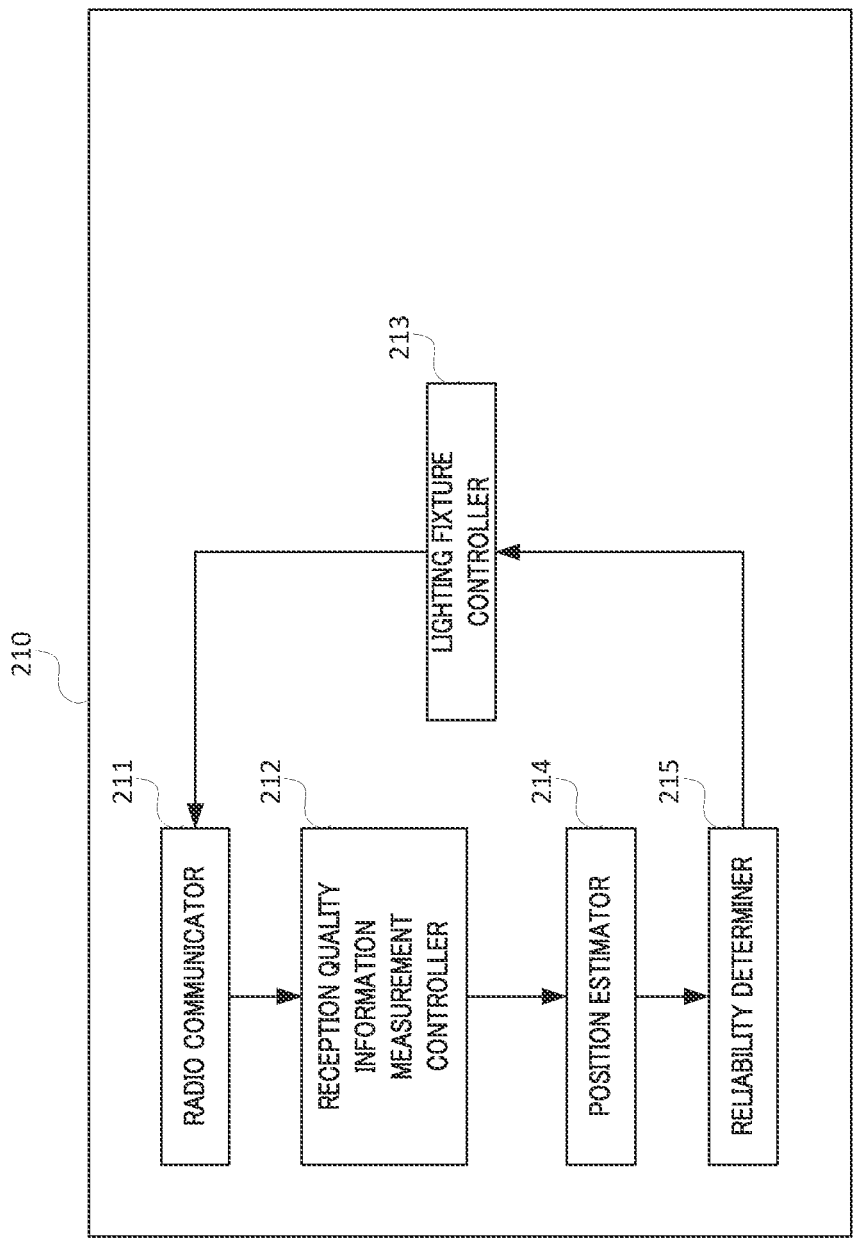
FIG. 17 is a block diagram illustrating an exemplary configuration of a control apparatus according to Embodiment 2.

FIG. 17 is a block diagram illustrating an exemplary configuration of control apparatus 210 according to Embodiment 2. Control apparatus 210 includes radio communicator (communication circuitry) 211, reception quality information measurement controller 212, lighting fixture controller 213, position estimator (estimation circuitry) 214, and reliability determiner (selection circuitry) 215.

Radio communicator 211 performs radio communication with anchor 220, lighting fixtures 230, and mobile terminal 240. In a case of communicating with lighting fixtures 230 or mobile terminal 240, radio communicator 211 transmits the request signal for transmitting a lighting fixture ID or the request signal for transmitting a mobile terminal ID. The radio communication method is, for example, a wireless LAN, Bluetooth (registered trademark), or an LPWA. By way of example, radio communicator 211 includes a function (e.g., an access point) for managing a network.

Reception quality information measurement controller 212 controls the communication between radio communicator 211 and anchor 220 on one hand and lighting fixtures 230 on the other in order to collect the reception quality information used for the layout estimation for lighting fixtures 230 or the position estimation for mobile terminal 240. Reception quality information measurement controller 212 causes anchor 220 or lighting fixtures 230 to start the interception of transmission signals of lighting fixtures 230 or mobile terminal 240 and the measurement of the reception quality information, by transmitting the request signal for starting reception quality information measurement. Reception quality information measurement controller 212 also collects the measurement result of the reception quality information by transmitting the request for transmitting a measurement result to anchor 220 or lighting fixtures 230.

Position estimator 214 estimates the positions of lighting fixtures 230 or mobile terminal 240 based on the measurement result of the reception quality information collected by reception quality information measurement controller 212. For example, position estimator 214 estimates distances between anchor 220 and lighting fixtures 230 based on the reception quality information from anchor 220 or lighting fixtures 230. Then, position estimator 214 calculates the positions of lighting fixtures 230 based on the known position of anchor 220 and the distances between anchor 220 and lighting fixtures 230.

Reliability determiner 215 determines, for each of lighting fixtures 230, a measure (hereinafter, reliability) indicating whether the lighting fixture 230 can be used as an anchor in the mobile terminal position estimation, based on the lighting layout indicating the installation positions of lighting fixtures 230 and the result of the position estimation for lighting fixtures 230 by position estimator 214. The reliability will be described later with reference to FIG. 27 to FIG. 30C. Reliability determiner 215 selects lighting fixtures 230 to be used as anchors based on the reliability.

Lighting fixture controller 213 controls lighting fixtures 230 to switch between an operation for the lighting layout estimation and an operation for the mobile terminal position estimation. The operation for the lighting layout estimation includes the operation of measuring the reception quality information (terminal mode). The operation for the mobile terminal position estimation includes the operation as an anchor (anchor mode). Lighting fixture controller 213 transmits a request signal for switching the operation modes to lighting fixtures 230 based on the reliability determined by reliability determiner 215. The request signal for switching the operation modes is a signal indicated by control apparatus 210 whether lighting fixtures 230 function as anchors in the mobile terminal position estimation. By way of example, lighting fixture controller 213 turns lighting fixtures 230 on/off and performs light control and color control.

<Anchor>

As mentioned above, anchor 220 is a radio communication apparatus, and its known installation position is used as a reference position in the position estimation for lighting fixtures 230 and mobile terminal 240. Anchor 220 measures the reception quality information by intercepting signals from lighting fixtures 230 and mobile terminal 240, and transmits the measurement result to control apparatus 210. Although single anchor 220 is illustrated in FIG. 15, there may be any number of anchors 220. In addition, anchor 220 may be substituted with at least one of lighting fixtures 230 with known installation positions.

Figure 18:
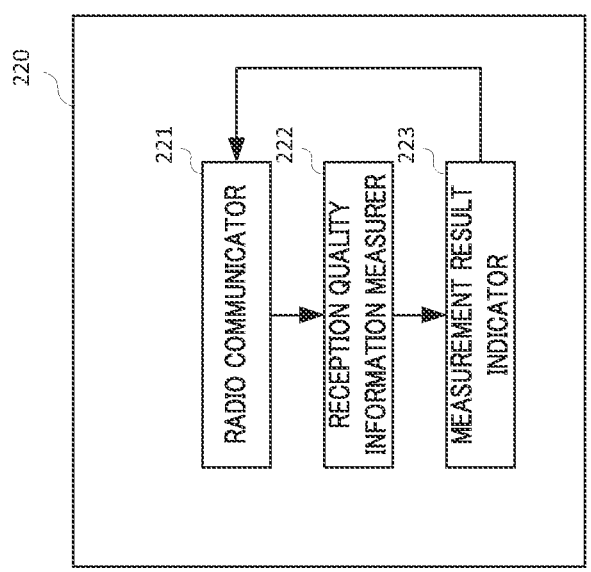
FIG. 18 is a block diagram illustrating an exemplary configuration of an anchor according to Embodiment 2.

FIG. 18 is a block diagram illustrating an exemplary configuration of anchor 220 according to Embodiment 2. Anchor 220 includes radio communicator 221, reception quality information measurer 222, and measurement result indicator 223.

Radio communicator 221 performs radio communication with control apparatus 210. Radio communicator 221 also receives (intercepts) a transmission signal of lighting fixtures 230 or mobile terminal 240.

Reception quality information measurer 222 measures the reception quality information by intercepting the transmission signals of lighting fixtures 230 or mobile terminal 240.

Measurement result indicator 223 transmits the reception quality information measured by reception quality information measurer 222 to control apparatus 210 via radio communicator 221.

<Lighting Fixture>

Lighting fixtures 230 (230A to 230D) are installed based on predefined lighting layout information.

In the lighting layout estimation, lighting fixtures 230 are position estimation targets. Lighting fixtures 230 communicate with control apparatus 210 or anchor 220, and the positions in the predefined lighting layout are estimated by control apparatus 210. That is, lighting fixtures 230 are the targets of the position estimation in the lighting layout estimation. Control apparatus 210 determines whether to use lighting fixtures 230 as anchors for the mobile terminal position estimation, based on the position estimation result of the lighting layout estimation.

Then, lighting fixtures 230 used as anchors in the mobile terminal position estimation receive (intercept) a radio communication signal from mobile terminal 240 according to an indication from control apparatus 210, measure the reception quality information, and transmit the measurement result to control apparatus 210.

Figure 19:
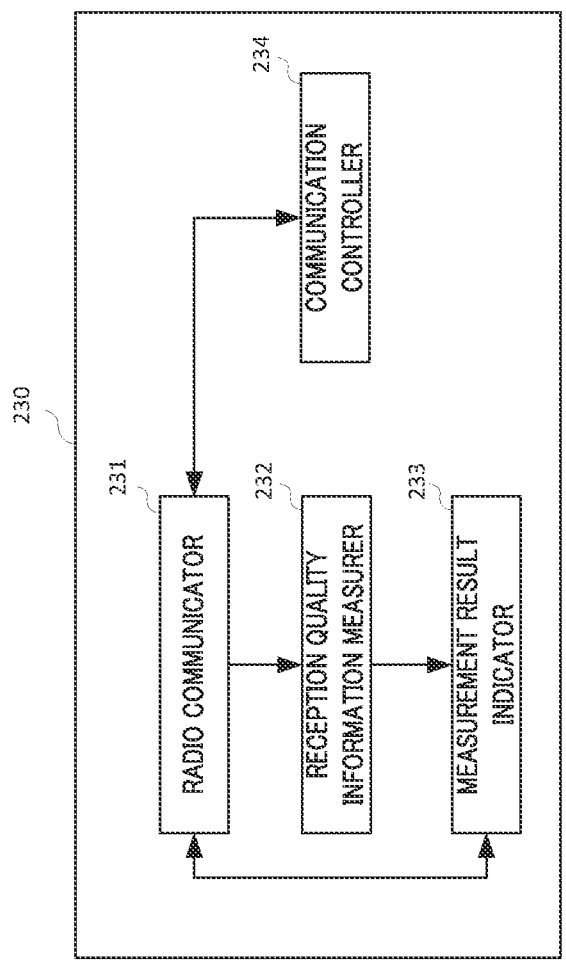
FIG. 19 is a block diagram illustrating an exemplary configuration of a lighting fixture according to Embodiment 2.

FIG. 19 is a block diagram illustrating an exemplary configuration of a radio communication apparatus included in lighting fixture 230 (230A to 230D) according to Embodiment 2. Note that lighting parts are not illustrated.

Lighting fixture 230 includes radio communicator 231, reception quality information measurer 232, measurement result indicator 233, and communication controller 234.

Radio communicator 231 performs radio communication with control apparatus 210, anchor 220, or mobile terminal 240.

Reception quality information measurer 232 starts measuring the reception quality information of a signal transmitted by mobile terminal 240 in lighting fixture 230, in response to reception of the request signal for starting reception quality information measurement from control apparatus 210.

Measurement result indicator 233 generates a signal including the reception quality information measured by reception quality information measurer 232, and transmits the signal to control apparatus 210 via radio communicator 231. Hereinafter, the present disclosure will be described using a packet as an example of a signal. The timing at which measurement result indicator 233 generates the packet including the reception quality information may be based on a reception timing of a control signal from control apparatus 210, or may be based on an end timing of the reception quality information measurement by reception quality information measurer 232.

Communication controller 234 transmits the ID of lighting fixture 230 to control apparatus 210 in response to reception of the request for transmitting a lighting fixture ID from control apparatus 210. Communication controller 234 also starts reception of the request signal for starting reception quality information measurement from control apparatus 210 in response to reception of a lighting fixture control signal from control apparatus 210. The lighting fixture control signal here is a signal indicating, by control apparatus 210, that the operation mode of lighting fixture 230 switches from the lighting layout estimation to the mobile terminal position estimation. The lighting fixture control signal may be broadcasted, or may be transmitted by TDMA, for example, using the ID acquired in the lighting layout estimation.

The above description is exemplary operations of reception quality information measurer 232, measurement result indicator 233, and communication controller 234 when the lighting fixture control signal is received from control apparatus 210. Instead of the operations described above, communication controller 234 may receive the request signal for transmitting a lighting fixture ID after receiving the lighting fixture control signal, for example.

<Mobile Terminal>

Mobile terminal 240 is a radio communication apparatus that moves around in any positions in any paths. In the position estimation for mobile terminal 240, mobile terminal 240 communicates with control apparatus 210, anchor 220, or N of lighting fixtures 230 that are selected as anchors after the lighting layout estimation. Mobile terminal 240 may be carried by a person, or may be mounted on an automatic traveling machine or the like.

Figure 20:
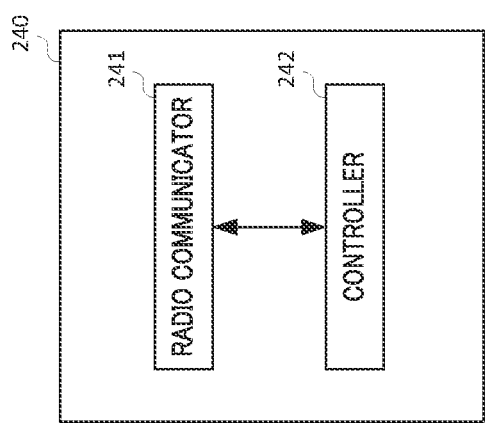
FIG. 20 is a block diagram illustrating an exemplary configuration of a mobile terminal according to Embodiment 2.

FIG. 20 is a block diagram illustrating an exemplary configuration of mobile terminal 240 according to Embodiment 2. Mobile terminal 240 includes radio communicator 241 and controller 242.

Radio communicator 241 performs radio communication with control apparatus 210, anchor 220, or lighting fixtures 230.

Controller 242 generates a packet including the ID of mobile terminal 240 in response to reception of the request for transmitting a mobile terminal ID from control apparatus 210, and transmits the packet to control apparatus 210 via radio communicator 241.

<Processing in Control Apparatus>

Figure 21A:
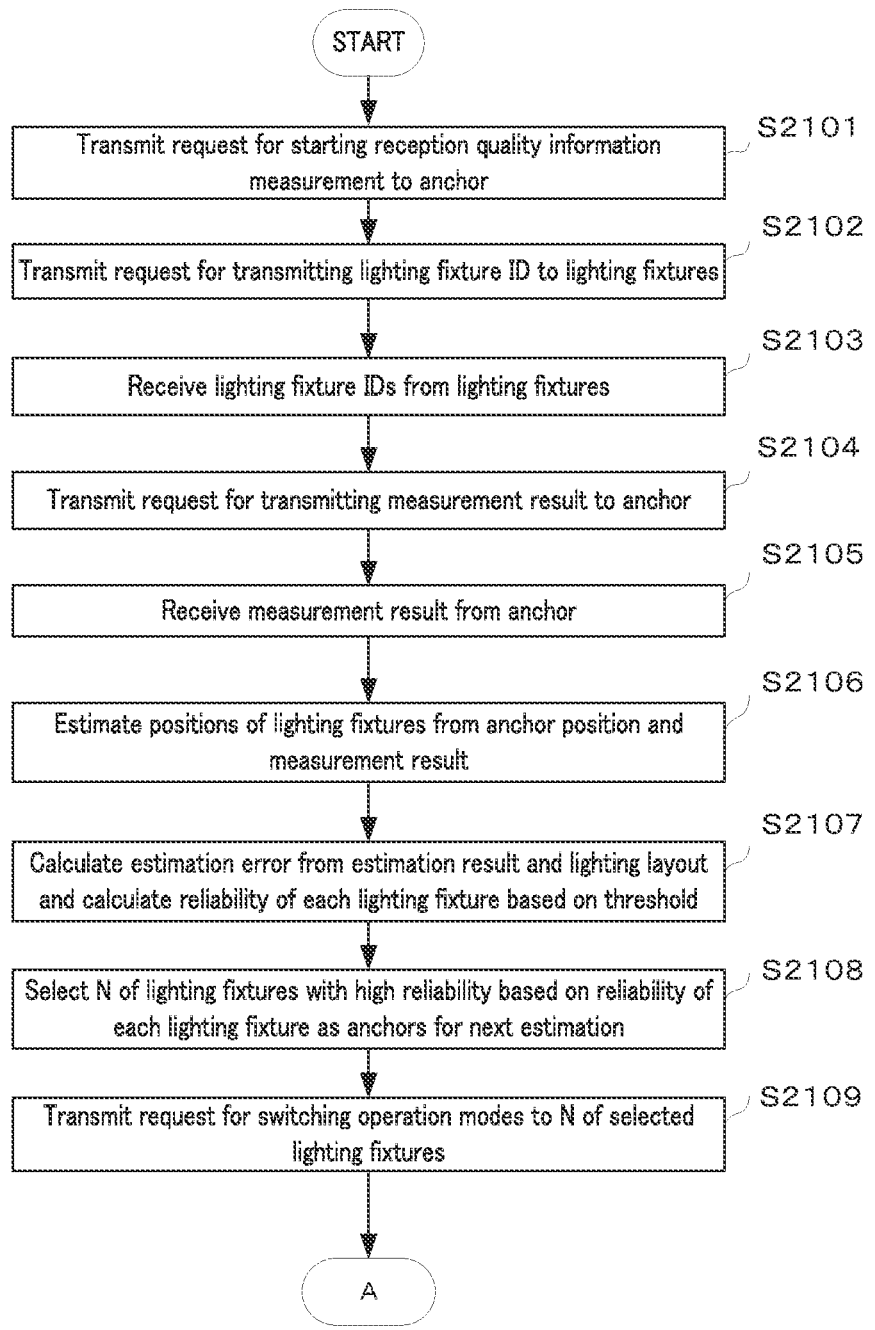
FIG. 21A is a flowchart describing exemplary processing in the control apparatus in lighting layout estimation according to Embodiment 2.

FIG. 21A is a flowchart describing exemplary processing in control apparatus 210 in the lighting layout estimation according to Embodiment 2.

In step S2101, control apparatus 210 transmits the request for starting reception quality information measurement to anchor 220. In response to reception of the request for starting reception quality information measurement, anchor 220 stands by for receiving transmission signals of lighting fixtures 230, and starts measuring the reception quality information.

In step S2102, control apparatus 210 broadcasts the request for transmitting a lighting fixture ID to lighting fixtures 230.

In step S2103, control apparatus 210 receives the lighting fixture IDs transmitted by lighting fixtures 230 in response to reception of the request for transmitting a lighting fixture ID. Steps S2102 and step S2103 are performed for measuring the reception quality information of the communication between anchor 220 and lighting fixtures 230.

In step S2104, control apparatus 210 transmits the request for transmitting a measurement result to anchor 220. The measurement result includes the lighting fixture IDs and the reception quality information measured by anchor 220 intercepting the lighting fixture IDs transmitted from lighting fixtures 230 in step S2103.

In step S2105, control apparatus 210 collects the measurement result received from anchor 220. The processes of the above-described steps S2101 to S2105 allow communication control for measuring the reception quality information required for estimating the positions of lighting fixtures 230.

In step S2106, control apparatus 210 estimates the positions of lighting fixtures 230 based on the known position of anchor 220 and the measurement result collected in step S2105.

In step S2107, control apparatus 210 determines the reliability of each lighting fixture 230 based on the predefined lighting layout information and the result of the position estimation for lighting fixtures 230. The processing contents of determining the reliability will be described later with reference to FIG. 27 to FIG. 30C.

In step S2108, control apparatus 210 selects the anchors from among lighting fixtures 230 based on the reliability determined in step S2107. By way of example, the selection criterion is whether the reliability is greater than or equal to a predetermined threshold. As another example, the selection criterion is N of lighting fixtures in descending order of the reliability. The N here is a preferred number N of anchors configured in advance.

In step S2109, control apparatus 210 transmits the request signal for switching the operation modes to the N of selected lighting fixtures 230 to indicate the operation as anchors in the mobile terminal position estimation. The processes of the above-described steps S2107 to S2109 add anchors to be used in the next phase of the mobile terminal position estimation, using the reliability determined through the process of linking the predefined lighting layout information with lighting fixtures 230.

Figure 21B:
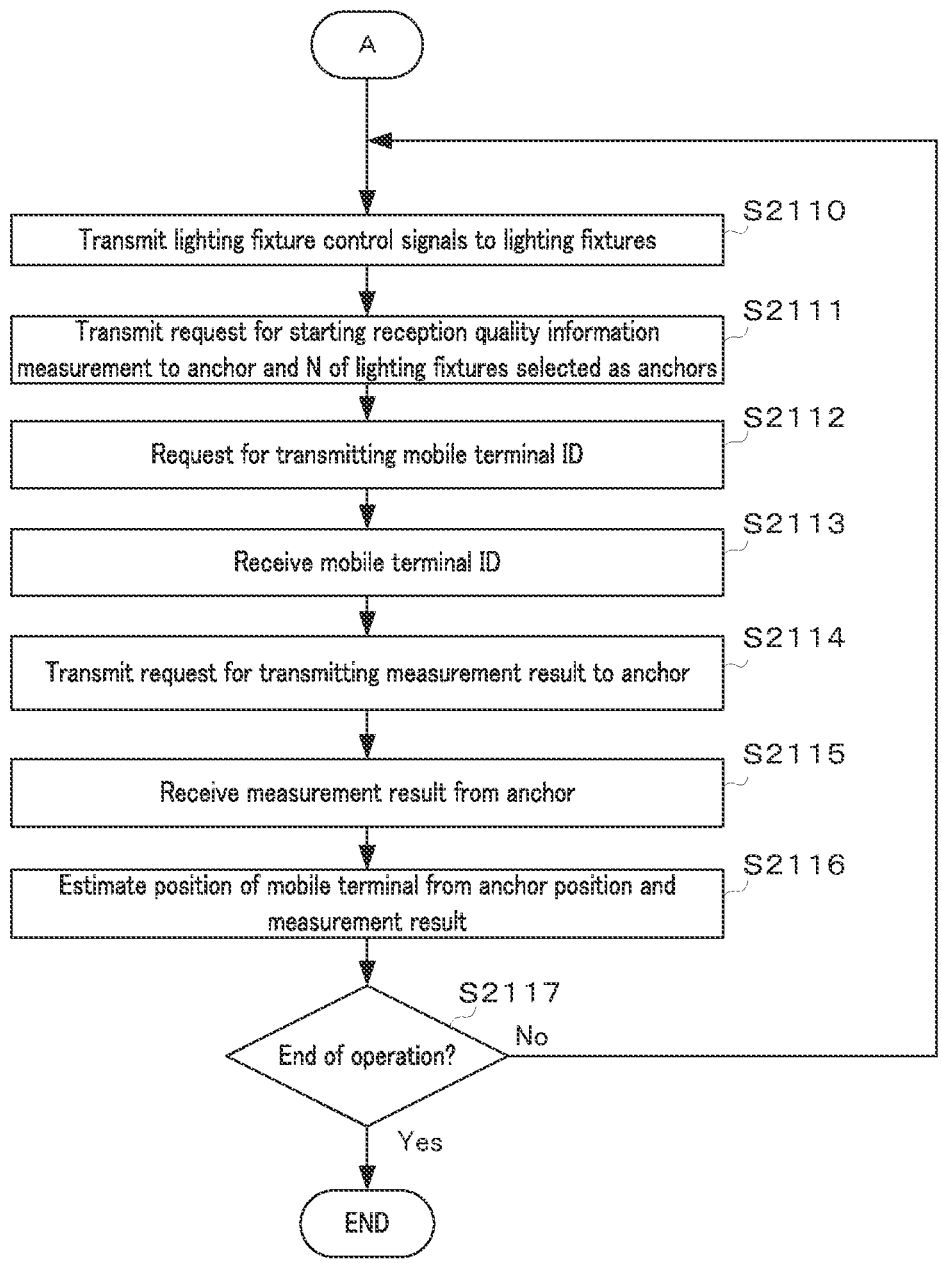
FIG. 21B is a flowchart describing exemplary processing in the control apparatus in mobile terminal position estimation according to Embodiment 2.

FIG. 21B is a flowchart describing exemplary processing in control apparatus 210 in the mobile terminal position estimation according to Embodiment 2.

In step S2110, control apparatus 210 transmits the lighting fixture control signals to lighting fixtures 230, and indicates the start of the position estimation for mobile terminal 240 according to the operation indicated in step S2109 described above with reference to FIG. 21A.

In step S2111, control apparatus 210 transmits the request for starting reception quality information measurement to anchor 220 and the N of lighting fixtures 230 selected as anchors in step S2108 described above with reference to FIG. 21A. In response to reception of the request for starting reception quality information measurement, anchor 220 and the N of lighting fixtures 230 selected as anchors in step S2108 stand by for receiving a transmission signal from mobile terminal 240, and start measuring the reception quality information.

In step S2112, control apparatus 210 broadcasts the request for transmitting a mobile terminal ID to mobile terminal 240.

In step S2113, control apparatus 210 receives the mobile terminal ID transmitted by mobile terminal 240 in response to reception of the request for transmitting a mobile terminal ID. Control apparatus 210 establishes communication with mobile terminal 240 to measure the reception quality information through the communication with mobile terminal 240 by the processes of steps S2112 and S2113.

In step S2114, control apparatus 210 transmits the request for transmitting a measurement result to anchor 220 and the N of lighting fixtures 230 selected as anchors in step S2108.

In step S2115, control apparatus 210 receives the ID and the reception quality information of mobile terminal 240 that are transmitted by anchor 220 and the N of lighting fixtures 230 selected as anchors in step S2108 in response to reception of the request for transmitting a measurement result, and collects the measurement result.

In step S2116, control apparatus 210 estimates the position of mobile terminal 240 based on the known installation position of anchor 220 and the measurement result collected in step S2115.

In step S2117, control apparatus 210 determines whether all measurements have been completed. When all the measurements have been completed (Yes in step S2117), control apparatus 210 terminates the processing. When all the measurements have not been completed (No in step S2117), in contrast, control apparatus 210 returns the processing to step S2110.

Control apparatus 210 estimates the position of mobile terminal 240 in estimation area 260 through the processes from step S2110 to step S2116 described above.

<Processing in Anchor>

Figure 22:
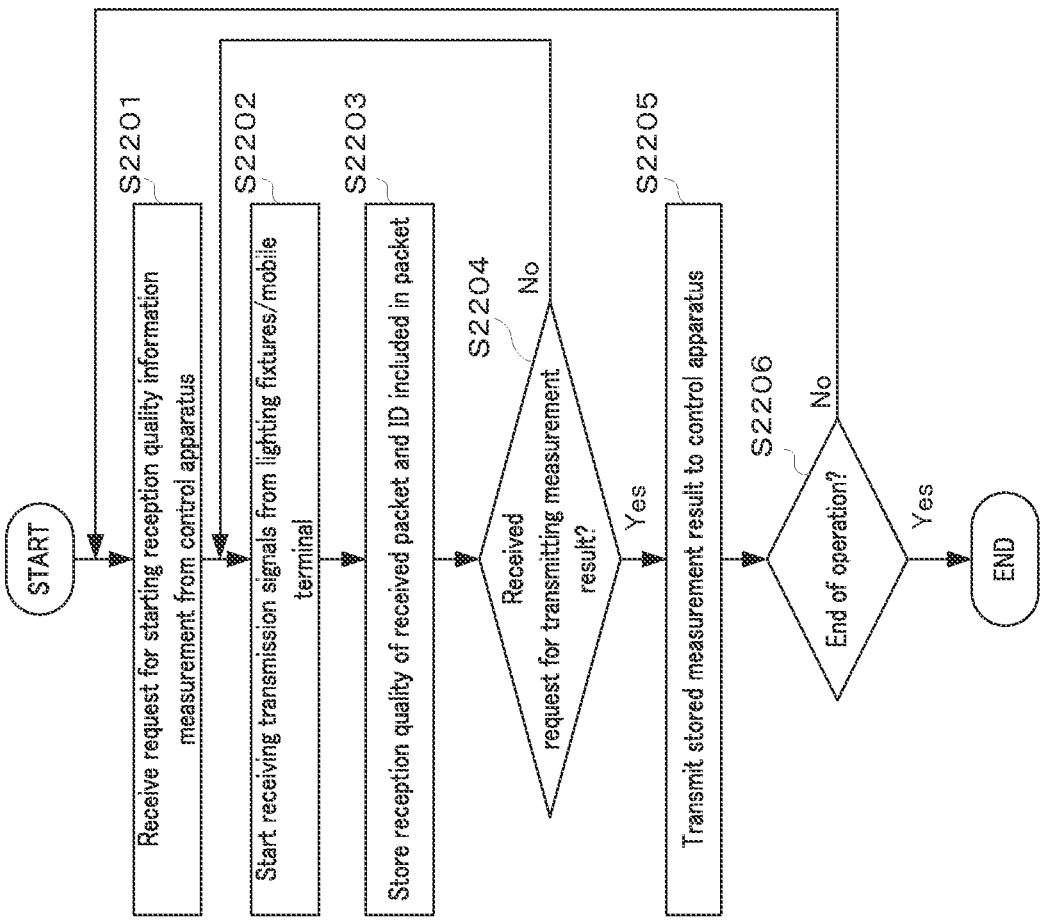
FIG. 22 is a flowchart describing exemplary processing in the anchor according to Embodiment 2.

FIG. 22 is a flowchart describing exemplary processing in the anchor according to Embodiment 2. Anchor 220 performs the lighting layout estimation and the mobile terminal position estimation through the processes from step S2201 to step S2206 to be described below with reference to FIG. 22. Anchor 220 intercepts transmission signals from lighting fixtures 230 or mobile terminal 240, which are the position estimation targets, and repeats measuring and storing the reception quality information. In response to the request for the measurement result from control apparatus 210, anchor 220 collectively transmits the stored measurement results to control apparatus 210.

In step S2201, anchor 220 receives the request for starting reception quality information measurement from control apparatus 210.

In response to the reception of the request for starting reception quality information measurement, anchor 220 starts standing by for receiving transmission signals from lighting fixtures 230 or mobile terminal 240 in step S2202.

In step S2203, anchor 220 receives (intercepts) packets transmitted by lighting fixtures 230 or mobile terminal 240, measures the reception quality information, and stores the IDs included in the packets and the reception quality information. Anchor 220 may receive packets broadcast from lighting fixtures 230 or mobile terminal 240, or may intercept packets that are not addressed to anchor 220.

In step S2204, anchor 220 determines whether to have received the request for transmitting a measurement result from control apparatus 210. When receiving no request for transmitting a measurement result (No in step S2204), anchor 220 returns the processing to step S2202.

When receiving the request for transmitting a measurement result (Yes in step S2204), in contrast, anchor 220 transmits the measurement results stored in step S2203 to control apparatus 210, in step S2205.

In step S2206, anchor 220 determines whether all measurements have been completed. When all the measurements have been completed (Yes in step S2206), anchor 220 terminates the processing. When all the measurements have not been completed (No in step S2206), anchor 220 returns the processing to step S2201.

<Processing in Lighting Fixture>

Figure 23A:
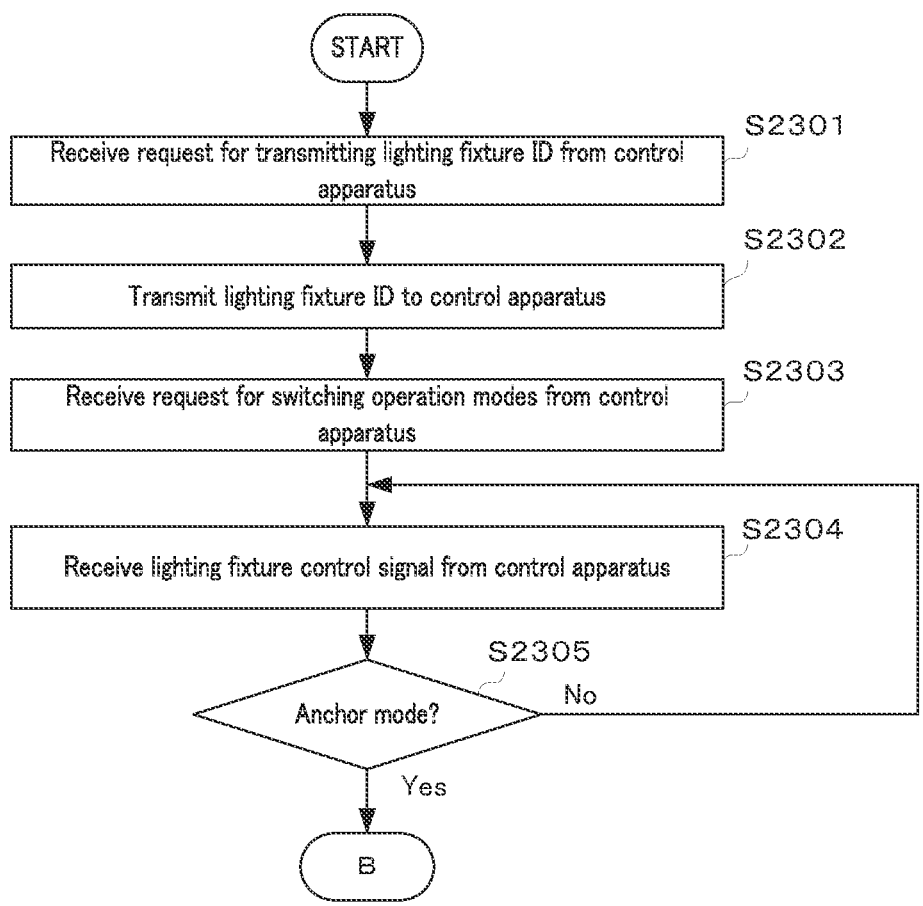
FIG. 23A is a flowchart describing exemplary processing in the lighting fixture in the lighting layout estimation according to Embodiment 2.

FIG. 23A is a flowchart describing exemplary processing in lighting fixture 230 in the lighting layout estimation according to Embodiment 2.

In step S2301, lighting fixture 230 receives the request for transmitting a lighting fixture ID from control apparatus 210. After receiving the request for transmitting a lighting fixture ID, lighting fixture 230 transmits the ID of lighting fixture 230 to control apparatus 210 in response in step S2302.

Lighting fixture 230 performs operations for the lighting layout estimation through the processes of the above-described steps S2301 and S2302. For example, lighting fixture 230 operates as a position estimation target in step S2301. Accordingly, the reception quality information in a radio communication section where lighting fixture 230 communicates with control apparatus 210 or anchor 220 is measured, and the position is estimated.

In step S2303, lighting fixture 230 receives the request signal for switching the operation modes from control apparatus 210.

In step S2304, lighting fixture 230 receives the lighting fixture control signal from control apparatus 210.

In step S2305, lighting fixture 230 determines whether the request signal for switching the operation modes received in step S2303 gives an instruction to function as an anchor.

When the request signal for switching the operation modes gives the instruction to function as an anchor (Yes in step S2305), lighting fixture 230 proceeds to step S2306 to be described below with reference to FIG. 23B. Meanwhile, when the request signal for switching the operation modes does not give the instruction to function as an anchor (No in step S2305), lighting fixture 230 returns the processing to step S2304.

After steps S2303 to S2305 described above are performed, the operation of lighting fixture 230 is changed by control of control apparatus 210 from the operation as the estimation target in the lighting layout estimation to the operation as the anchor in the mobile terminal position estimation.

Note that the lighting fixture layout estimation may be performed more than once. When the request signal for switching the operation modes gives no instruction to function as an anchor in the several times of estimations (No in step S2305), lighting fixture 230 may return the processing to step S2301.

Figure 23B:
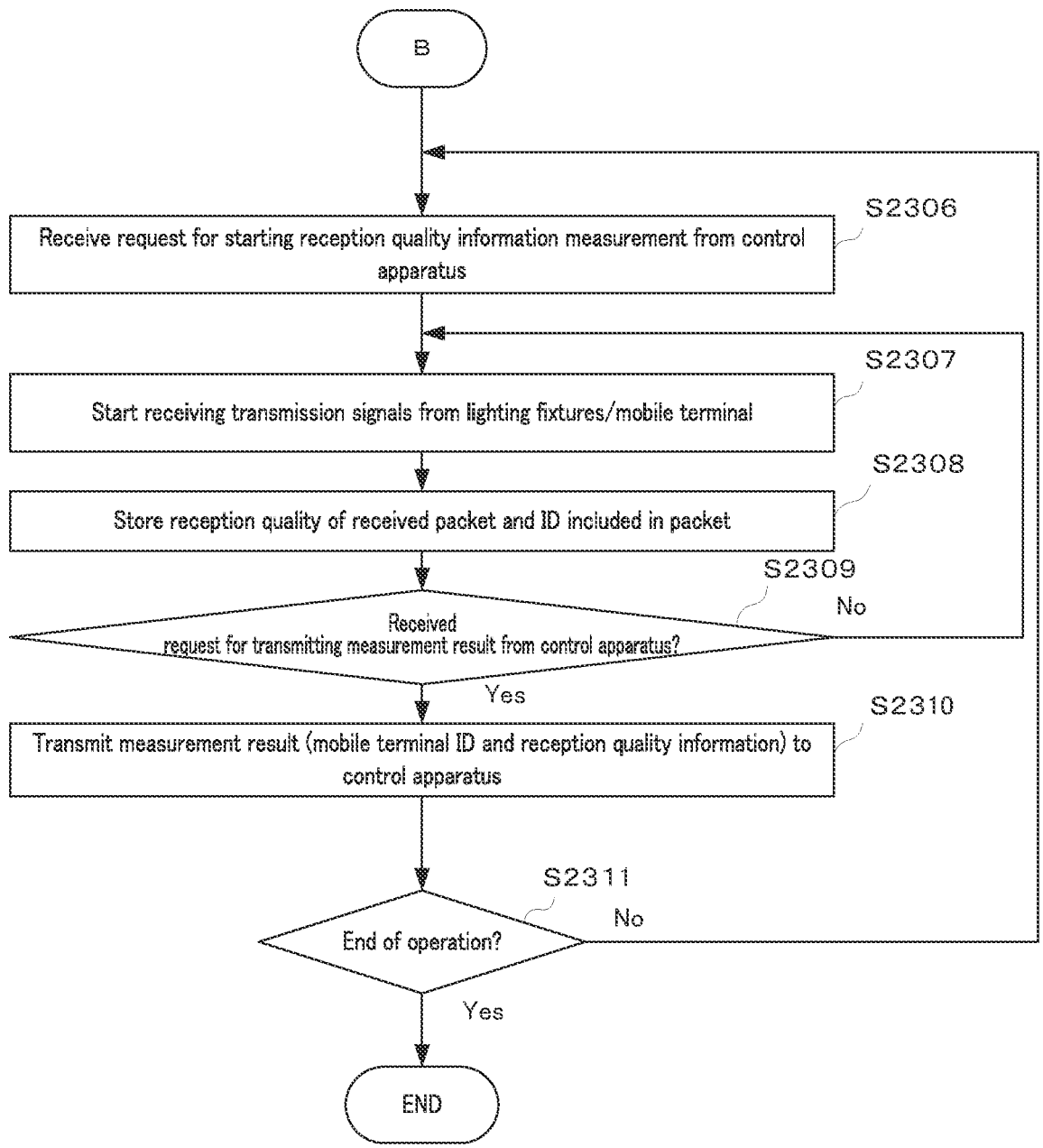
FIG. 23B is a flowchart describing exemplary processing in the lighting fixture in the mobile terminal position estimation according to Embodiment 2.

FIG. 23B is a flowchart describing exemplary processing in lighting fixture 230 in the mobile terminal position estimation according to Embodiment 2.

In step S2306, lighting fixture 230 starts receiving the request signal for starting reception quality information measurement from control apparatus 210.

In step S2307, lighting fixture 230 starts standing by for receiving a transmission signal from mobile terminal 240.

In step S2308, lighting fixture 230 measures the reception quality information of a packet intercepted from mobile terminal 240, and stores the ID included in the packet and the reception quality information.

In step S2309, lighting fixture determines whether to have received the request for transmitting a measurement result from control apparatus 210. When receiving no request for transmitting a measurement result from control apparatus 210 (No in step S2309), lighting fixture 230 returns the processing to step S2307.

When receiving the request for transmitting a measurement result from control apparatus 210 (Yes in step S2309), lighting fixture 230 transmits the measurement results stored in step S2308 to control apparatus 210 in step S2310.

In step S2311, lighting fixtures 230 determines whether all measurements have been completed. When all the measurements are completed (Yes in step S2311), lighting fixture 230 terminates the processing. When all the measurements have not been completed (No in step S2311), in contrast, lighting fixture 230 returns the processing to step S2306.

The processes of the above-described steps S2306 to S2311 cause lighting fixture 230 to operate as a newly added anchor in the mobile terminal estimation position.

<Processing in Mobile Terminal>

Mobile terminal 240 operates as a position estimation target. Accordingly, the reception quality information of the communication with control apparatus 210, anchor 220, or the N of lighting fixtures 230 selected as anchors is measured, and the position is estimated.

Figure 24:
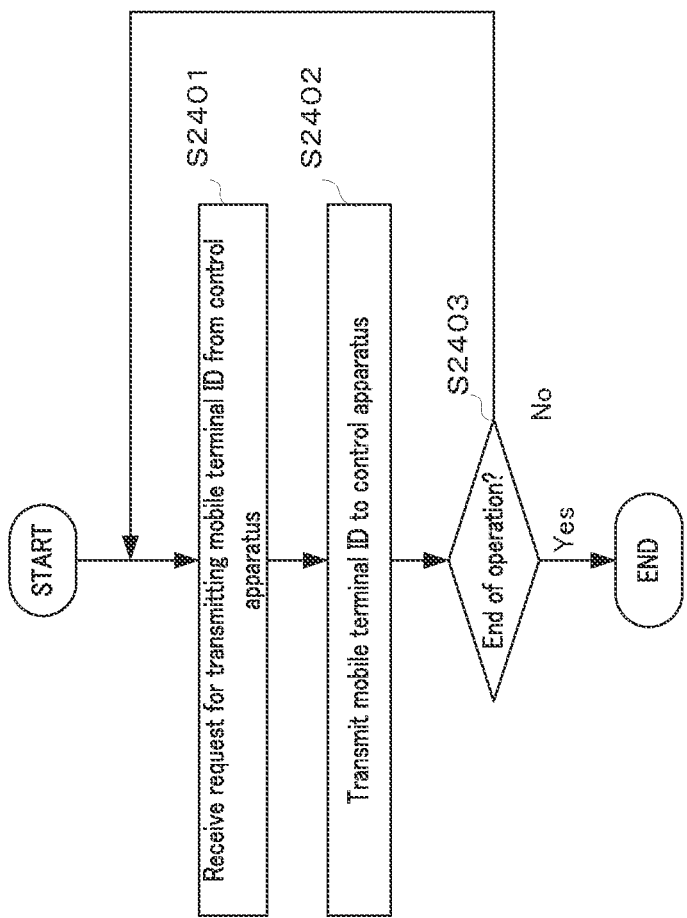
FIG. 24 is a flowchart describing exemplary processing in the mobile terminal according to Embodiment 2.

FIG. 24 is a flowchart describing exemplary processing in mobile terminal 240 according to Embodiment 2.

In step S2401, mobile terminal 240 receives the request for transmitting a mobile terminal ID from control apparatus 210.

Mobile terminal 240 receives the request for transmitting a mobile terminal ID, and transmits the ID of mobile terminal 240 to control apparatus 210 in step S2402.

In step S2403, mobile terminal 240 determines whether the reception quality information measurement has been completed. When the reception quality information measurement has been completed (Yes in step S2403), mobile terminal 240 terminates the processing. When the reception quality information measurement has not been completed (No in step S2403), in contrast, mobile terminal 240 returns the processing to step S2401.

Note that mobile terminal 240 may determine whether the reception quality information measurement has been completed by receiving a signal indicating the end of the measurement from control apparatus 210, which is not illustrated. Mobile terminal 240 may also determine that the reception quality information measurement has been completed when receiving no signal from control apparatus 210 for a predetermined period of time. Further, mobile terminal 240 may determine that the reception quality information measurement has been completed when mobile terminal 240 is turned off by a user.

<Sequence Diagram of Lighting Layout Estimation>

In the lighting layout estimation, radio communication is performed among control apparatus 210, anchor 220, and target lighting fixtures 230 whose positions in a predefined lighting layout are to be estimated.

Figure 25:
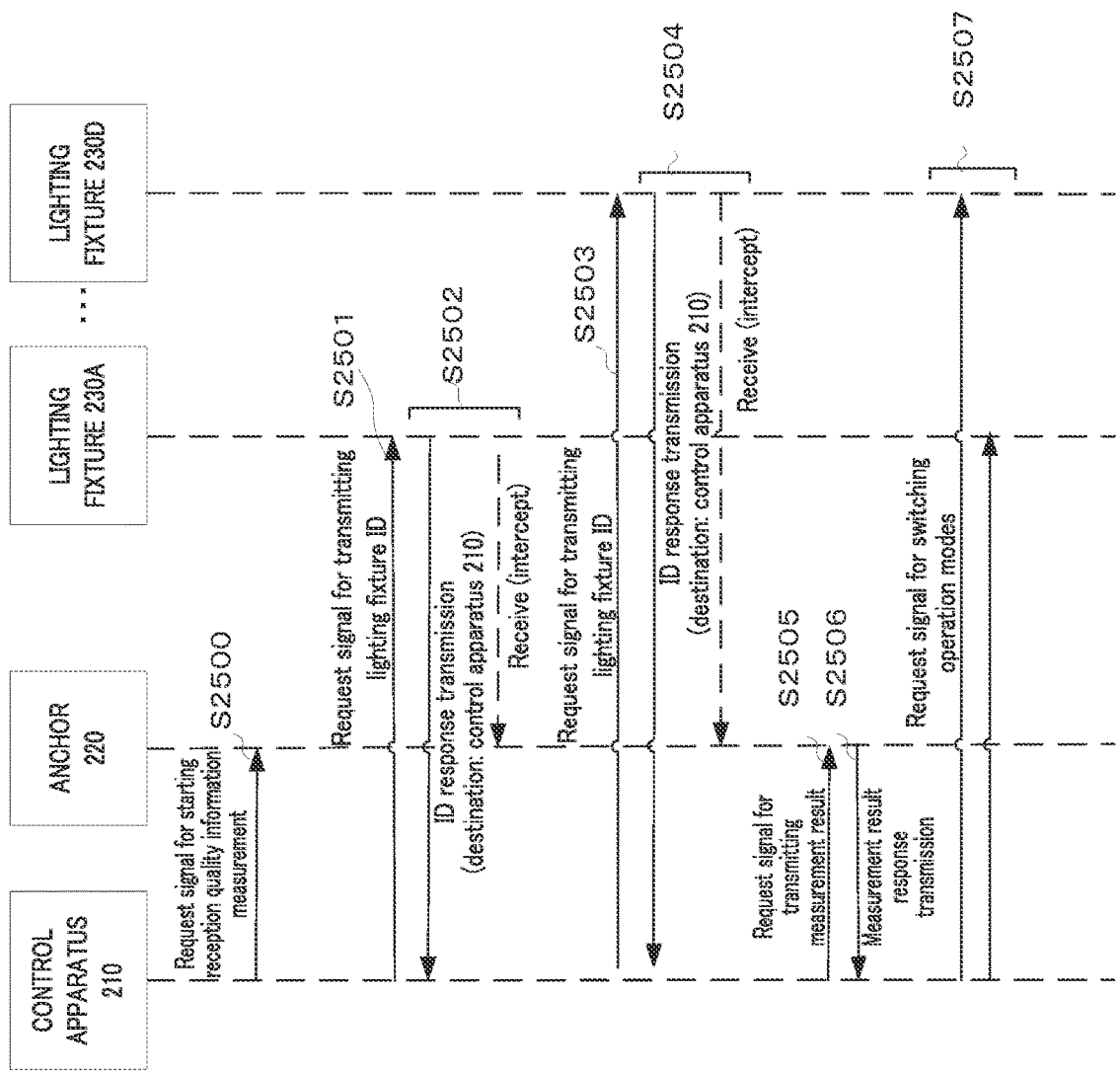
FIG. 25 is a sequence diagram describing exemplary lighting layout estimation according to Embodiment 2.

FIG. 25 is a sequence diagram describing exemplary lighting layout estimation according to Embodiment 2.

In step S2500 (corresponding to step S2101 in FIG. 21A), control apparatus 210 transmits the request signal for starting reception quality information measurement to anchor 220. In response to reception of the request signal for starting reception quality information measurement, anchor 220 stands by for receiving transmission signals of lighting fixtures 230.

In step S2501 (corresponding to step S2102 in FIG. 21A), control apparatus 210 transmits the request signal for transmitting a lighting fixture ID to lighting fixtures 230 with unknown lighting fixture IDs.

In step S2502 (corresponding to step S2103 in FIG. 21A), lighting fixture 230A transmits the lighting fixture ID to control apparatus 210 in response. In addition, anchor 220 intercepts the response transmission from lighting fixture 230A, and measures the reception quality information between lighting fixture 230A and anchor 220.

Steps S2503 and S2504 (respectively corresponding to steps S2102 and S2103 in FIG. 21A) are the same as steps S2501 and S2502, and the description thereof is thus omitted. The processes of steps S2501 to S2504 described above allow acquisition of the lighting fixture IDs of lighting fixtures 230 and communication for measuring the reception quality information required for the position estimation.

In step S2505 (corresponding to step S2104 in FIG. 21A), control apparatus 210 requests, to anchor 220, transmission of the measurement results measured by anchor 220.

In step S2506 (corresponding to step S2105 in FIG. 21A), anchor 220 transmits the results of the reception quality information measurements in steps S2502 and S2504 to control apparatus 210. Performing the above-described steps S2505 and S2506 allows control apparatus 210 to complete acquisition of information required for the lighting layout estimation.

After step S2506, control apparatus 210 performs, based on the measurement results of the reception quality information from anchor 220, the position estimation for each lighting fixture 230 (step S2106 in FIG. 21A), the calculation of the reliability (step S2107 in FIG. 21A), and the selection of lighting fixtures 230 to serve as anchors in the mobile terminal position estimation (step S2108 in FIG. 21A). The calculation of the reliability and the selection of the lighting fixtures are described later with reference to FIG. 27 to FIG. 30C.

In step S2507 (corresponding to step S2109 in FIG. 21A), control apparatus 210 transmits the request signal for switching the operation modes to lighting fixtures 230 based on the result of the selection of lighting fixtures 230. This allows control apparatus 210 to indicate the operation of lighting fixtures 230 in the mobile terminal position estimation to lighting fixtures 230.

<Sequence Diagram of Mobile Terminal Position Estimation>

In the mobile terminal position estimation, radio communication is performed among control apparatus 210, anchor 220, lighting fixtures 230, and mobile terminal 240 to be a position estimation target. Lighting fixtures 230 include lighting fixtures 230 that are controlled to operate as anchors in step S2507 in FIG. 25 and lighting fixtures 230 that are not controlled to operate as anchors in step S2507 in FIG. 25.

Figure 26:
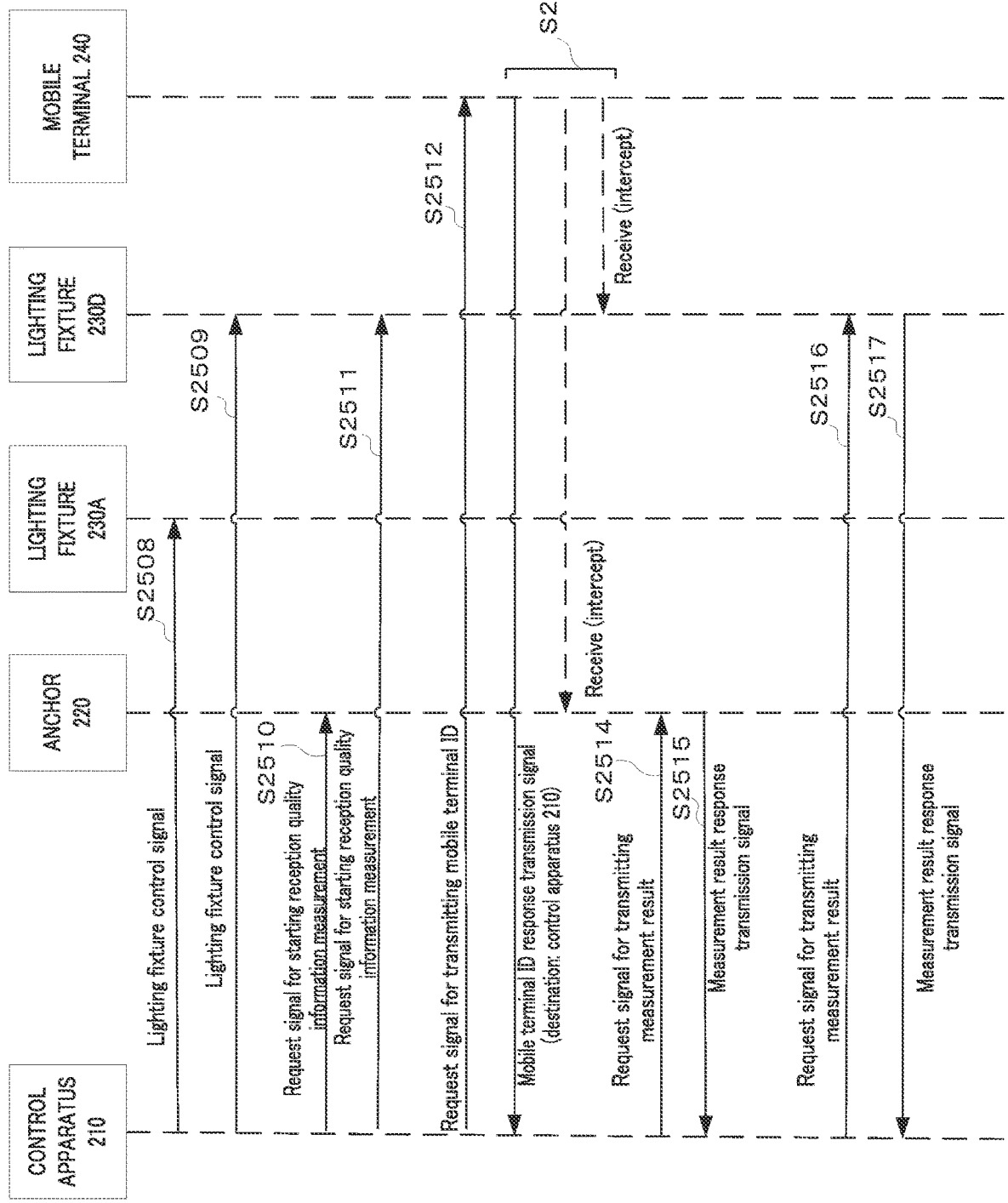
FIG. 26 is a sequence diagram describing exemplary mobile terminal position estimation according to Embodiment 2.

FIG. 26 is a sequence diagram describing exemplary mobile terminal position estimation according to Embodiment 2. The following description is about a sequence of the mobile terminal position estimation in a case where lighting fixture 230D is the lighting fixture 230 that is controlled to operate as an anchor and lighting fixture 230A is the lighting fixture 230 that is not controlled to operate as an anchor.

In step S2508 (corresponding to step S2110 in FIG. 21B), control apparatus 210 transmits the lighting fixture control signal to lighting fixture 230A. In response to reception of the lighting fixture control signal, lighting fixture 230A recognizes the start of the mobile terminal position estimation, and performs the operation that is already indicated in step S2507 in FIG. 25.

In step S2509 (corresponding to step S2110 in FIG. 21B), control apparatus 210 transmits the lighting fixture control signal to lighting fixture 230D. In response to reception of the lighting fixture control signal, lighting fixture 230D recognizes the start of the mobile terminal position estimation, and performs the operation that is already indicated in step S2507 in FIG. 25. Lighting fixture 230D operates as an anchor in step S2509 and thereafter.

In step S2510 (corresponding to step S2111 in FIG. 21B), control apparatus 210 transmits the request signal for starting reception quality information measurement to anchor 220. In response to reception of the request signal for starting reception quality information measurement, anchor 220 starts standing by for receiving a transmission signal of mobile terminal 240.

In step S2511 (corresponding to step S2111 in FIG. 21B), control apparatus 210 transmits the request signal for starting reception quality information measurement to lighting fixture 230D. In response to reception of the request signal for starting reception quality information measurement, lighting fixture 230D starts standing by as an anchor for receiving a transmission signal of mobile terminal 240. Note that steps S2510 and S2511 may be performed in any order.

In step S2512 (corresponding to step S2112 in FIG. 21B), control apparatus 210 transmits the request signal for transmitting a mobile terminal ID to mobile terminal 240.

In step S2513 (corresponding to step S2113 in FIG. 21B), mobile terminal 240 performs response transmission including the mobile terminal ID to control apparatus 210. In addition, anchor 220 intercepts the response transmission from mobile terminal 240, and measures the reception quality information. Lighting fixture 230D, operating as an anchor in step S2509 and thereafter, also intercepts the response transmission from mobile terminal 240, and measures the reception quality information.

The above described steps S2512 and S2513 are performed for acquisition of the ID of mobile terminal 240 and communication for measuring the reception quality information required for the position estimation.

In step S2514 (corresponding to step S2114 in FIG. 21B), control apparatus 210 transmits a transmission request for the result of the measurement by anchor 220 in step S2513 (request signal for transmitting a measurement result) to anchor 220.

In response to reception of the request signal for transmitting a measurement result, anchor 220 transmits the measurement result to control apparatus 210 in step S2515 (corresponding to step S2115 in FIG. 21B).

In step S2516 (corresponding to step S2114 in FIG. 21B), control apparatus 210 transmits a transmission request for the result of the measurement by lighting fixture 230D in step S2513 (request signal for transmitting a measurement result) to lighting fixture 230D.

In response to reception of the request signal for transmitting a measurement result, lighting fixture 230D transmits the measurement result to control apparatus 210 in step S2517 (corresponding to step S2115 in FIG. 21B).

Performing the above-described steps S2514 to S2517 allows control apparatus 210 to complete acquisition of information required for the mobile terminal estimation position.

Although Embodiment 2 is described with the case of using lighting fixture 230D as an anchor for the position estimation for mobile terminal 240 in FIG. 26 described above, the same applies to a case of using any of lighting fixtures 230A to 230C.

<Exemplary Determination of Reliability>

In a case where all of lighting fixtures 230 whose positions are estimated in the lighting layout estimation are adopted as anchors in the position estimation for mobile terminal 240, lighting fixtures 230 with poor estimation accuracy are used as anchors, and thus it is difficult to improve accuracy in the position estimation for mobile terminal 240.

Control apparatus 210 determines the reliability of each lighting fixture 230 based on the predefined lighting layout information and the result of the position estimation for lighting fixtures 230. Control apparatus 210 can improve the estimation accuracy in the mobile terminal position estimation by adding lighting fixtures 230 with high reliability as anchors to be used for the position estimation for mobile terminal 240. An exemplary determination of the reliability is described with reference to FIGS. 27 and 28.

Figure 27:
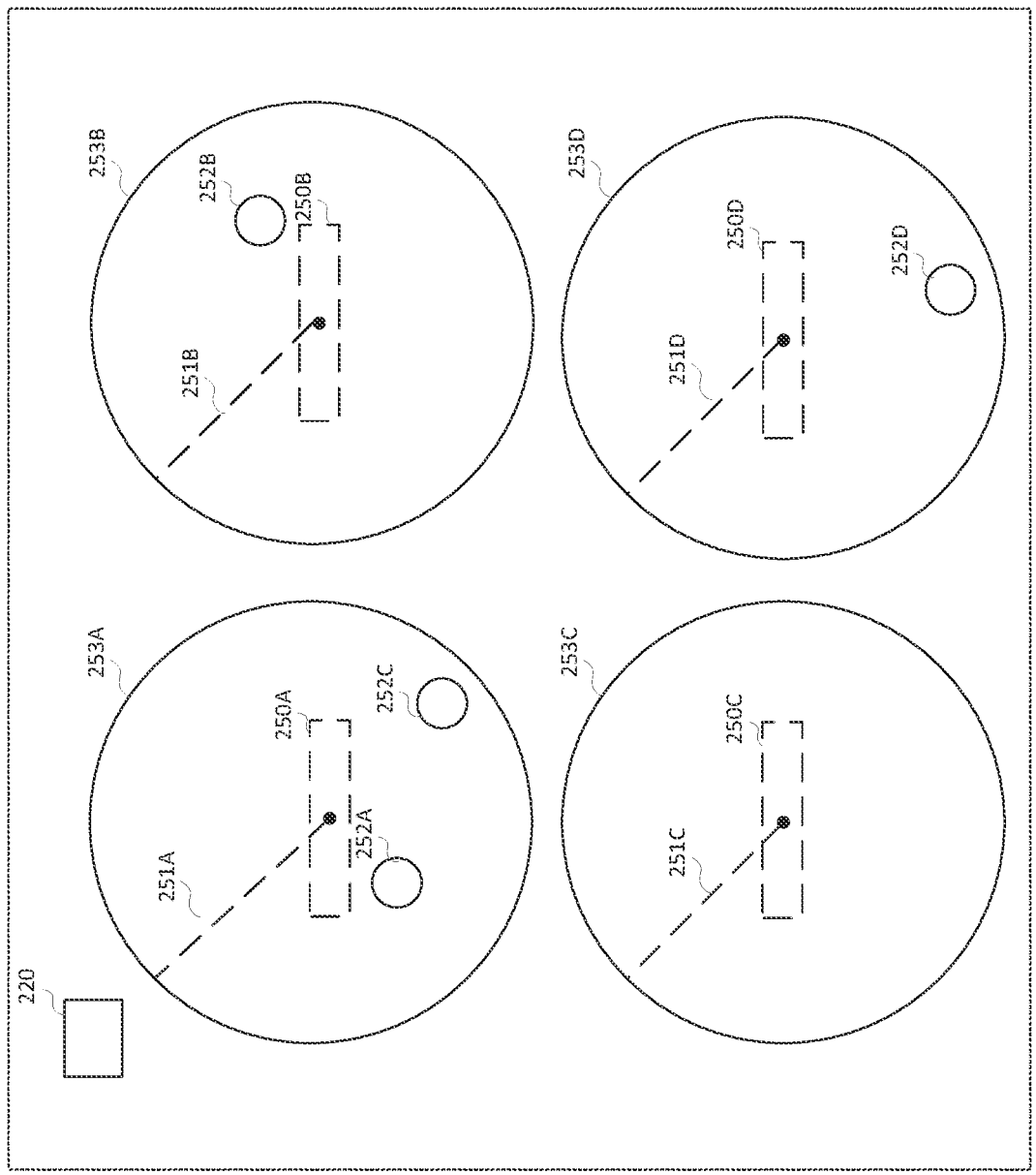
FIG. 27 illustrates exemplary determination of reliability according to Embodiment 2.

FIG. 27 illustrates exemplary determination of the reliability according to Embodiment 2. Anchor 220 with a known installation position is represented by a solid-line square.

Lighting layout positions 250A to 250D are predefined, and lighting layout positions 250A to 250D and lighting fixtures 230A to 230D are respectively linked after the position estimation of lighting fixtures 230 (see FIG. 15). In FIG. 27, examples of actual installation positions of lighting fixtures 230A to 230D are represented by black circles. Note that lighting layout positions 250A to 250D are illustrated to form a rectangle in FIG. 27, but the shape formed of lighting layout positions 250A to 250D is not limited to a rectangle.

Lighting fixture position estimates 252A to 252D respectively indicate the estimated positions of lighting fixtures 230A to 230D.

Lighting layout areas 253A to 253D are areas used for determining whether to link lighting fixtures 230A to 230D with lighting layout positions 250A to 250D. By way of example, lighting layout areas 253A to 253D are circles respectively centered at points (e.g., centers or centers of gravity) of lighting layout positions 250A to 250D and respectively having radii of distances 251A to 251D. Distances 251A to 251D may have the same value or different values each other. Distances 251A to 251D may be half the distance among lighting layout positions 250A to 250D. Lighting layout position 250 may be located in the center of gravity of lighting layout area 253, or may be located at a position other than the center of gravity (e.g., edge of lighting layout area 253).

In a case where single lighting layout area 253 has two or more lighting fixture position estimates 252, the distances between lighting layout position 250 and lighting fixture position estimates 252 are calculated, and the reliability is determined, for example, between 0 and 1 such that higher reliability is given to a shorter distance and lower reliability is given to a longer distance. Lighting fixture 230 with the highest reliability, that is, lighting fixture 230 corresponding to lighting fixture position estimate 252 with an estimated position closest to lighting layout position 250 is linked with lighting layout position 250.

Two lighting fixture position estimates 252A and 252C are located inside lighting layout area 253A. In this case, control apparatus 210 determines that lighting fixture 230A has higher reliability and lighting fixture 230C has lower reliability since lighting fixture position estimate 252A, corresponding to lighting fixture 230A, is closer to lighting layout position 250A, and links lighting layout position 250A with lighting fixture 230A.

In addition, single lighting fixture position estimate 252B is located inside lighting layout area 253B. In this case, control apparatus 210 determines that lighting fixture 230B corresponding to lighting fixture position estimate 252B has higher reliability, and links lighting layout position 250B with lighting fixture 230B.

Further, single lighting fixture position estimate 252D is located inside lighting layout area 253D. In this case, control apparatus 210 determines that lighting fixture 230D corresponding to lighting fixture position estimate 252D has higher reliability, and links lighting layout position 250D with lighting fixture 230D.

Note that no lighting fixture position estimate 252 is located inside lighting layout area 253C. In this case, control apparatus 210 determines that there is no lighting fixture 230 to be linked with lighting layout position 250C.

As a result of the above, control apparatus 210 selects lighting fixtures 230A, 230B, and 230D that are determined to have high reliability as anchors to be used for the mobile terminal position estimation.

Figure 28:
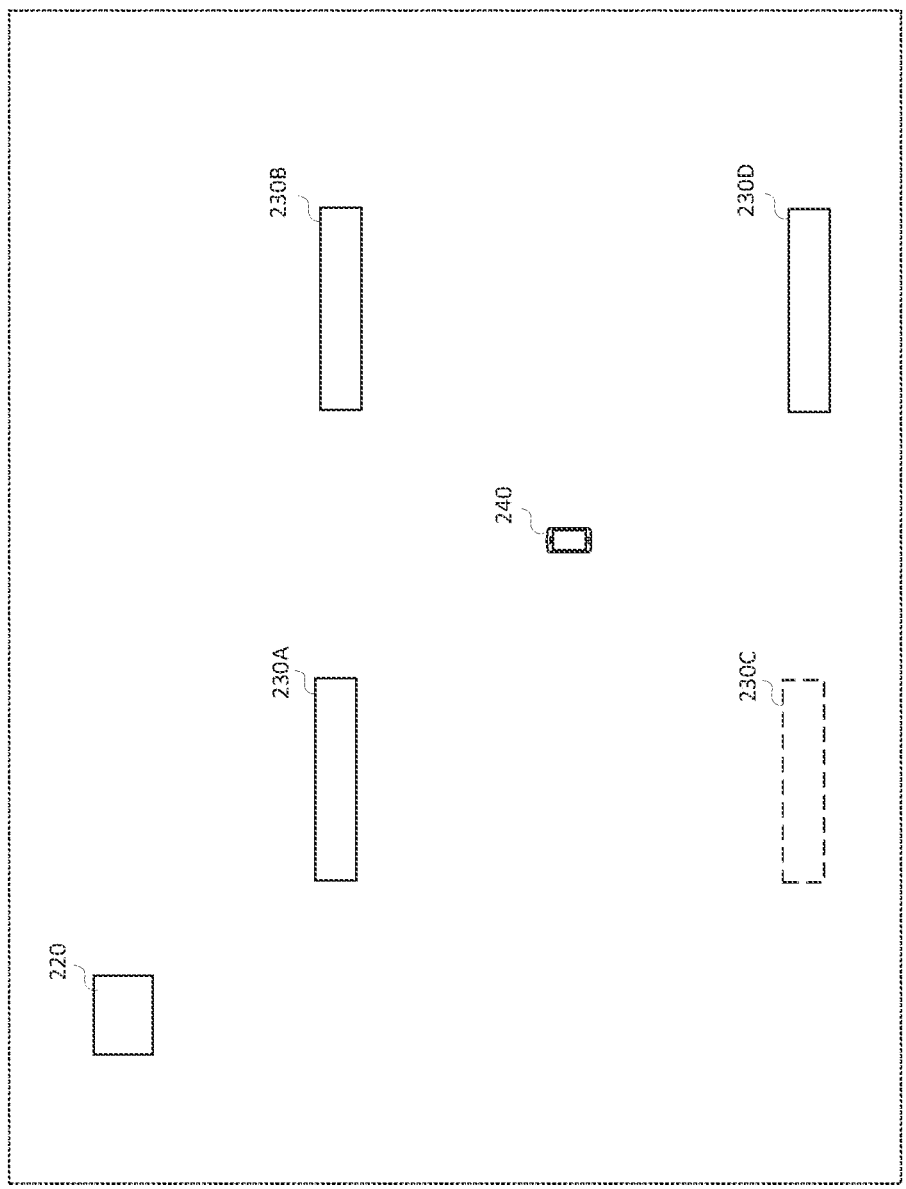
FIG. 28 illustrates an exemplary status after the determination of the reliability according to Embodiment 2.

FIG. 28 illustrates an exemplary status after the determination of the reliability according to Embodiment 2.

In the status during the position estimation for mobile terminal 240 illustrated in FIG. 28, control apparatus 210 performs the position estimation for mobile terminal 240 using, in addition to anchor 220, the selected lighting fixtures 230A, 230B, and 230D as anchors whose positions are known.

In the status during the position estimation for mobile terminal 240 illustrated in FIG. 28, anchor 220 and lighting fixtures 230A, 230B, and 230D, which operate as anchors, are represented by solid squares. In addition, lighting fixture 230C that is not selected as an anchor by control apparatus 210 is represented by a broken-line square indicating that the position is not estimated.

The anchor used for the position estimation is a single anchor 220 after the lighting layout estimation illustrated in FIG. 27. In the status during the position estimation for mobile terminal 240 illustrated in FIG. 28, in contrast, the number of anchors used for the position estimation is increased to four, which are anchor 220 and lighting fixtures 230A, 230B, and 230D.

<Another Example of Determination of Reliability>

Figure 29:
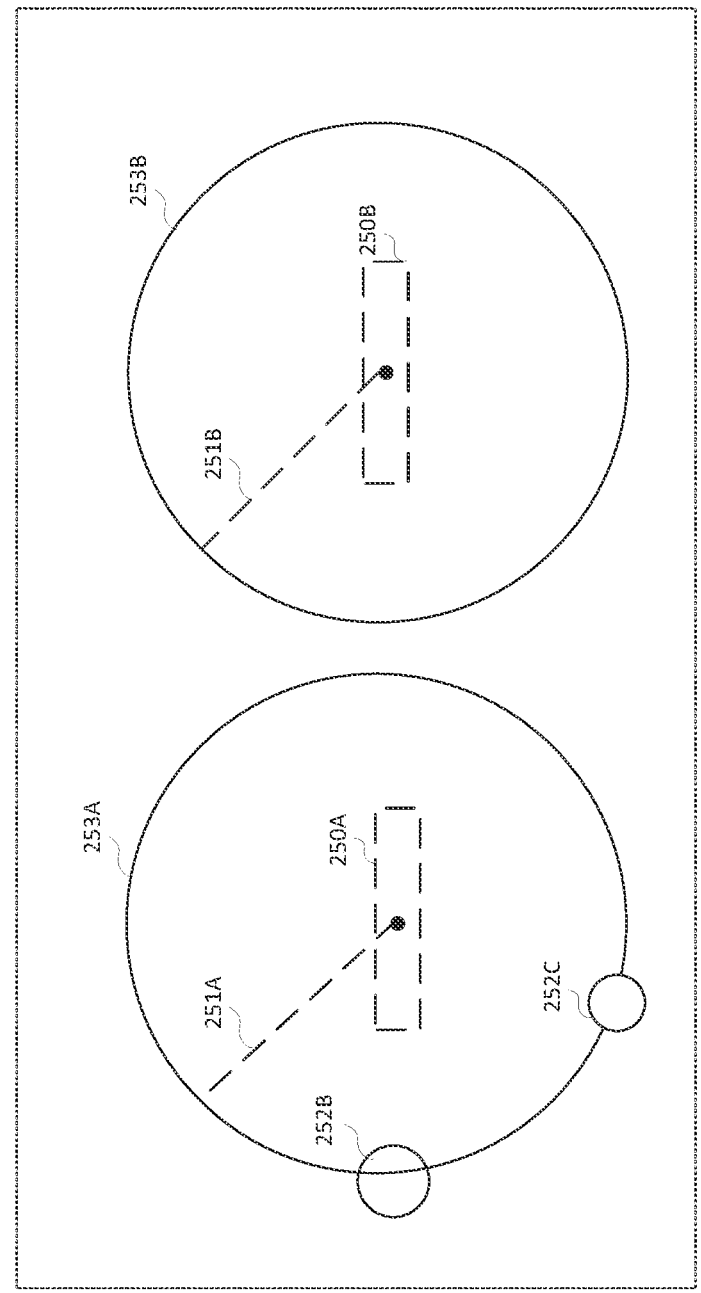
FIG. 29 illustrates other exemplary determination of the reliability according to Embodiment 2.

FIG. 29 illustrates other exemplary determination of the reliability according to Embodiment 2. In the example illustrated in FIG. 29, lighting fixture position estimates 252B and 252C are located equidistant from lighting layout position 250A of lighting fixture 230A (see FIG. 15).

By way of example, when two or more lighting fixture position estimates 252B and 252C are present in single lighting layout area 253A, and are located equidistant from lighting layout position 250A, lighting fixtures 230B and 230C (see FIG. 15) respectively corresponding to lighting fixture position estimates 252B and 252C are both determined to have low reliability. In this case, control apparatus 210 does not link lighting fixtures 230B and 230C with lighting layout positions 250B and 250C.

<Still Another Example of Determination of Reliability>

A description will be given of a case where lighting layout areas 253 overlap each other with reference to FIGS. 30A to 30C.

Figure 30A:
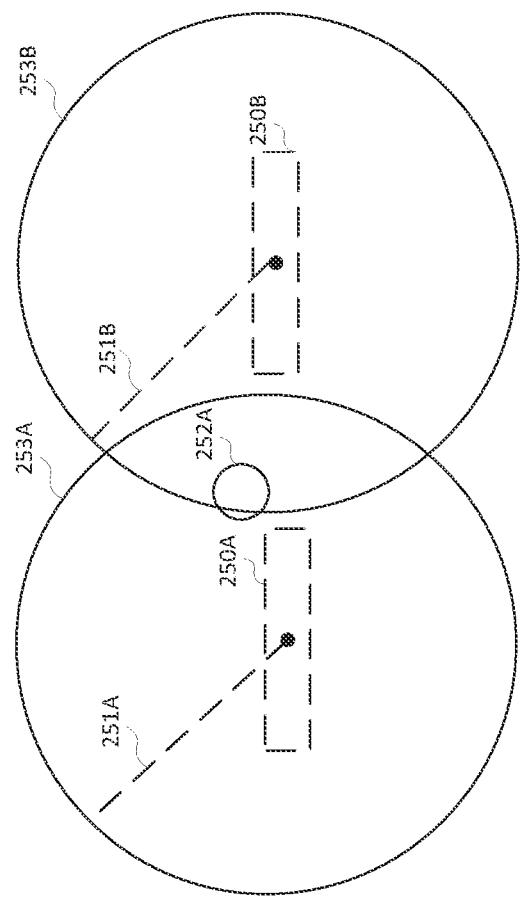
FIG. 30A illustrates still other exemplary determination of the reliability according to Embodiment 2.
Figure 30B:
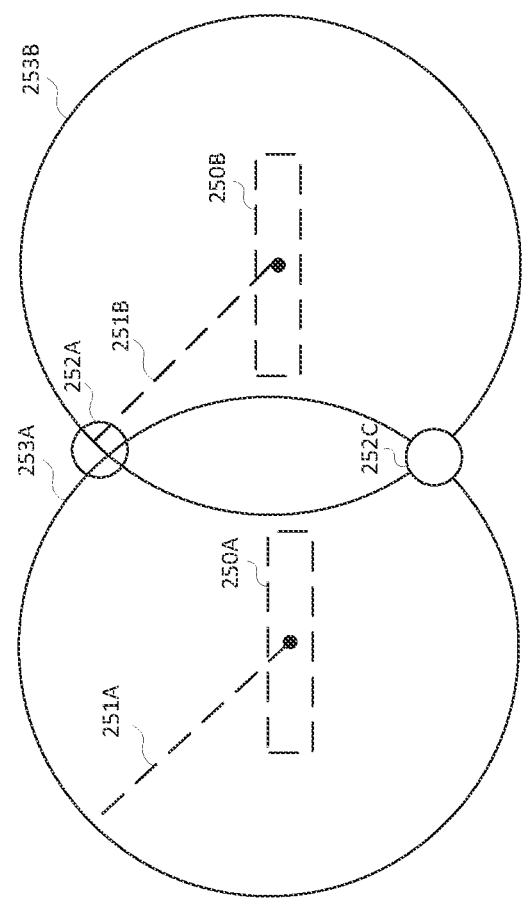
FIG. 30B illustrates still other exemplary determination of the reliability according to Embodiment 2.
Figure 30C:
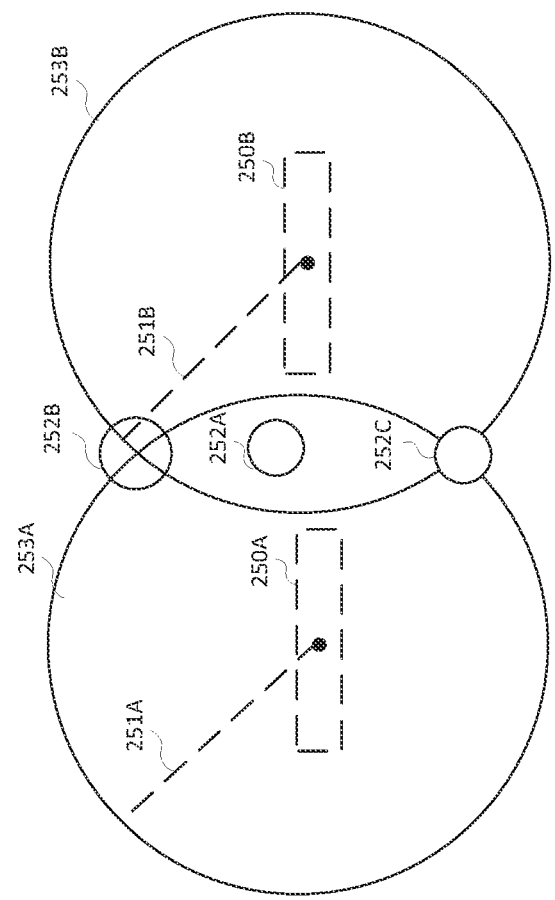
FIG. 30C illustrates still other exemplary determination of the reliability according to Embodiment 2.

FIGS. 30A to 30C illustrate still other exemplary determination of the reliability according to Embodiment 2.

By way of example, when there is single lighting fixture 230A (see FIG. 15) whose lighting fixture position estimate 252A is located in an area where two lighting layout areas 253A and 253B overlap each other, as illustrated in FIG. 30A, single lighting fixture 230A is linked with closer lighting layout position 250A. In the example illustrated in FIG. 30A, control apparatus 210 links lighting fixture 230A with lighting layout position 250A.

In some cases, as illustrated in FIG. 30B, there are a plurality of lighting fixtures 230A and 230C (see FIG. 15) whose lighting fixture position estimates 252A and 252C are located in the area where two lighting layout area 253A and 253B overlap each other, and lighting fixture position estimates 252A and 252C are located equidistant from lighting layout positions 250. By way of example, when the number of lighting fixture position estimates 252A and 252C is less than or equal to the number of overlapping lighting layout areas 253A and 253B, lighting fixtures 230A and 230C are randomly linked with any of lighting layout positions 250. For example, control apparatus 210 links lighting fixture 230A to lighting layout position 250A and lighting fixture 230C to lighting layout position 250B.

In other cases, as illustrated in FIG. 30C, there are a plurality of lighting fixtures 230A, 230B, and 230C (see FIG. 15) whose lighting fixture position estimates 252A, 252B, and 252C are located in the area where two lighting layout area 253A and 253B overlap each other. Further, lighting fixture position estimates 252A, 252B, and 252C are sometimes all located equidistant from lighting layout positions 250A and 250B. By way of example, when the number of lighting fixture position estimates 252A, 252B, and 252C is greater than the number of overlapping lighting layout areas 253A and 253B, lighting fixtures 230 are determined to have low reliability.

However, lighting fixture position estimate 252A is located closer to lighting layout positions 250 than lighting fixture position estimates 252B and 252C. In this case, lighting fixture 230A may be linked with any of lighting layout positions 250A and 250B. Note that lighting fixtures 230B and 230C are not linked with any of lighting layout positions 250.

When none of the conditions described above with reference to FIG. 29 and FIGS. 30A to 30C applies, the <Exemplary Determination of Reliability> described above with reference to FIGS. 27 and 28 may be adopted. That is, higher reliability is determined for lighting fixtures 230A to 230D whose calculated lighting fixture position estimates 252A to 252D are closest to lighting layout positions 250A to 250D, and lighting fixtures 230A to 230D with higher reliability are linked with lighting layout positions 250A to 250D.

It is conceivable that lighting fixtures 230A to 230D are determined to have high reliability even though they are linked with lighting layout positions 250A to 250D different from their actual installation positions. To avoid this situation, control apparatus 210 may determine the reliability based on reference information included in the lighting layout information, by way of example. The reference information is information indicating lighting fixtures 230A to 230D respectively installed in lighting layout positions 250A to 250D. For example, control apparatus 210 determines the reliability of lighting fixtures 230A to 230D to 0 when a result of determination whether lighting fixture position estimates 252A to 252D are respectively located around lighting layout positions 250A to 250D does not match the reference information.

According to Embodiment 2, the accuracy in the position estimation for mobile terminal 240 using radio communication can be improved by selecting lighting fixtures 230 with high reliability in the position estimation and adding the selected lighting fixtures 230 to the anchor that is initially installed.

Variations of Embodiment 2

In Embodiment 2 described above, position estimation system 201 performs the lighting layout estimation, which is in step S2000, and the selection of anchors based on the reliability, which is in step S2001, during an initial operation of position estimation system 201. Alternatively, it is also conceivable to perform steps S2000 and S2001 other than during the initial operation, as a variation. For example, steps S2000 and S2001 may be performed regularly. Performing step S2000 and S2001 regularly allows position estimation system 201 to select anchors following the constantly changing radio wave environment.

In Embodiment 2 described above, the reliability takes a value of 0 or a value of 1. Alternatively, the reliability may take a value other than 0 and 1 in a variation. For example, control apparatus 210 calculates positional differences between lighting layout positions 250A to 250D and lighting fixture position estimates 252A to 252D respectively. Control apparatus 210 may then determine the reliability for each between 0 and 1 so that lower reliability is given to a greater difference and higher reliability is given to a smaller difference.

In Embodiment 2 described above, the size of lighting layout area 253 is fixed. Alternatively, it is conceivable as a variation that control apparatus 210 repeatedly performs the linking process of lighting layout position 250 and lighting fixture 230, and adjusts the size of lighting layout area 253. For example, there is a case of failing to obtain a sufficient number of lighting fixtures 230 with high enough reliability to be selected as anchors for the position estimation for mobile terminal 240. In this case, control apparatus 210 may expand lighting layout area 253 until the sufficient number of lighting fixtures 230 are selected as anchors, and determine the reliability again. Conversely, control apparatus 210 may reduce lighting layout area 253 until the number of lighting fixtures 230 with high enough reliability to be selected as anchors decreases to a predefined value, and determine the reliability again. For example, lighting layout area 253 may be expanded or reduced by increasing or decreasing distance 251 from lighting layout position 250.

Although lighting layout areas 253A to 253D are circular areas in Embodiment 2 described above, a variation with non-circular lighting layout areas 253A to 253D is also conceivable. For example, lighting layout areas 253A to 253D may be polygonal areas or areas surrounded by any closed curves.

Although distance 251 from lighting layout position 250 is illustrated as a radius in Embodiment 2 described above, it is conceivable as a variation that a value of distance 251 represents a distance from the center of gravity of polygonal lighting layout area 253 to the farthest vertex. It is also conceivable as still another variation that the value of distance 251 represents a distance from lighting layout position 250 to an indoor wall (not illustrated).

In Embodiment 2 described above, reception quality information measurer 222 and measurement result indicator 223 (see FIG. 18) are included in anchor 220 that is separately provided from control apparatus 210. Alternatively, control apparatus 210 and anchor 220 may be provided as a single unit as a variation. In this case, control apparatus 210 may include reception quality information measurer 222 and measurement result indicator 223.

In Embodiment 2 described above, lighting fixture 230 includes a lighting function. It is also conceivable as a variation, however, to include a radio communication apparatus capable of performing radio communication with anchor 220 and mobile terminal 240, in place of lighting fixture 230. Such a radio communication apparatus may include, for example, a speaker, a fire alarm, an alarm annunciator, an emergency light, a clock, an air purifier, or an air conditioner. Further, both the lighting fixture and such a radio communication apparatus may be used together.

Summary of Embodiment 2

A position estimation apparatus according to the present disclosure includes: selection circuitry, which, in operation, selects, in a terminal mode where first positions of a plurality of first radio communication apparatuses are estimated by a second radio communication apparatus, a first radio communication apparatus group including at least one of the plurality of first radio communication apparatuses from the plurality of first radio communication apparatuses based on the first positions and first reception quality information of first radio signals transmitted from the plurality of first radio communication apparatuses at the second radio communication apparatus; control circuitry, which, in operation, generates a signal indicating, to the first radio communication apparatus group, a switch from the terminal mode to an anchor mode of estimating a second position of a third radio communication apparatus; and estimation circuitry, which, in operation, estimates the second position of the third radio communication apparatus based on the first positions of the plurality of first radio communication apparatuses included in the first radio communication apparatus group estimated in the terminal mode and second reception quality information of a second radio signal transmitted from the third radio communication apparatus at the second radio communication apparatus and the first radio communication apparatus group in the anchor mode.

In the position estimation apparatus according to the present disclosure, the selection circuitry determines reliability for the plurality of first radio communication apparatuses that are in the terminal mode based on the first reception quality information, and selects, in descending order of the reliability, the at least one of the plurality of first radio communication apparatuses to belong to the first radio communication apparatus group from the plurality of first radio communication apparatuses that are in the terminal mode.

In the position estimation apparatus according to the present disclosure, the estimation circuitry estimates third positions of the plurality of first radio communication apparatuses that are in the terminal mode based on the first reception quality information and a position of the second radio communication apparatus, and the selection circuitry determines a first reliability of the reliability for the at least one of the plurality of first radio communication apparatuses in the terminal mode for which a number of the third positions included in at least one of a plurality of areas is equal to one, and a second reliability of the reliability for the at least one of the plurality of first radio communication apparatuses in the terminal mode for which the number is not equal to one, the first reliability being higher than the second reliability, and the plurality of areas being respectively defined for the plurality of first radio communication apparatuses in the terminal mode.

In the position estimation apparatus according to the present disclosure, the selection circuitry determines the higher reliability for the at least one of the plurality of first radio communication apparatuses that are in the terminal mode having a smaller difference between positions respectively predefined for the plurality of first radio communication apparatuses and the first positions of the plurality of first radio communication apparatuses estimated in the terminal mode.

In the position estimation apparatus according to the present disclosure, the selection circuitry determines the reliability by expanding a size of the area when the first radio communication apparatus group includes the at least one of the plurality of first radio communication apparatuses less than a predetermined number, and determines the reliability by reducing the size of the area when the first radio communication apparatus group includes the at least one of the plurality of first radio communication apparatuses greater than the predetermined number.

In the position estimation apparatus according to the present disclosure, the first reception quality information and the second reception quality information are received signal strength indicators.

A position estimation system according to the present disclosure includes: a plurality of first radio communication apparatuses that transmit first radio signals; a second radio communication apparatus that measures first reception quality information of the first radio signals transmitted from the plurality of first radio communication apparatuses; a third radio communication apparatus that transmits a second radio signal; and a control apparatus that selects, in a terminal mode where first positions of the plurality of first radio communication apparatuses are estimated by the second radio communication apparatus, a first radio communication apparatus group including at least one of the plurality of first radio communication apparatuses from the plurality of first radio communication apparatuses based on the first positions and the first reception quality information, indicates, to the first radio communication apparatus group, a switch from the terminal mode to an anchor mode of estimating a second position of the third radio communication apparatus, and estimates the second position of the third radio communication apparatus based on the first positions of the plurality of first radio communication apparatuses included in the first radio communication apparatus group estimated in the terminal mode and second reception quality information of the second radio signal transmitted from the third radio communication apparatus at the second radio communication apparatus and the first radio communication apparatus group in the anchor mode.

In the position estimation system according to the present disclosure, at least one of the plurality of first radio communication apparatuses includes a lighting fixture.

A position estimation method according to the present disclosure includes: selecting, in a terminal mode where first positions of a plurality of first radio communication apparatuses are estimated by a second radio communication apparatus, a first radio communication apparatus group including at least one of the plurality of first radio communication apparatuses from the plurality of first radio communication apparatuses based on the first positions and first reception quality information of first radio signals transmitted from the plurality of first radio communication apparatuses at the second radio communication apparatus; generating a signal indicating, to the first radio communication apparatus group, a switch from the terminal mode to an anchor mode of estimating a second position of a third radio communication apparatus; and estimating the second position of the third radio communication apparatus based on the first positions of the plurality of first radio communication apparatuses included in the first radio communication apparatus group estimated in the terminal mode and second reception quality information of a second radio signal transmitted from the third radio communication apparatus at the second radio communication apparatus and the first radio communication apparatus group in the anchor mode.

The present disclosure is useful for systems estimating positions of radio communication terminals.

Embodiment 3

The present disclosure relates to a position estimation apparatus and a position estimation system.

In recent years, various position estimation systems have been proposed to address a need for indoor position estimation to manage locations of people and objects in offices and commercial facilities.

PTL 3 discloses a following method of estimating a position of a slave device. In a case where the slave device is capable of receiving radio signals of at least three anchors installed in known positions, an anchor with a higher Received Signal Strength Indicator (RSSI) of the radio signal serves as the first anchor, the second anchor and the third anchor are selected in descending order of the RSSI at the first anchor, and the position of the slave device is estimated using the first anchor, the second anchor, and the third anchor.

One non-limiting and exemplary embodiment facilitates providing an improved position estimation apparatus and an improved position estimation system each capable of reducing an effect of a radio wave propagation environment on an estimation result.

A position estimation apparatus according to the present disclosure adopts a configuration including: selection circuitry, which, in operation, selects, based on first information indicating a reception status of a radio wave between a plurality of radio communication apparatuses and second information indicating installation positions of the plurality of radio communication apparatuses, a first radio communication apparatus group that includes radio communication apparatuses less than the plurality of radio communication apparatuses; and estimation circuitry, which, in operation, estimates a position of a radio terminal based on the second information and third information indicating a reception status of a radio wave between the radio terminal and at least one of the radio communication apparatuses included in the first radio communication apparatus group.

A position estimation system according to the present disclosure adopts a configuration including: the position estimation apparatus according to the present disclosure; a plurality of radio communication apparatuses; and an access point that relays communication between the position estimation apparatus and the plurality of radio communication apparatuses.

It should be noted that general or specific embodiments may be implemented as a system, an apparatus, a method, an integrated circuit, a computer program, a storage medium, or any selective combination thereof.

According to a non-limiting embodiment of the present disclosure, it is possible to provide an improved position estimation apparatus and an improved position estimation system each capable of reducing an effect of a radio wave propagation environment on an estimation result.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

The method disclosed in PTL 3 is based on the assumption that anchors with higher RSSIs are located closer to a slave device or other anchors, and that position estimation using anchors closer to a slave device is more accurate. In practice, however, the RSSI depends on the radio wave propagation environment, and the closer anchors do not have high RSSIs in some cases. Thus, anchors with high RSSIs do not necessarily be anchors with high accuracy of position estimation. As described above, the method disclosed in PTL 3 sometimes has difficulty obtaining a highly accurate position estimation result even using anchors with high RSSIs.

To address the problem, the present disclosure provides position estimation with higher accuracy by selecting anchors that can be expected to estimate positions with higher accuracy from among a large number of anchors.

In a non-limiting embodiment of the present disclosure, anchors that can be expected to perform position estimation with high accuracy are put in order of priority for each area in advance, according to an RSSI-distance conversion characteristic of each anchor with other anchors. Then, the anchors are used in descending order of the priority for the slave device position estimation, and a combination of the anchors is searched until a position estimation result is converged, thereby achieving the position estimation with higher accuracy.

Hereinafter, embodiments of the present disclosure will be described in detail with reference to the accompanying drawings. Note that the embodiments to be described below are merely examples, and the present disclosure is not limited by the following embodiments.

Description of Embodiment 3

Figure 31:
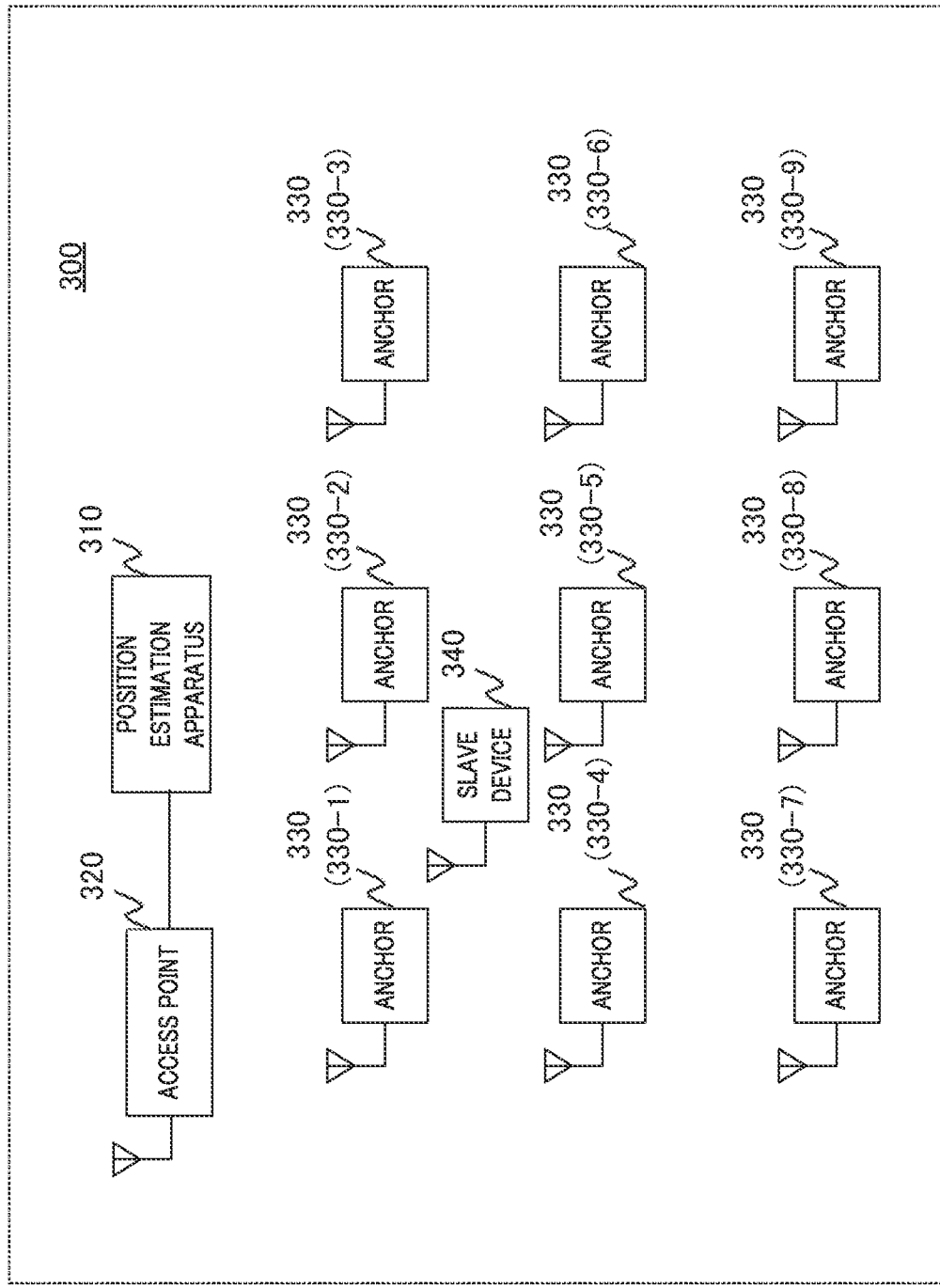
FIG. 31 illustrates an exemplary configuration of a position estimation system according to Embodiment 3.

<Configuration of Position Estimation System>
FIG. 31 illustrates an exemplary configuration of position estimation system 300 according to Embodiment 3.

Position estimation system 300 includes position estimation apparatus 310, access point (AP) 320, a plurality of anchors (radio communication apparatuses) 330 (330-1, 330-2, . . . , 330-N), and at least one slave device (radio terminal) 340. The N is, for example, an integer equal to or greater than 4, and N=9 in the example illustrated in FIG. 31.

Position estimation apparatus 310 controls whole position estimation system 300, and estimates a position of slave device 340 based on information indicating a reception status of radio communication between anchor 330 and other anchors 330 on one hand and slave device 340 on the other. Position estimation apparatus 310 is a Personal Computer (PC), for example. The configuration of position estimation apparatus 310 will be described later with reference to FIG. 32.

Hereinafter, the present disclosure will be described using an RSSI as an example of the information. Embodiment 3 can also be implemented, however, using other information that other anchors 330 and slave device 340 can measure and can be used for estimating a relative position between anchors 330 or between anchor 330 and slave device 340. Such information includes, for example, an arriving direction of radio waves from other anchors 330 or slave device 340, or an arriving time of radio waves from other anchors 330 or slave device 340.

AP 320 relays processing of transmitting and receiving signals between position estimation apparatus 310 and anchors 330 on one hand and slave device 340 on the other. AP 320 and position estimation apparatus 310 are connected via a wired local area network (LAN), for example. AP 320 performs radio communication with anchors 330 and slave device 340. By way of example, radio signals in the 920 MHz band are used for the radio communication. As another example, the radio communication includes specified low power communication, a wireless LAN, Bluetooth, a Low Power Wide Area (LPWA), LoRa, Narrow Band-Internet of Things (NB-IoT), or Sigfox. The configuration of AP 320 will be described later with reference to FIG. 33.

Anchors 330 perform radio communication with position estimation apparatus 310, anchors 330, or slave device 340 via AP 320. By way of example, radio signals in the 920 MHz band are used for the radio communication. As another example, the radio communication includes specified low power communication, a wireless LAN, Bluetooth, a Low Power Wide Area (LPWA), LoRa, Narrow Band-Internet of Things (NB-IoT), or Sigfox. Anchors 330 are installed in known positions (installation positions). The configuration of anchor 330 will be described later with reference to FIG. 34.

Slave device 340 performs radio communication with position estimation apparatus 310 or anchors 330 via AP 320. By way of example, radio signals in the 920 MHz band are used for the radio communication. As another example, the radio communication includes specified low power communication, a wireless LAN, Bluetooth, a Low Power Wide Area (LPWA), LoRa, Narrow Band-Internet of Things (NB-IoT), or Sigfox. The position of slave device 340 is unknown. The configuration of slave device 340 will be described later with reference to FIG. 35.

Specific radio terminal IDs are respectively assigned to AP 320, anchors 330, and slave device 340. In addition, anchors 330 and slave device 340 can measure the information indicating the reception status of the radio communication with other anchors 330 or slave device 340.

Figure 32:
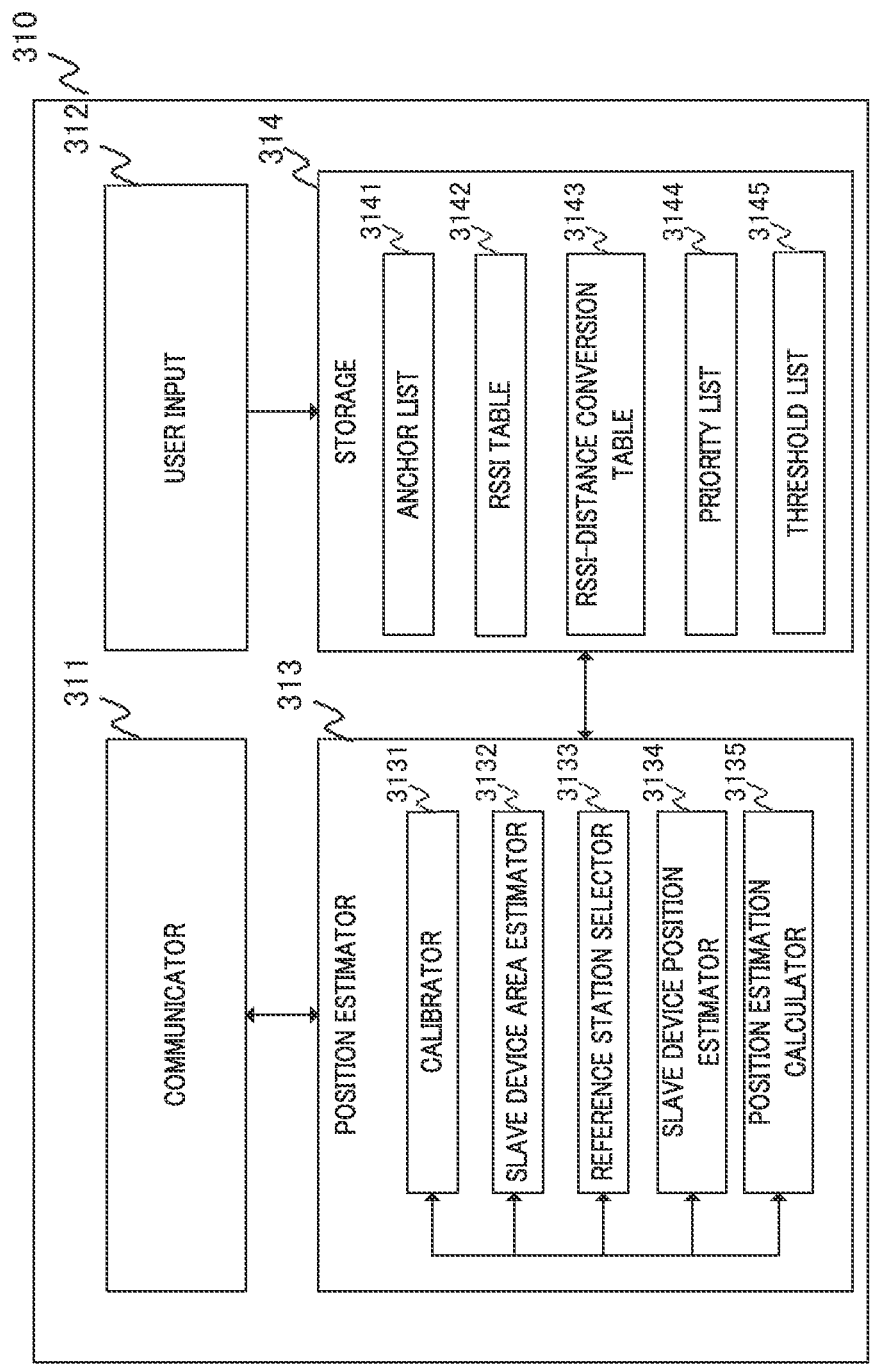
FIG. 32 illustrates an exemplary configuration of a position estimation apparatus according to Embodiment 3.

<Configuration of Position Estimation Apparatus>
FIG. 32 illustrates an exemplary configuration of position estimation apparatus 310 according to Embodiment 3. Position estimation apparatus 310 includes communicator 311, user input 312, position estimator 313, and storage 314.

Communicator 311 performs transmission processing of a signal to be transmitted to AP 320, and reception processing of a signal to be received from AP 320. Communicator 311 is, for example, a communication interface of a wireless or wired LAN.

For example, communicator 311 transmits a request packet for transmitting RSSI history generated in position estimator 313 to AP 320. The request packet for transmitting RSSI history here is a packet including a destination radio terminal ID and requesting transmission of RSSI history, to anchor 330 or slave device 340 identified by the destination radio terminal ID. Communicator 311 also receives, from AP 320, a response packet for transmitting RSSI history transmitted by anchor 330 or slave device 340 identified by the destination radio terminal IDs in response to reception of the request packet for transmitting RSSI history, for example.

The response packet for transmitting RSSI history here is a packet including a source radio terminal ID, a destination radio terminal ID, and RSSI information. The RSSI information includes at least one of the history of the source radio terminal IDs of target packets for RSSI measurement and the history of the RSSIs of the target packets for the measurement. Communicator 311 then extracts the RSSI information from the response packet for transmitting RSSI history, and outputs the extracted information to position estimator 313.

User input 312 receives user inputs of commands or parameters for position estimation apparatus 310. User input 312 generates anchor list 3141 including the radio terminal IDs and position information of anchors 330 based on the command or parameter inputted by a user, and generates threshold list 3145A (see FIG. 42A) including preferred position estimation accuracy for each area. User input 312 then outputs anchor list 3141 and threshold list 3145A to storage 314. User input 312 includes, for example, a keyboard and a pointing device such as a mouse or a trackball.

Position estimator 313 performs position estimation for anchors 330 or slave device 340 based on the RSSI information collected via communicator 311. Position estimator 313 includes calibrator 3131, slave device area estimator 3132, reference station selector 3133, slave device position estimator 3134, and position estimation calculator 3135.

Calibrator 3131 configures a plurality of areas on a target area for the position estimation, and prepares RSSI-distance conversion table 3143 (see FIG. 39) and priority list 3144 (see FIG. 40) for each area. Methods of preparing RSSI-distance conversion table 3143 and priority list 3144 will be described later with reference to FIGS. 37 to 40.

Slave device area estimator 3132 estimates an area where slave device 340 is located (hereinafter, also referred to as a location area). A method of estimating the area where slave device 340 is located will be described later with reference to FIGS. 36 and 43.

Reference station selector 3133 selects a plurality of reference stations which are a combination of anchors 330 to be used for the position estimation for slave device 340. A method of selecting the reference stations will be described later with reference to FIGS. 36 and 44.

Slave device position estimator 3134 performs the position estimation for slave device 340 based on the RSSIs between slave device 340 and the reference stations. In addition, slave device position estimator 3134 determines whether to indicate a position estimation result to slave device 340, re-estimate the area where slave device 340 is located, or re-select the reference stations, based on a convergence status of the position estimation result and the estimation result of the location area. The convergence of the position estimation result here indicates that a variance value (variation) of a plurality of position estimation result candidates included in the position estimation result is smaller than a predetermined threshold. A position estimation method for slave device 340 will be described later with reference to FIGS. 36 and 46.

Position estimation calculator 3135 calculates a position estimation result of a position estimation target. Position estimation calculator 3135 calculates a position estimation result of an absolute position of the position estimation target based on the RSSIs between the position estimation target and at least three anchors 330. Position estimation calculator 3135 also calculates four position estimation result candidates and a variance value for the absolute position of the position estimation target based on the RSSIs between the position estimation target and at least four anchors 330.

For example, position estimation calculator 3135 inputs the RSSI between the position estimation target and anchor 330, and calculates a distance between the position estimation target and anchor 330 based on RSSI-distance conversion table 3143 (see FIG. 39) for each position estimation target area. Next, position estimation calculator 3135 calculates a relative position of the position estimation target to anchor 330 based on the calculated distance and the principle of three-point positioning, for example. Position estimation calculator 3135 then calculates the position estimation result of the absolute position of the position estimation target based on the calculated relative position and the position information in anchor list 3141.

Storage 314 stores data used in position estimation apparatus 310. Storage 314 includes, for example, a memory device such as a Read Only Memory (ROM) or a Random Access Memory (RAM), or a storage device such as a Hard Disc Drive (HDD) or a Solid State Drive (SSD).

Storage 314 stores anchor list 3141, RSSI table 3142, RSSI-distance conversion table 3143, priority list 3144, and threshold list 3145.

Anchor list 3141 includes the radio terminal IDs and the position information of anchors 330. By way of example, the radio terminal IDs and the position information of the anchors are configured by a user via user input 312.

RSSI table 3142 includes receiving-side radio terminal IDs, transmitting-side radio terminal IDs, and RSSIs between the receiving-side radio terminals and the transmitting-side radio terminals. RSSI table 3142 is generated by, for example, position estimator 313. Contents of RSSI table 3142 will be described later with reference to <Table 1> to <Table 4>.

RSSI-distance conversion table 3143 includes a conversion table of the RSSI and the distance for each area. RSSI-distance conversion table 3143 is generated by position estimator 313, for example. RSSI-distance conversion table 3143 will be described later in detail with reference to FIGS. 38 and 39.

Priority list 3144 includes priorities of anchors 330 to be used as reference stations for each area. Priority list 3144 is generated by position estimator 313. Priority list 3144 will be described later in detail with reference to FIG. 40.

Threshold list 3145 includes preferred position estimation accuracy and a threshold for position estimation convergence determination for each area. The preferred position estimation accuracy is configured by a user via user input 312. The thresholds of the position estimation convergence determination are configured by position estimator 313. Threshold list 3145 will be described later in detail with reference to FIGS. 42A and 42B.

<Configuration of Access Point>

Figure 33:
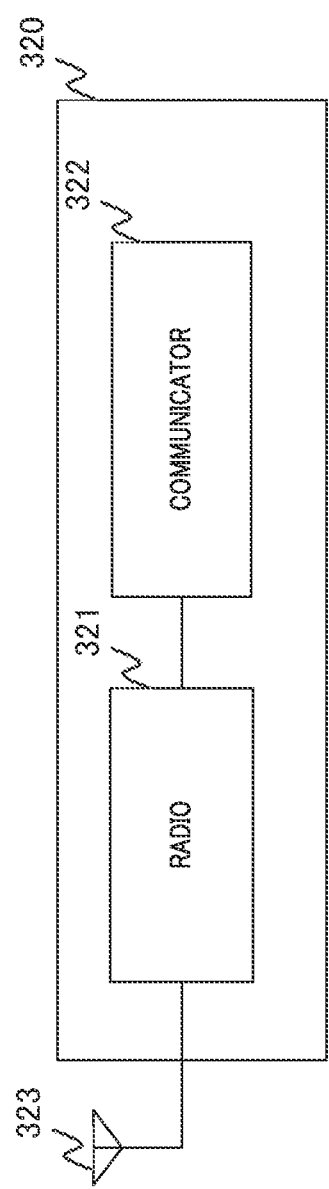
FIG. 33 illustrates an exemplary configuration of an access point (AP) according to Embodiment 3.

FIG. 33 illustrates an exemplary configuration of AP 320 according to Embodiment 3. AP 320 includes radio 321, communicator 322, and antenna 323.

Radio 321 demodulates a signal received by antenna 323, and outputs the signal to communicator 322. In addition, radio 321 modulates a signal inputted from communicator 322, and transmits the signal to each anchor 330 or slave device 340 from antenna 323.

Communicator 322 performs transmission processing of a signal to be transmitted to radio 321, and reception processing of a signal to be received from radio 321. Communicator 322 is, for example, a communication interface of a wired LAN. In addition, communicator 322 relays data transmission and reception between position estimation apparatus 310 and anchors 330 on one hand and slave device 340 on the other. For example, communicator 322 outputs, to radio 321, the request packet for transmitting RSSI history received from position estimation apparatus 310, and transmits, to position estimation apparatus 310, the response packet for transmitting RSSI history inputted from radio 321.

<Configuration of Anchor>

Figure 34:
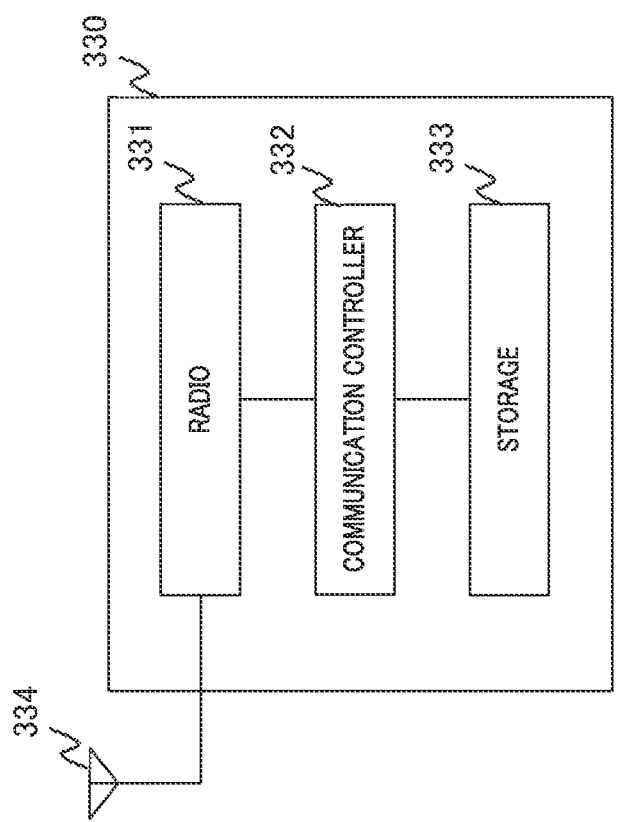
FIG. 34 illustrates an exemplary configuration of an anchor according to Embodiment 3.

FIG. 34 illustrates an exemplary configuration of anchor 330 according to Embodiment 3. Anchor (radio communication apparatus) 330 includes radio 331, communication controller 332, storage 333, and antenna 334.

Radio 331 demodulates a signal received by antenna 334, and outputs the signal to communication controller 332. In addition, radio 331 modulates a signal inputted from communication controller 332, and transmits the signal to AP 320, each anchor 330, or slave device 340 from antenna 334.

In response to reception of a radio packet from another anchor 330 or slave device 340, communication controller 332 outputs, to storage 333, the radio terminal ID of that anchor 330 or slave device 340, which is a source of the radio packet, and the RSSI between the source radio terminal and anchor 330. Additionally, in response to reception of the request packet for transmitting RSSI history from AP 320, communication controller 332 prepares the response packet for transmitting RSSI history based on RSSI history stored in storage 333, and outputs the response packet to radio 331. The response packet for transmitting RSSI history includes the source radio terminal ID, the radio terminal ID of anchor 330, and the RSSI between the source radio terminal and anchor 330.

Storage 333 stores the source radio terminal ID and the RSSI outputted from communication controller 332 as RSSI history. Storage 333 includes, for example, a memory device such as a Read Only Memory (ROM) or a Random Access Memory (RAM), or a storage device such as a Hard Disc Drive (HDD) or a Solid State Drive (SSD).

<Configuration of Slave Device>

Figure 35:
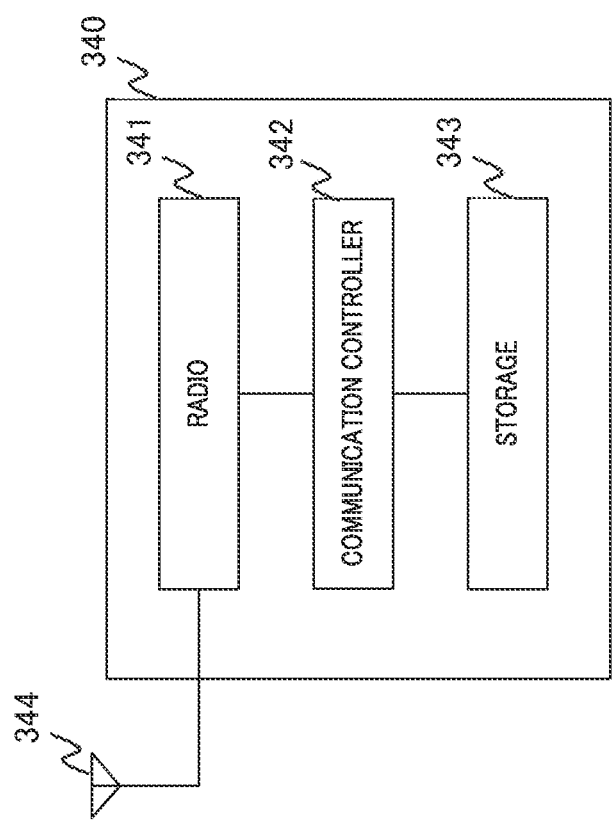
FIG. 35 illustrates an exemplary configuration of a slave device according to Embodiment 3.

FIG. 35 illustrates an exemplary configuration of slave device 340 according to Embodiment 3. Slave device (radio terminal) 340 includes radio 341, communication controller 342, storage 343, and antenna 344.

Radio 341 demodulates a signal received by antenna 344, and outputs the signal to communication controller 342. In addition, radio 341 modulates a signal inputted from communication controller 342, and transmits the signal to AP 320 or each anchor 330 from antenna 344.

In response to reception of a radio packet from anchor 330, communication controller 342 outputs, to storage 343, the radio terminal ID of anchor 330, which is a source of the radio packet, and the RSSI between the source radio terminal and slave device 340. Additionally, in response to reception of the request packet for transmitting RSSI history from AP 320, communication controller 342 prepares the response packet for transmitting RSSI history based on RSSI history stored in storage 343, and outputs the response packet to radio 341. The response packet for transmitting RSSI history includes the source radio terminal ID, the radio terminal ID of slave device 340, and the RSSI between the source radio terminal and slave device 340.

Storage 343 stores the source radio terminal ID and the RSSI outputted from communication controller 342 as RSSI history. Storage 343 includes, for example, a memory device such as a Read Only Memory (ROM) or a Random Access Memory (RAM), or a storage device such as a Hard Disc Drive (HDD) or a Solid State Drive (SSD).

<Position Estimation Procedure>

Figure 36:
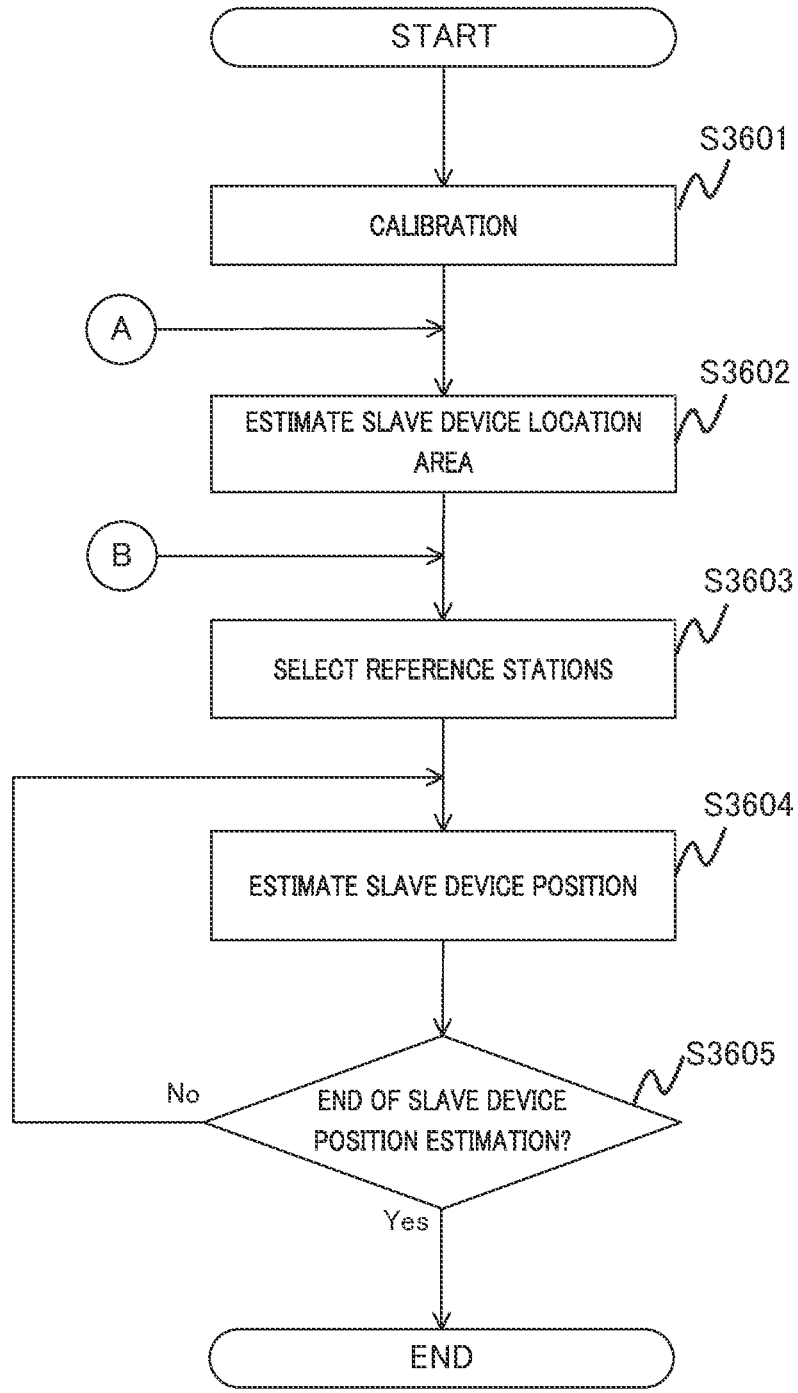
FIG. 36 is a flowchart describing exemplary processing in the position estimation apparatus according to Embodiment 3.

FIG. 36 is a flowchart illustrating exemplary processing in position estimation apparatus 310 according to Embodiment 3. The configuration of the preferred position estimation accuracies for anchor list 3141 and threshold list 3145 is completed prior to implementation of the processing illustrated in FIG. 36. The preferred position estimation accuracies for anchor list 3141 and threshold list 3145 are configured by a user via user input 312, for example.

First of all, calibrator 3131 and position estimation calculator 3135 of position estimator 313 divide a position estimation target area into areas, and perform calibration to generate RSSI-distance conversion table 3143 and priority list 3144 for each area in step S3601. The process in step S3601 will be described later in detail with reference to FIGS. 37 to 42B.

Next, slave device area estimator 3132 and position estimation calculator 3135 of position estimator 313 estimate an area where slave device 340 is located, in step S3602. By way of example, slave device area estimator 3132 and position estimation calculator 3135 perform step S3602 and the subsequent steps in response to communicator 311 of position estimation apparatus 310 receiving a position estimation request packet. The position estimation request packet includes, for example, the radio terminal ID of slave device 340, which is a source of radio communication, the radio terminal ID of AP 320, which is a destination of the radio communication, and a position estimation request command. The process in step S3602 will be described later in detail with reference to FIG. 43.

In step S3603, reference station selector 3133 and position estimation calculator 3135 of position estimator 313 select reference stations with which the position estimation for slave device 340 is converged. The process in step S3603 will be described later in detail with reference to FIG. 44.

In step S3604, slave device position estimator 3134 and position estimation calculator 3135 of position estimator 313 perform the position estimation for slave device 340 using the reference stations for the area where slave device 340 is located. The process in step S3604 will be described later in detail with reference to FIG. 46.

Subsequently, position estimation apparatus 310 determines whether to terminate the position estimation processing in step S3605. For example, when user input 312 has received a command to terminate the position estimation processing, position estimation apparatus 310 determines to terminate the position estimation processing.

When determining to terminate the position estimation processing (Yes in step S3605), position estimation apparatus 310 terminates the processing. When determining not to terminate the position estimation processing (No in step S3605), position estimation apparatus 310 returns the processing to step S3604. As a result, the position estimation processing for slave device 340 is continued. Position estimation apparatus 310 can track movement of slave device 340 by repeatedly performing step S3604.

<Position Estimation Procedure: Calibration Processing>

Figure 37:
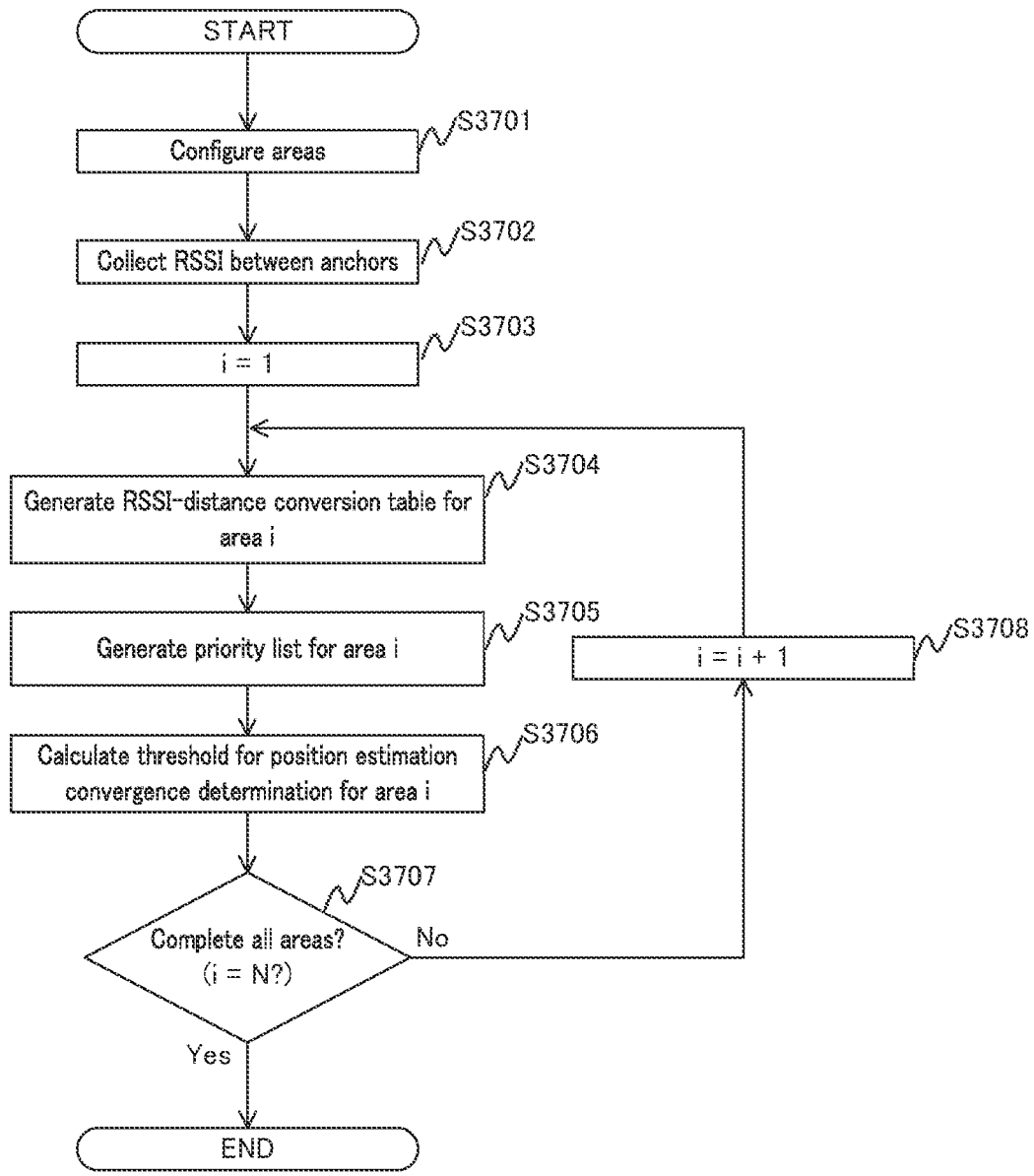
FIG. 37 is a flowchart describing exemplary processing in calibration according to Embodiment 3.

FIG. 37 is a flowchart illustrating exemplary processing in the calibration (step S3601 in FIG. 36) according to Embodiment 3.

First of all, in step S3701, calibrator 3131 configures areas by dividing a position estimation target area so that each area includes one or more anchors 330. Note that a description will be given below of an example where the areas are configured so that each area includes single anchor 330 and a boundary of each area bisects a distance between the anchors.

Next, in step S3702, calibrator 3131 collects the RSSIs between anchors 330, generates RSSI table 3142 (see FIG. 32) for all anchors 330, and outputs the table to storage 314. For example, calibrator 3131 generates the request packet for transmitting RSSI history addressed to each anchor 330 in order to collect the RSSIs between anchors 330, and outputs the request packet to communicator 311. Communicator 311 transmits the generated request packet for transmitting RSSI history to each anchor 330 via AP 320. Communicator 311 then receives the response packet for transmitting RSSI history from each anchor 330 via AP 320, and acquires the RSSI information based on the received response packet for transmitting RSSI history. Subsequently, calibrator 3131 generates RSSI table 3142 based on the acquired RSSI information, and outputs the table to storage 314.

An example of RSSI table 3142 after performing step S3702 is represented in <Table 1>.

Figure 38:
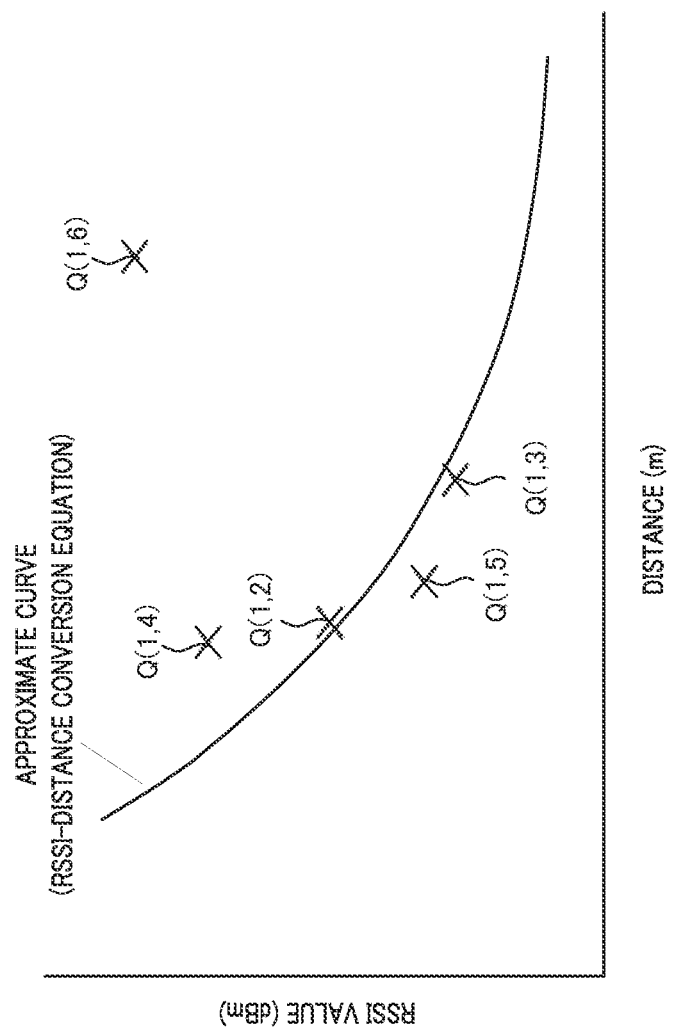
FIG. 38 is a diagram describing exemplary calculation of an approximate curve.

FIG. 38 is a diagram illustrating exemplary calculation of the approximate curve. The chart illustrated in FIG. 38 has the distance (m) on the horizontal axis and the RSSI value (dBm) on the vertical axis. The distances between anchor 330-1 and anchors 330-2 to 330-6 are defined as r2 to r6 (m), respectively. The extracted RSSIs between anchors 330-2 to 330-6 and anchor 330-1 as the transmitting side or the receiving side are defined as x2 to x6 (dBm), respectively. FIG. 38 includes points Q (1, j) (j=2 to 6) having coordinate values (rj, xj).

The approximate curve is expressed as follows, for example, representing the distance as "r" (m) and the RSSI value as "x" (dBm):

$$x = C1 + C2 \times \log(r) \qquad \text{(Equation 1)}.$$

Herein, C1 and C2 represent parameters that are independent of "r". The approximate curve can be calculated by determining parameters C1 and C2 for points Q (1, j) (j=2 to 6) applying the least squares method to Equation 1. Then, calibrator 3131 generates RSSI-distance conversion table 3143 based on the derived approximate curve.

FIG. 39 illustrates an exemplary RSSI-distance conversion table 3143. For example, calibrator 3131 calculates distances "r" for the RSSIs from −30 dBm to 0 dBm in 1 dBm increments for area "i", and configures the values of distance "r" in the i-th row of RSSI-distance conversion table 3143.

Referring back to FIG. 37, in step S3705, calibrator 3131 configures the radio terminal IDs of anchors 330-j (j≠i) for

TABLE 1

Example of RSSI table 3142 after performing step S3702

|  |  | Receiving-side radio terminal ID | | | | |
|---|---|---|---|---|---|---|
|  |  | 1 | 2 | 3 | 4 | ... | N |
| Transmitting-side radio terminal ID | 1 | — | −20 dBm | −19 dBm | −9 dBm | | −5 dBm |
| | 2 | −13 dBm | — | −10 dBm | −21 dBm | | −18 dBm |
| | 3 | −30 dBm | −19 dBm | — | −25 dBm | | −26 dBm |
| | 4 | −29 dBm | −13 dBm | −30 dBm | — | | −24 dBm |
| | . | | | | | | |
| | . | | | | | | |
| | . | | | | | | |
| | N | −19 dBm | −19 dBm | −19 dBm | −19 dBm | | — |
| | M | | | | | | |

In <Table 1>, radio terminal IDs 1 to N represent the radio terminal IDs of anchors 330, and the radio terminal ID M represents the radio terminal ID of slave device 340. As indicated in <Table 1>, RSSI values between anchors 330 are configured in RSSI table 3142 generated in step S3702.

Note that, in some cases, it is difficult to collect the RSSIs between anchors 330, e.g., it takes time to collect the RSSIs due to a large number of anchors 330, or there is a pair of anchors 330 that are incapable of mutual radio communication. In such cases, the RSSI collection may be performed between some of anchors 330 instead of the RSSI collection between all anchors 330.

In step S3703, calibrator 3131 configures 1 as area index value "i".

Next, calibrator 3131 generates RSSI-distance conversion table 3143 for area "i" in step S3704. For example, calibrator 3131 extracts, from RSSI table 3142 stored in storage 314, the RSSIs between anchors 330 and anchor 330-i in area "i" as a transmitting side or a receiving side. Then, calibrator 3131 calculates an approximate curve indicating a relation between known distance between anchors 330 and the extracted RSSI, using a least squares method, for example.

the priorities in area "i" in priority list 3144, in order from the anchor with smallest difference (deviation) between the derived approximate curve and the collected RSSI. Hereinafter, "i" is used as the radio terminal ID of anchor 330-i (i=1, N) for simplicity.

FIG. 40 illustrates exemplary priority list 3144. For area 1 (i=1), for example, the order of points Q (1, j) (j=2 to 6) from the one with the smallest difference between Q (1, j) and the derived approximate curve illustrated in FIG. 38 is Q (1, 2), Q (1, 3), Q (1, 5), Q (1, 4), and Q (1, 6). Calibrator 3131 thus configures radio terminal IDs 2, 3, 5, 4, and 6 in the row of area 1 in priority list 3144 according to the order of the priority.

Referring back again to FIG. 37, in step S3706, calibrator 3131 calculates a threshold to be used for determining whether a position estimation result is converged in the position estimation for slave device 340 in area "i".

Figure 41:
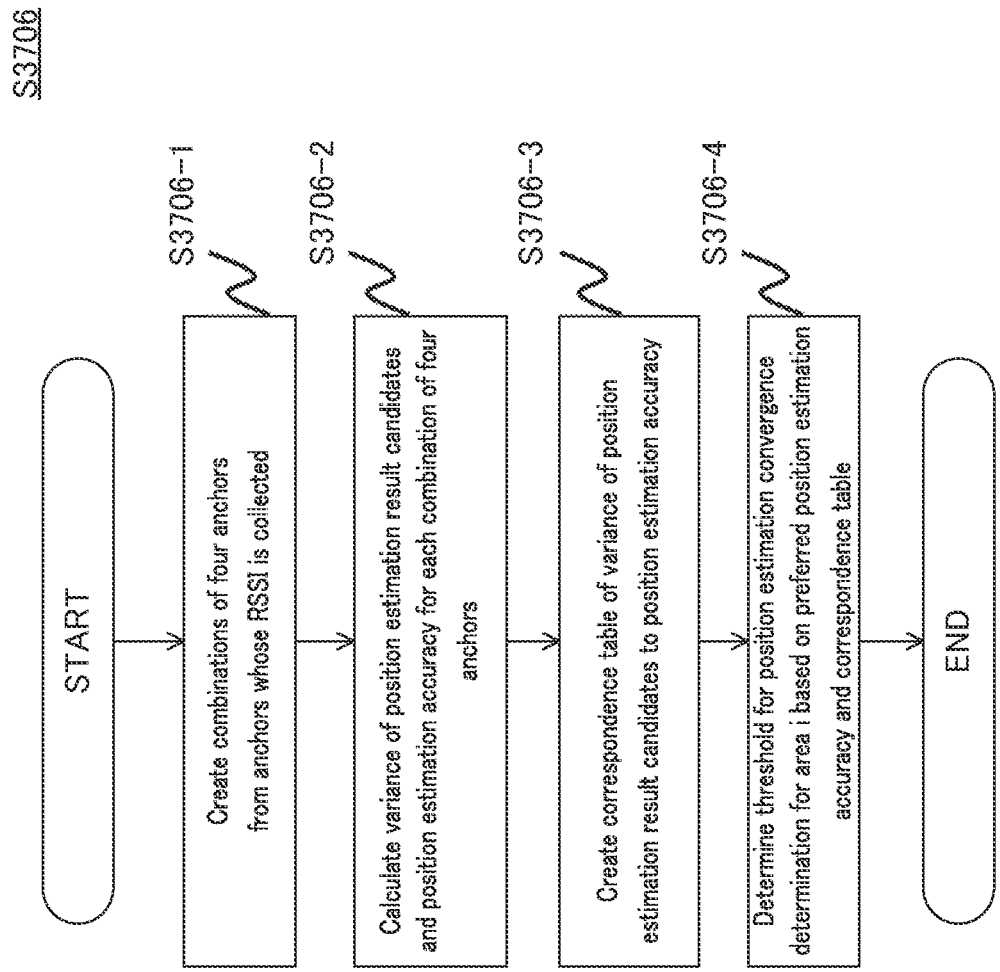
FIG. 41 is a flowchart describing exemplary processing in calculation of a threshold for convergence determination according to Embodiment 3.

FIG. 41 is a flowchart describing exemplary processing in calculation of a threshold for convergence determination (step S3706 in FIG. 37) according to Embodiment 3. FIG. 42A illustrates threshold list 3145A as an example of threshold list 3145 according to Embodiment 3. Position estimation accuracy preferred by a user is configured for each area in threshold list 3145A. The thresholds in threshold list 3145A are calculated according to the processing described in FIG. 41.

In step S3706-1, calibrator 3131 selects four anchors 330 from anchors 330-$j$ ($j \neq i$), and creates combinations of four anchors 330.

Next, in step S3706-2, position estimation calculator 3135 calculates, for each combination of four anchors 330, a variance value of position estimation result candidates and differences (deviations) between an installation position and the position estimation result candidates. For example, position estimation calculator 3135 can calculate a single position estimation result candidate for anchor 330-$i$ by using three anchors in each combination of four anchors 330 and performing three-point positioning based on the RSSIs with anchor 330-$i$. There are a total of four patterns to select three from the four anchors, and thus position estimation calculator 3135 can calculate four position estimation result candidates in total per combination of four anchors 330. Position estimation calculator 3135 calculates a variance value of the position estimation result candidates based on the four position estimation result candidates. In addition, position estimation calculator 3135 calculates deviations between the position estimation result candidates and the installation position, based on the four position estimation result candidates and the known installation position of anchor 330-$i$.

In step S3706-3, calibrator 3131 associates the deviations and the variance value of the position estimation result candidates, which are calculated in step S3706-2, with each other, and creates a correspondence table in which the position estimation accuracy is associated with the variance value of the position estimation result candidates.

Next, in step S3706-4, calibrator 3131 refers to threshold list 3145, configures the variance value of the position estimation result candidates corresponding to the preferred position estimation accuracy configured by a user (or predetermined accuracy) as the threshold to be used for determining whether a position estimation result in the position estimation for slave device 340 in area "i" is converged, and outputs the threshold to threshold list 3145.

FIG. 42B illustrates threshold list 3145B as an example of threshold list 3145 according to Embodiment 3. Threshold list 3145B is generated as a result of the thresholds calculated according to the processing described in FIG. 41 being outputted to threshold list 3145A.

Referring back to FIG. 37, in step S3707, calibrator 3131 determines whether the procedure of steps S3704 to S3706 has been performed for all areas "i".

When the procedure of steps S3704 to S3706 has not been performed for all areas "i" (No in step S3707), calibrator 3131 configures index value i+1, which represents the next area, for index value "i" in step S3708, and proceeds the processing to step S3704.

When the procedure of steps S3704 to S3706 has performed for all areas "i" (Yes in step S3707), calibrator 3131 terminates the calibration processing.

Through the above procedure, RSSI-distance conversion table 3143 and priority list 3144 are generated for all areas "i". Further, anchors 330 with smaller difference from RSSI-distance conversion table 3143, e.g., anchors 330 that can be expected to perform the position estimation for slave device 340 with high accuracy are selected in advance for each area "i".

<Position Estimation Procedure: Slave Device Location Area Determination Processing>

Figure 43:
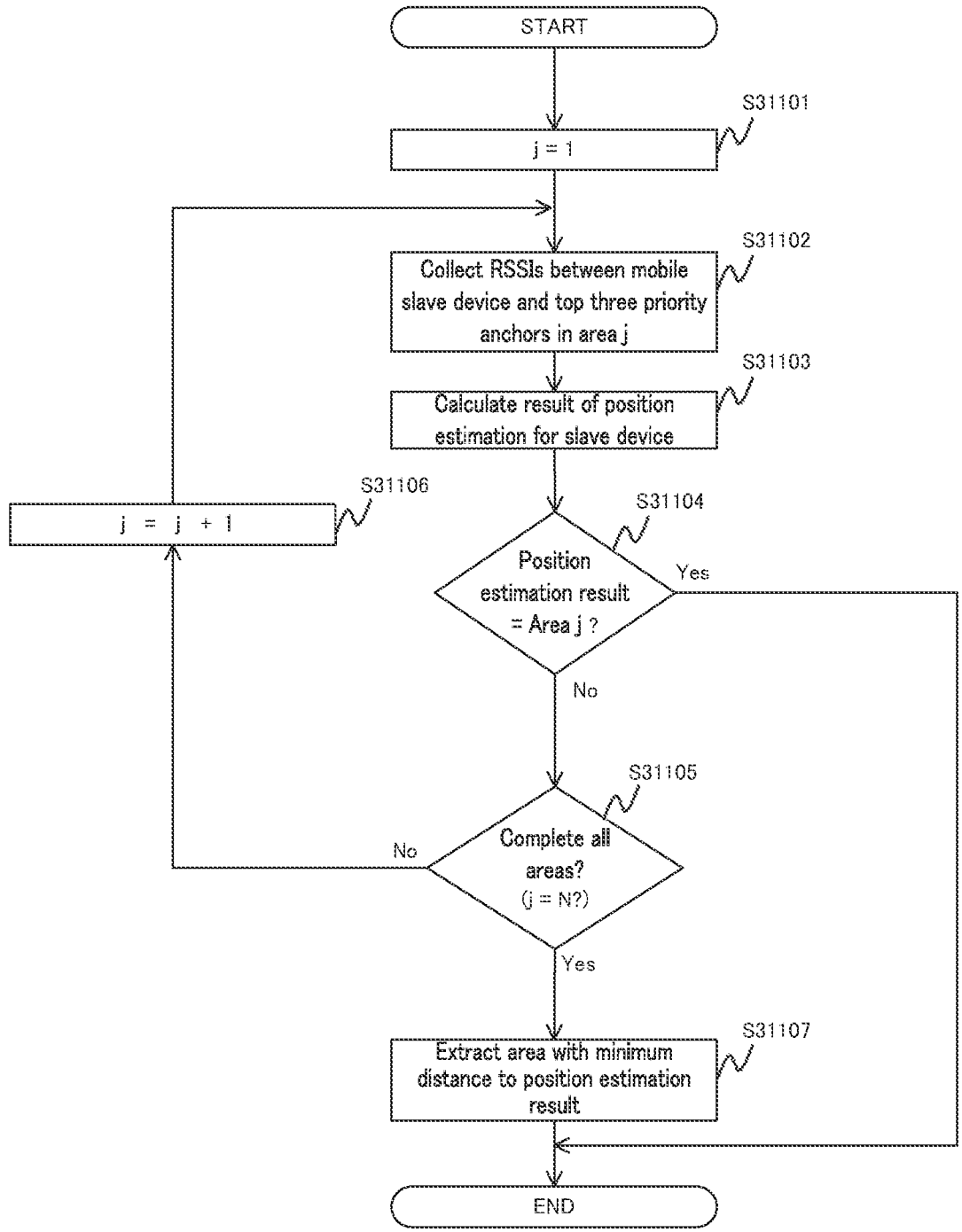
FIG. 43 is a flowchart describing exemplary processing in area determination according to Embodiment 3.

FIG. 43 is a flowchart illustrating exemplary processing in slave device location area determination (step S3602 in FIG. 36) according to Embodiment 3.

First of all, slave device area estimator 3132 configures 1 as area index value "j" in step S31101. Area "j" is a target search area where slave device 340 is searched. Note that, in terms of the selecting order of the search area, an area where slave device 340 is more likely to be located at the start of the position estimation for slave device 340 may be prioritized, such as around the entrance of the room.

Next, in step S31102, slave device area estimator 3132 collects the RSSI between slave device 340 and each of at least three anchors 330 from the top of priority list 3144 in area "j", generates RSSI table 3142 (see FIG. 32), and outputs the table to storage 314.

For example, slave device area estimator 3132 generates the request packets for transmitting RSSI history addressed to each anchor 330 and slave device 340 in order to collect the RSSI between each target anchor 330 and slave device 340, and outputs the request packet to communicator 311. Communicator 311 transmits the generated request packets for transmitting RSSI history to each anchor 330 and slave device 340 via AP 320.

Communicator 311 then receives the response packets for transmitting RSSI history from target anchors 330 and slave device 340 via AP 320, and acquires the RSSI information based on the received response packets for transmitting RSSI history. Subsequently, slave device area estimator 3132 generates RSSI table 3142 based on the acquired RSSI information, and outputs the table to storage 314.

An example of RSSI table 3142 after performing step S31102 is represented in <Table 2>.

TABLE 2

| | | \#1 | \#2 | \#3 | \#4 | ... | \#N |
|---|---|---|---|---|---|---|---|
| | | \multicolumn{6}{c}{Receiving-side radio terminal ID} | | | | | | |

| | | \#1 | \#2 | \#3 | \#4 | ... | \#N |
|---|---|---|---|---|---|---|---|
| Transmitting-side radio terminal ID | \#1 | — | −20 dBm | −19 dBm | −9 dBm | | −5 dBm |
| | \#2 | −13 dBm | — | −10 dBm | −21 dBm | | −18 dBm |
| | \#3 | −30 dBm | −19 dBm | — | −25 dBm | | −26 dBm |
| | \#4 | −29 dBm | −13 dBm | −30 dBm | — | | −24 dBm |
| | . | | | | | | |
| | \#N | −19 dBm | −19 dBm | −19 dBm | −19 dBm | | — |
| | M | −20 dBm | −19 dBm | −21 dBm | | | |

In <Table 2>, the radio terminal IDs of anchors 330 are #1, #2, #3, #4, . . . , #N in the order of priority in area "j", for simplicity. As indicated in <Table 2>, RSSI values between top three anchors 330 and slave device 340 are configured in RSSI table 3142 generated in step S31102.

In step S31103, position estimation calculator 3135 then performs the position estimation for slave device 340 based on RSSI table 3142 generated in step S31102.

Next, in step S31104, slave device area estimator 3132 determines whether the position of slave device 340 indicated by the position estimation result is included in area "j".

When the position estimation result is included in area "j" (Yes in step S31104), slave device area estimator 3132 estimates that the location area of slave device 340 is area "j", and terminates the slave device location area determination processing.

When the position estimation result is not included in area "j" (No in step S31104), slave device area estimator 3132 determines, in step S31105, whether the procedure of steps S31102 to S31104 has been performed for all areas.

When the procedure of steps S31102 to S31104 has not been performed for all areas "j" (No in step S31105), slave device area estimator 3132 configures index value j+1, which represents the next area, in step S31106, and proceeds the processing to step S31102.

When the procedure of steps S31102 to S31104 has performed for all areas "j" (Yes in step S31105), slave device area estimator 3132 proceeds the processing to step S31107. In step S31107, slave device area estimator 3132 estimates that area "j" where the position estimation result in step S31103 is closest to the search area is the location area of slave device 340, and terminates the slave device location area determination processing.

As described above, slave device area estimator 3132 can accurately estimate the location area of slave device 340 by using three anchors 330 from the top of priority list 3144 for each area "j".

<Position Estimation Procedure: Reference Station Selection Processing>

Figure 44:
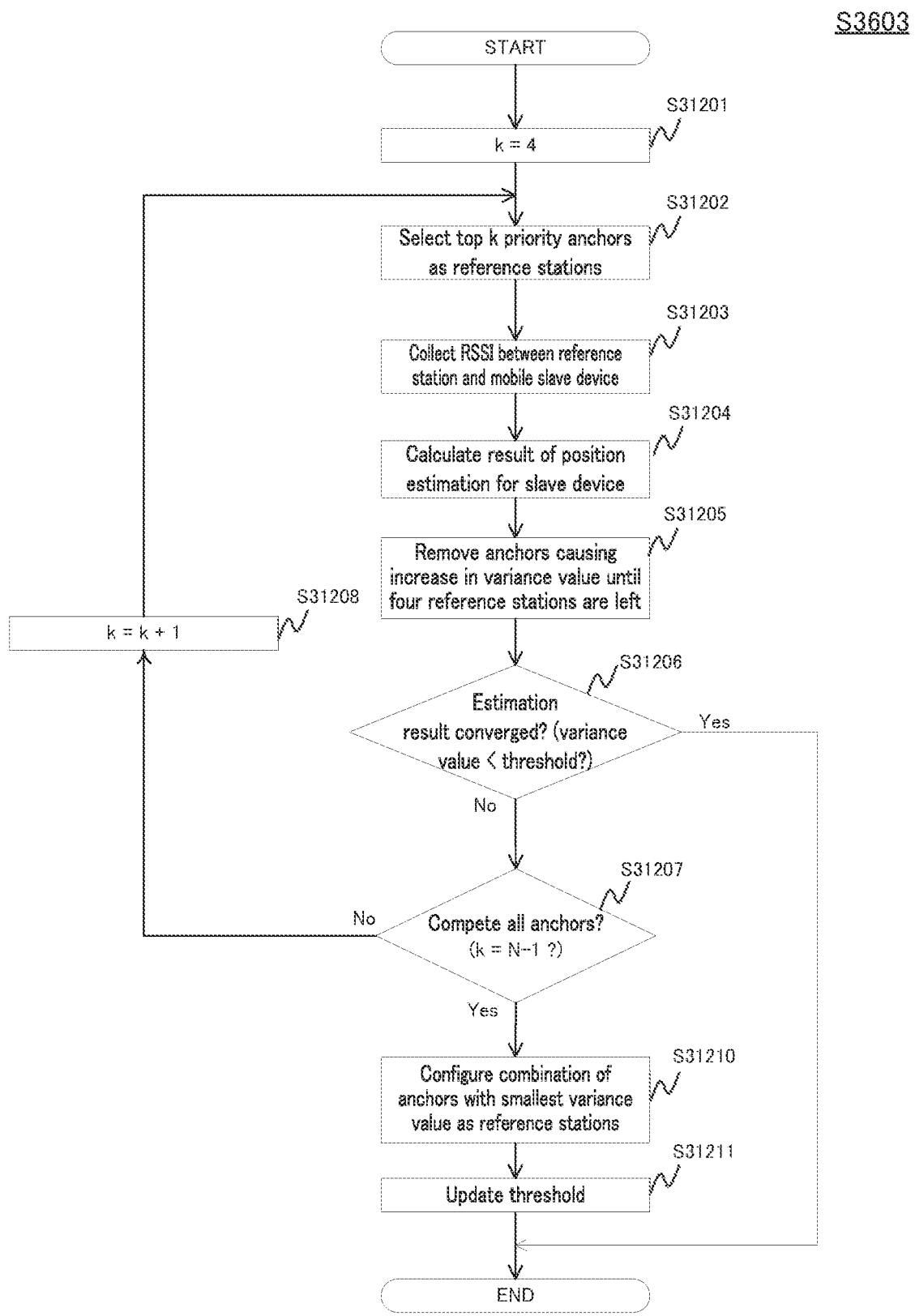
FIG. 44 is a flowchart describing exemplary processing in reference station selection according to Embodiment 3.

FIG. 44 is a flowchart describing exemplary processing in reference station selection (step S3603 in FIG. 36) according to Embodiment 3.

First of all, reference station selector 3133 configures 4 as the number k of reference stations to be used for slave device position estimation, in step S31201.

Next, in step S31202, reference station selector 3133 selects k of anchors 330 from the top of priority list 3144 (see FIG. 40) for the location area of slave device 340 as the reference stations.

In step S31203, reference station selector 3133 collects the RSSI between each reference station and slave device 340, generates RSSI table 3142 (see FIG. 32), and outputs the table to storage 314. For example, reference station selector 3133 generates the request packets for transmitting RSSI history addressed to each reference station and slave device 340 in order to collect the RSSI between each reference station and slave device 340, and outputs the request packets to communicator 311. Communicator 311 transmits the generated request packets for transmitting RSSI history to each reference station and slave device 340 via AP 320. Communicator 311 then receives the response packets for transmitting RSSI history from each reference station and slave device 340 via AP 320, and acquires the RSSI information based on the received response packets for transmitting RSSI history. Subsequently, reference station selector 3133 generates RSSI table 3142 based on the acquired RSSI information, and outputs the table to storage 314.

An example of RSSI table 3142 after performing step S31203 is represented in <Table 3>.

TABLE 3

Example of RSSI table 3142 after performing step S31203

| | | Receiving-side radio terminal ID | | | | |
|---|---|---|---|---|---|---|
| | | #1 | #2 | #3 | #4 | . . . #N |
| Transmitting-side radio terminal ID | #1 | — | −20 dBm | −19 dBm | −9 dBm | −5 dBm |
| | #2 | −13 dBm | — | −10 dBm | −21 dBm | −18 dBm |
| | #3 | −30 dBm | −19 dBm | — | −25 dBm | −26 dBm |
| | #4 | −29 dBm | −13 dBm | −30 dBm | — | −24 dBm |
| | . . . | | | | | |
| | #N | −19 dBm | −19 dBm | −19 dBm | −19 dBm | — |
| | M | −20 dBm | −19 dBm | −21 dBm | −28 dBm | |

In <Table 3>, the radio terminal IDs of anchors 330 are #1, #2, #3, #4, . . . , #N in the order of priority in the location area of slave device 340, for simplicity. As indicated in <Table 3>, RSSI values between top four anchors 330 and slave device 340 are configured in RSSI table 3142 generated in step S31203.

Next, in step S31204, position estimation calculator 3135 calculates the result of the position estimation for slave device 340 based on RSSI table 3142 generated in step S31203. For example, position estimation calculator 3135 calculates the distance between each reference station and slave device 340 using RSSI-distance conversion table 3143 (see FIG. 39) for the location area of slave device 340 based on RSSI table 3142.

Position estimation calculator 3135 then calculates a relative position of slave device 340 to each reference station based on the calculated distance and the principle of three-point positioning, for example. Subsequently, position estimation calculator 3135 calculates the position estimation result of the absolute position of slave device 340 based on the calculated relative position and the position information in anchor list 3141. Since at least four reference stations are selected in step S31202, position estimation calculator 3135 calculates four position estimation result candidates for slave device 340, and also calculates a mean value and a variance value of the position estimation result candidates.

Next, when there are five or more reference stations, reference station selector 3133 removes, in step S31205, anchors 330 that cause increase in the variance value of the position estimation result candidates from the reference stations one by one until four reference stations are left. Position estimation calculator 3135 then calculates the mean value and the variance value of the position estimation result candidates by using the four reference stations.

Next, in step S31206, reference station selector 3133 determines whether the variance value of the position estimation result candidates is smaller than a predetermined threshold. By way of example, the predetermined threshold is a threshold corresponding to the position estimation accuracy closest to the position estimation accuracy preferred by a user (or predetermined accuracy) among the thresholds outputted to threshold list 3145 in step S3706-4 in FIG. 41. As another example, the predetermined threshold is the variance value of the position estimation result candidates of slave device 340 calculated using four or more anchors 330 in step S31103 in FIG. 43.

When the variance value of the position estimation result candidates is smaller than the predetermined threshold (Yes in step S31206), it may be determined that the position estimation result (the mean value and the variance value of the position estimation result candidates) calculated in step S31205 is converged. Thus, reference station selector 3133 terminates the reference station selection processing.

When the variance value of the position estimation result candidates is not smaller than the predetermined threshold (No in step S31206), it may be determined that the position estimation result calculated in step S31205 is not converged. Thus, reference station selector 3133 determines, in step S31207, whether all anchors 330 listed in priority list 3144 for the location area of slave device 340 have been selected as the reference stations.

When all anchors 330 listed in priority list 3144 have not been selected as the reference stations (No in step S31207), reference station selector 3133 increases, in step S31208, the number k of the reference stations to be used for the slave device position estimation by one, and proceeds to step S31202.

When all anchors 330 listed in priority list 3144 have been selected as the reference stations (Yes in step S31207), reference station selector 3133 selects, in step S31210, the combination of anchors 330 having the smallest variance value calculated in step S31205 as the reference stations.

In a case where step S31210 is performed, there is no combination of anchors 330 having the variance value of the position estimation result candidates smaller than the predetermined threshold in the location area of slave device 340. Thus, reference station selector 3133 configures, in step S31211, the smallest variance value determined in step S31210 as a new threshold of the variance value of the position estimation result candidates for the location area of slave device 340, and updates threshold list 3145. Reference station selector 3133 then terminates the reference station selection processing.

A description will be given of processing of searching for the combination of anchors 330 to be used as the reference stations so that the position estimation result is converged, with reference to FIGS. 45A to 45C.

Figure 45A:
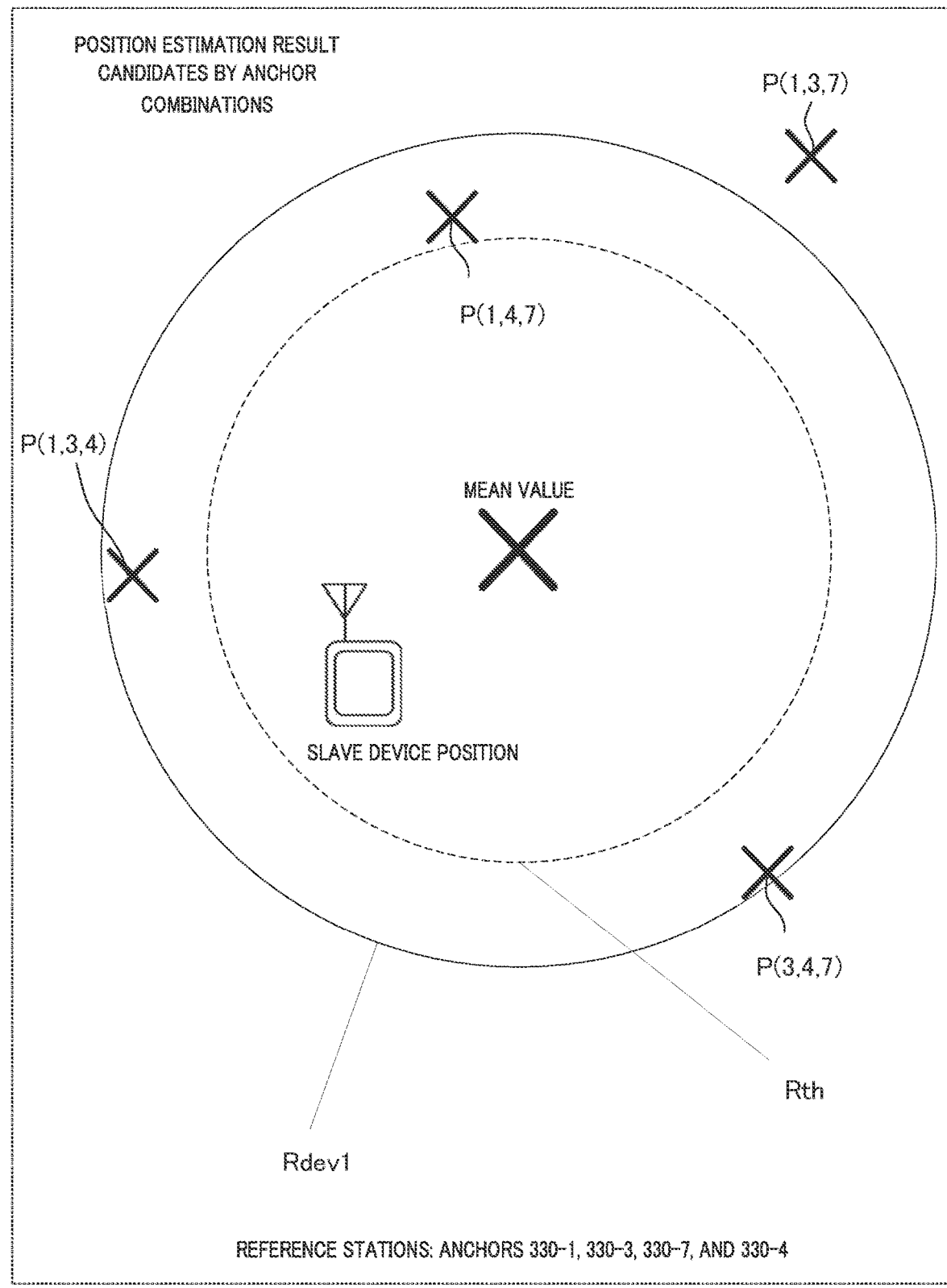
FIG. 45A illustrates exemplary position estimation result candidates in the reference station selection according to Embodiment 3.

FIG. 45A illustrates an example of four position estimation result candidates in the reference station selection according to Embodiment 3.

First in step S31204 in FIG. 44, four position estimation result candidates P (1, 3, 4), P (1, 4, 7), P (1, 3, 7), and P (3, 4, 7) are calculated by using the reference stations of four anchors 330-1, 330-3, 330-7, and 330-4 in area 2, as illustrated in FIG. 45A. Herein, P (m1, m2, m3) represents the position of slave device 340 estimated using three anchors 330-$m1$, 330-$m2$, and 330-$m3$.

As illustrated in FIG. 45A, variance value Rdev1 of the position estimation result candidates is not smaller than predetermined threshold Rth. In this case, the position estimation result may be determined to be not converged in step S31206 in FIG. 44. Steps S31207 and S31208 in FIG. 44 are thus performed, and the number of anchors 330 to be used as the reference stations is increased by one to five.

Figure 45B:
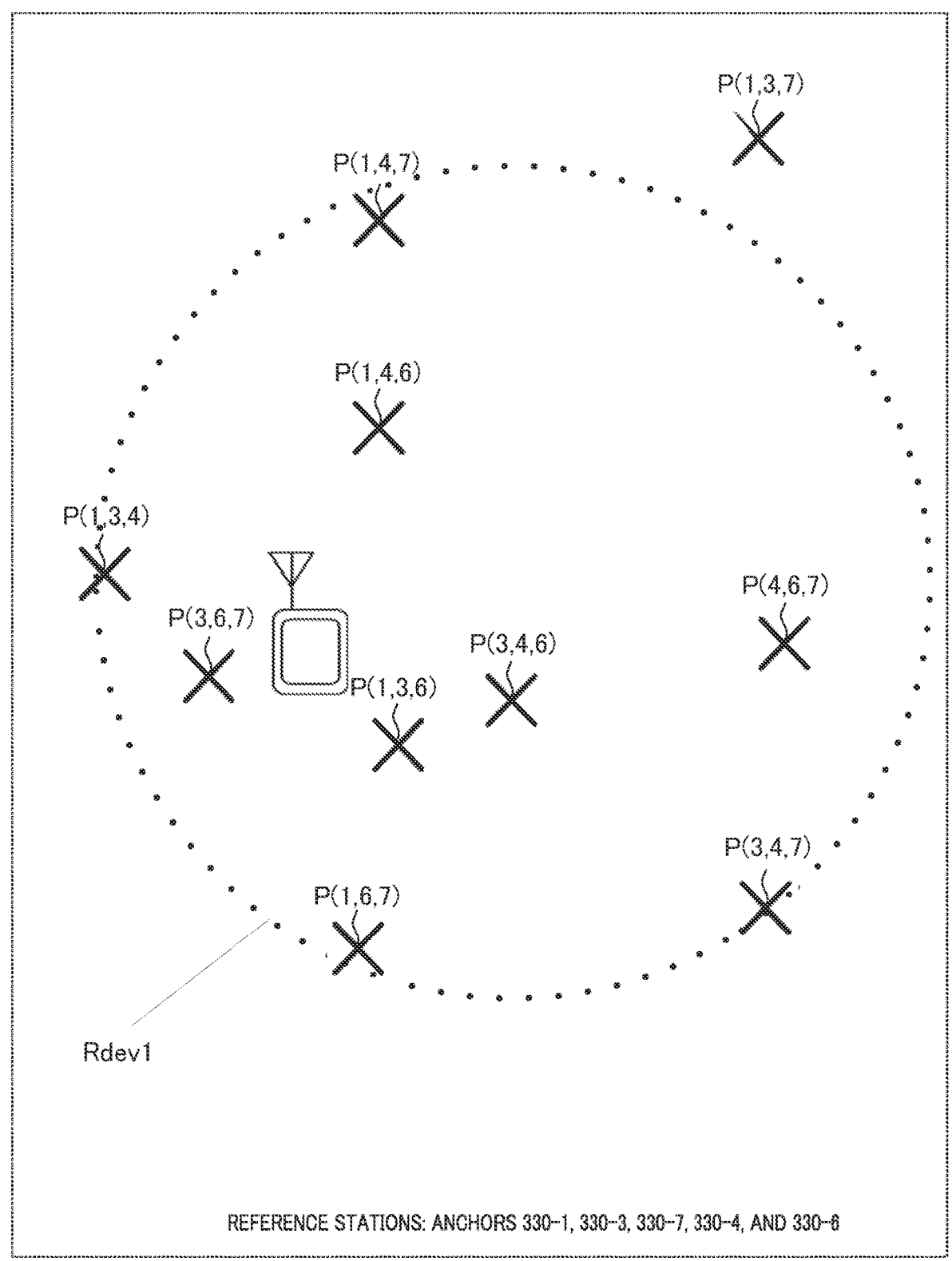
FIG. 45B illustrates other exemplary position estimation result candidates in the reference station selection according to Embodiment 3.

FIG. 45B illustrates an example of five position estimation result candidates in the reference station selection according to Embodiment 3.

In step S31204 in FIG. 44, six position estimation result candidates P (3, 6, 7), P (1, 4, 6), P (1, 3, 6), P (1, 6, 7), P (3, 4, 6), and P (4, 6, 7) are calculated by using the reference stations of five anchors 330-1, 330-3, 330-7, 330-4, and 330-6, in addition to the four position estimation result candidates P (1, 3, 4), P (1, 4, 7), P (1, 3, 7), and P (3, 4, 7), as illustrated in FIG. 45B.

Figure 45C:
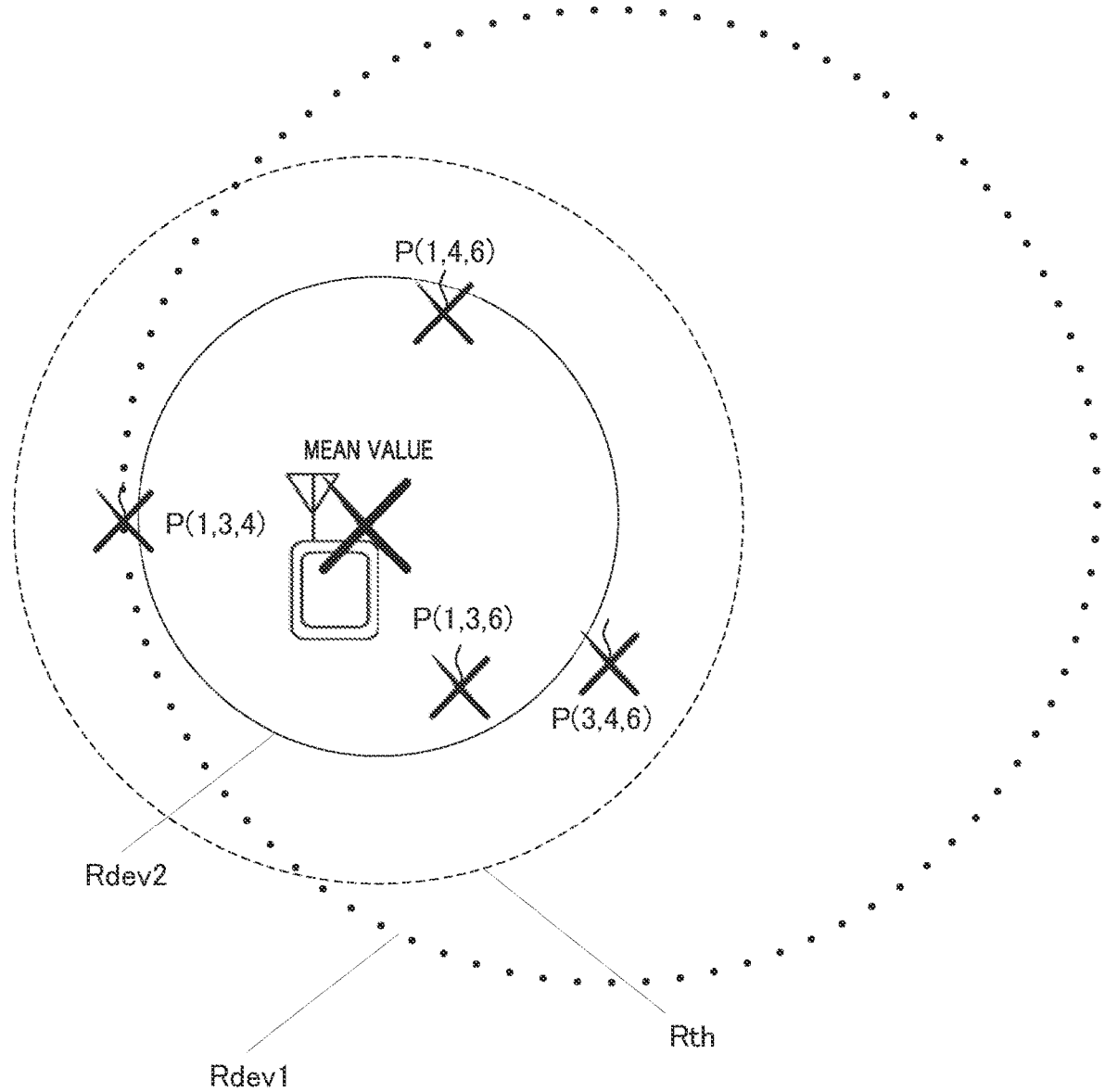
FIG. 45C illustrates still other exemplary position estimation result candidates in the reference station selection according to Embodiment 3.

FIG. 45C illustrates an example of the position estimation result candidates decreased from five to four in the reference station selection according to Embodiment 3.

In step S31205 in FIG. 44, anchor 330-7 that causes the increase in the variance value is removed from the reference stations. As a result of the removal, four position estimation result candidates P (1, 3, 4), P (1, 4, 6), P (1, 3, 6), and P (3, 4, 6) are left. As illustrated in FIG. 45C, variance value Rdev2 of the position estimation result candidates is smaller than predetermined threshold Rth. Thus, the position estimation result may be determined to be converged in step S31206 in FIG. 44, and anchors 330-1, 330-3, 330-4, and 330-6 are selected as the reference stations.

As described above, the combination of anchors 330 capable of improving the accuracy of the position estimation can be searched by using anchors 330 in descending order of priority for the position estimation for slave device 340 and switching anchors 330 so that the position estimation result is converged.

<Position Estimation Procedure: Slave Device Position Estimation Processing>

Figure 46:
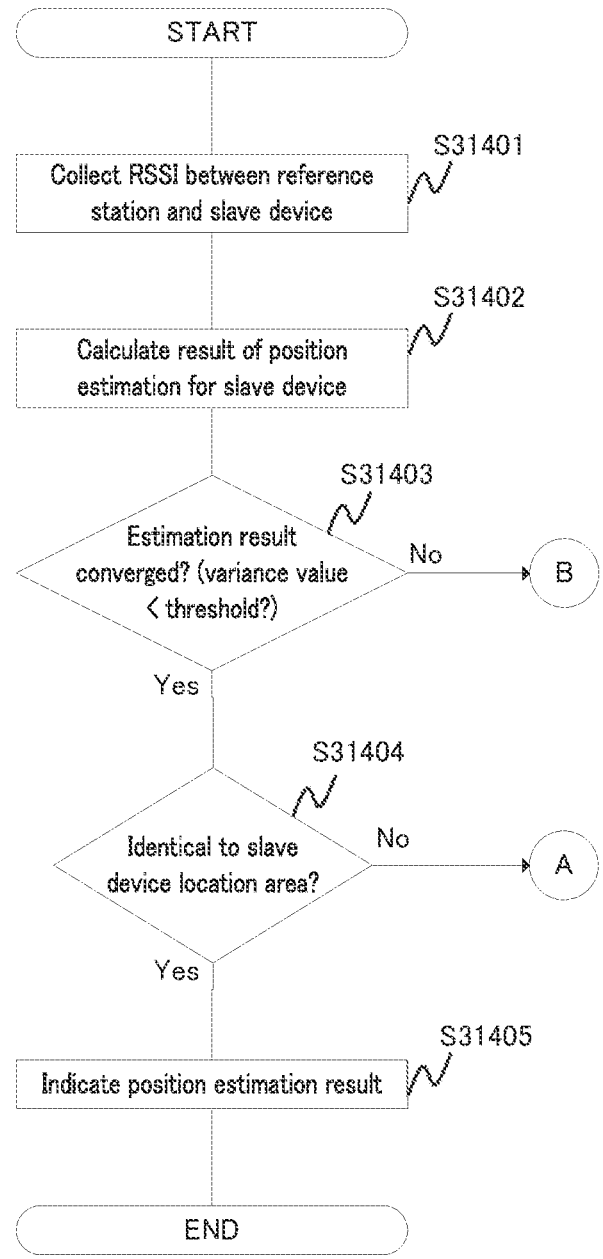
FIG. 46 is a flowchart describing exemplary processing in slave device position estimation according to Embodiment 3.

FIG. 46 is a flowchart describing exemplary processing in slave device position estimation (step S3604 in FIG. 36) according to Embodiment 3.

First in step S31401, slave device position estimator 3134 collects the RSSIs between slave device 340 and the reference stations selected in step S3603 in FIG. 36, generates RSSI table 3142 (see FIG. 32), and outputs the table to storage 314. For example, slave device estimator 3134 generates the request packets for transmitting RSSI history addressed to each reference station and slave device 340 in order to collect the RSSIs between slave device 340 and the reference stations selected in step S3603 in FIG. 36, and outputs the request packets to communicator 311.

Communicator 311 transmits the generated request packets for transmitting RSSI history to each reference station and slave device 340 via AP 320. Communicator 311 then receives the response packets for transmitting RSSI history from each reference station and slave device 340 via AP 320, and acquires the RSSI information based on the received response packets for transmitting RSSI history. Subsequently, slave device position estimator 3134 generates RSSI table 3142 based on the acquired RSSI information, and outputs the table to storage 314.

An example of RSSI table 3142 after performing step S31401 is represented in <Table 4>.

TABLE 4

Example of RSSI table 3142 after performing step S31401

|  |  | Receiving-side radio terminal ID | | | | |
| --- | --- | --- | --- | --- | --- | --- |
|  |  | #1 | #2 | #3 | #4 | ... #N |
| Transmitting-side radio terminal ID | #1 | — | −20 dBm | −19 dBm | −9 dBm | −5 dBm |
|  | #2 | −13 dBm | — | −10 dBm | −21 dBm | −18 dBm |
|  | #3 | −30 dBm | −19 dBm | — | −25 dBm | −26 dBm |
|  | #4 | −29 dBm | −13 dBm | −30 dBm | — | −24 dBm |
|  | . |  |  |  |  |  |
|  | #N | −19 dBm | −19 dBm | −19 dBm | −19 dBm | — |
|  | M | −19 dBm | −25 dBm | −20 dBm | −30 dBm |  |

In <Table 4>, the radio terminal IDs of the reference stations are represented as #1, #2, #3, and #4 for simplicity. As indicated in <Table 4>, RSSI values between the reference stations and slave device 340 are configured in RSSI table 3142 generated in step S31401.

Next, in step S31402, position estimation calculator 3135 calculates the result of the position estimation for slave device 340 based on RSSI table 3142 generated in step S31401. For example, position estimation calculator 3135 calculates the distance between each reference station and slave device 340 using RSSI-distance conversion table 3143 (see FIG. 39) for the location area of slave device 340 based on RSSI table 3142.

Next, position estimation calculator 3135 calculates a relative position of slave device 340 to each reference station based on the calculated distance and the principle of three-point positioning, for example. Position estimation calculator 3135 then calculates the position estimation result of the absolute position of slave device 340 based on the calculated relative position and the position information in anchor list 3141. Since at least four reference stations are selected in step S3603 in FIG. 36, position estimation calculator 3135 calculates four position estimation result candidates for slave device 340, and also calculates a mean value and a variance value of the position estimation result candidates.

Next, in step S31403, slave device position estimator 3134 determines whether the variance value of the position estimation result candidates is smaller than a predetermined threshold. By way of example, the predetermined threshold is a threshold closest to the position estimation accuracy preferred by a user among the thresholds outputted to threshold list 3145 in step S3706-4 in FIG. 41. As another example, the predetermined threshold is the variance value of the position estimation result candidates for slave device 340 calculated using four or more anchors 330 in step S31103 in FIG. 43.

When the variance value of the position estimation result candidates is not smaller than the predetermined threshold (No in step S31403), it may be determined that the position estimation result calculated in step S31402 is not converged. Slave device position estimator 3134 thus returns the processing to step S3603 in FIG. 36.

When the variance of the position estimation result candidates is smaller than the predetermined threshold (Yes in step S31403), slave device position estimator 3134 determines, in step S31404, whether the position estimation result for slave device 340 is the same as the location area of slave device 340 estimated in step S3602 in FIG. 36.

When the position estimation result for slave device 340 is not the same as the location area of slave device 340 estimated in step S3602 in FIG. 36 (No in step S31404), slave device position estimator 3134 returns the processing to step S3602 in FIG. 36. In this case, slave device area estimator 3132 may determine the selection order of the search area in step S3602 based on the position estimation result for slave device 340.

When the position estimation result for slave device 340 is the same as the location area of slave device 340 estimated in step S3602 in FIG. 36 (Yes in step S31404), the position estimation result for slave device 340 is indicated to slave device 340 via AP 320 in step S31405. For example, slave device position estimator 3134 outputs a position estimation result indication packet to communicator 311. The position estimation result indication packet includes, for example, the radio terminal ID of AP 320, which is a source of the radio communication, the terminal ID of slave device 340, which is a destination of the radio communication, a position estimation result indication command, and position information of indicated slave device 340. Slave device position estimator 3134 then terminates the slave device position estimation processing.

As described above, the accuracy of the position estimation for slave device 340 can be improved by repeatedly performing the position estimation, and the area estimation and reference station selection as needed, based on the convergence status of position estimation result.

According to Embodiment 3, anchors 330 that can be expected to perform the position estimation with high accuracy are put in order of priority for each area "i" in advance, according to RSSI-distance conversion characteristics between anchor 330-$i$ and other anchors 330-$j$ ($j \neq i$). Then, the position estimation for slave device 340 is performed by using anchors 330 in descending order of priority until the position estimation result is converged, thereby improving the accuracy of the position estimation.

Variations of Embodiment 3

In Embodiment 3 described above, the RSSIs with at least three anchors 330-$j$ ($i \neq j$) are used for the position estimation for anchor 330-$i$ or slave device 340. Alternatively, it is conceivable to use the RSSIs with two anchors 330-$j$ ($i \neq j$) for the position estimation for anchor 330-$i$ or slave device 340, as a variation.

In Embodiment 3 described above, the principle of three-point positioning is used for the position estimation for anchor 330-$i$ or slave device 340. It is conceivable, however, to use another principle for position estimation instead of the principle of three-point positioning, as a variation.

In Embodiment 3 described above, the variance value is used as a value indicating the variation of the position estimation result candidates. Alternatively, a standard deviation may be used as the value indicating the variation of the position estimation result candidates.

Summary of Embodiment 3

A position estimation apparatus according to the present disclosure includes: selection circuitry, which, in operation, selects, based on first information indicating a reception status of a radio wave between a plurality of radio communication apparatuses and second information indicating installation positions of the plurality of radio communication apparatuses, a first radio communication apparatus group that includes radio communication apparatuses less than the plurality of radio communication apparatuses; and estimation circuitry, which, in operation, estimates a position of a radio terminal based on the second information and third information indicating a reception status of a radio wave between the radio terminal and at least one of the radio communication apparatuses included in the first radio communication apparatus group.

In the position estimation apparatus according to the present disclosure, the selection circuitry assigns priorities to the plurality of radio communication apparatuses based on the first information and the second information, and selects the first radio communication apparatus group based on the priorities.

In the position estimation apparatus according to the present disclosure, the selection circuitry calculates a theoretical value of the first information with respect to the installation positions based on the first information and the second information, and assigns the priorities to the plurality of radio communication apparatuses based on a deviation of the first information with respect to the theoretical value.

In the position estimation apparatus according to the present disclosure, one of the plurality of radio communication apparatuses is included in each area of the plurality of areas, and the priorities are assigned based on the first information between the one of the plurality of radio communication apparatuses that is included in each area and at least one of the plurality of radio communication apparatuses that is not included in each area.

In the position estimation apparatus according to the present disclosure, the selection circuitry selects, in each area of the plurality of areas, a second radio communication apparatus group that includes radio communication apparatuses less than the plurality of radio communication apparatuses based on the priorities assigned for each area, determines whether the radio terminal is included in one of the plurality of areas based on fourth information indicating the reception status between the radio terminal and at least one of the radio communication apparatuses included in the second radio communication apparatus group, and selects the first radio communication apparatus group based on the priorities assigned to the one of the plurality of areas determined to include the radio terminal.

In the position estimation apparatus according to the present disclosure, the selection circuitry selects a plurality of the first radio communication apparatus groups, and the estimation circuitry estimates a plurality of positions of the radio terminal each corresponding to one of the plurality of first radio communication apparatus groups, and estimates, when a variance value of the plurality of positions does not exceed a threshold, a position of the radio terminal based on the plurality of positions.

In the position estimation apparatus according to the present disclosure, the estimation circuitry estimates a plurality of positions for each of the plurality of radio communication apparatuses based on the first information and the second information, estimates a position of each of the plurality of radio communication apparatuses based on the plurality of positions, and configures a variance value of the plurality of positions as the threshold, the variance value having a deviation from the installation position closest to a predetermined accuracy.

In the position estimation apparatus according to the present disclosure, the estimation circuitry estimates a plurality of positions for each of the plurality of radio communication apparatuses based on the first information and the second information, estimates a position of each of the plurality of radio communication apparatuses based on the plurality of positions, calculates a deviation from the installation position, and configures a variance value of the plurality of positions as the threshold, the variance value having the deviation closest to a predetermined accuracy.

In the position estimation apparatus according to the present disclosure, the first information is a Received Signal Strength Indicator (RSSI).

In the position estimation apparatus according to the present disclosure, the first information is a measure indicating an arriving direction of the radio wave.

In the position estimation apparatus according to the present disclosure, the first information is a measure indicating an arriving time of the radio wave.

A position estimation system according to the present disclosure includes: the position estimation apparatus according to the present disclosure; a plurality of radio communication apparatuses; and an access point that relays communication between the position estimation apparatus and the plurality of radio communication apparatuses.

The present disclosure is useful for systems performing position estimation using radio communication.

In the description described above, " . . . er (or)" and "section" used for each component may be replaced with other terms such as " . . . circuit (circuitry)", " . . . device", " . . . unit" and " . . . module".

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a radio base station backhaul line a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosures of Japanese Patent Application No. 2019-044763, filed on Mar. 12, 2019, Japanese Patent Application No. 2019-056719, filed on Mar. 25, 2019, and Japanese Patent Application No. 2019-068607, filed on Mar. 29, 2019, including the specifications, drawings and abstracts, are incorporated herein by reference in their entirety.

INDUSTRIAL APPLICABILITY

The present disclosure is suitable for a position estimation system used indoors.

REFERENCE SIGNS LIST

10 Lighting control apparatus
11, 23 Wired communicator
12 Lighting controller
13 Area attribute manager
14 RSSI collection controller
15, 214, 313 Position estimator
100, 201, 300 Position estimation system
20, 320 Access point (AP)
21, 31, 41, 211, 221, 231, 241 Radio communicator
22 Radio resource manager
24 RSSI collector
25, 36, 44 Antenna
210 Control apparatus
212 Reception quality information measurement controller
213 Lighting fixture controller
215 Reliability determiner
220, 330 Anchor
222, 232 Reception quality information measurer
223, 233 Measurement result indicator
230 (230A to 230D) Lighting fixture
234, 332, 342 Communication controller
240 Mobile terminal
242 Controller
250 Lighting layout position
251 Distance from lighting layout position
252 Lighting fixture position estimate
253 Lighting layout area
260 Estimation area
30, 30a, 30b Lighting apparatus
33, 42 RSSI information response controller
32 Light
34 RSSI collection protocol substituter
310 Position estimation apparatus
311, 322 Communicator
312 User input
314, 333, 343 Storage
321, 331, 341 Radio
323, 334, 344 Antenna
340 Slave device
40, 40a, 40b, 40c Mobile terminal

The invention claimed is:

1. A position estimation system, comprising:
a first radio node, which, in operation, forms a radio area;
one or more second radio nodes, which, in operation, move within the radio area;
a plurality of third radio nodes installed in the radio area; and
a position estimation apparatus, which, in operation, estimates positions of the one or more second radio nodes based on information that is collected by the first radio node and indicates radio reception quality at the one or more second radio nodes and the plurality of third radio nodes, wherein,
the position estimation apparatus comprises:
determination circuitry, which, in operation, determines a division area where information including the radio reception quality at the one or more second radio nodes is collected by a substitute for the first radio node, based on information on a time resource capacity for radio communication with the one or more second radio nodes in each of a plurality of the division areas into which the radio area is divided, wherein the first radio node is an access point; and
transmission circuitry, which, in operation, transmits, to any of the plurality of third radio nodes installed in the determined division area, an indication for collecting the radio reception quality at the one or more second radio nodes located in the determined division area, wherein the transmission circuitry transmits the indication to the plurality of third radio nodes in accordance with a total transmission time of the access point.

2. The position estimation system according to claim 1, wherein,
the plurality of third radio nodes each have a communication area including at least one of the plurality of division areas, and a threshold is specified for each of the at least one of the plurality of division areas,
at least one of the plurality of third radio nodes is selected for each division area, and
the transmission circuitry transmits the indication to the at least one of the plurality of selected third radio nodes when the time resource capacity exceeds the threshold specified for each division area.

3. The position estimation system according to claim 1, wherein the time resource capacity is proportional to a number of the one or more second radio nodes located in each division area.

4. The position estimation system according to claim 1, wherein the time resource capacity is proportional to a sum of weightings applied to the one or more second radio nodes.

5. The position estimation system according to claim 1, wherein the plurality of third radio nodes are lighting apparatuses.

6. The position estimation system according to claim 1, wherein the information indicating the radio reception quality is a Received Signal Strength Indicator (RSSI).

7. A position estimation apparatus, comprising:
determination circuitry, which, in operation, determines a division area where information including radio reception quality at one or more second radio nodes that move within a radio area is collected by a substitute for a first radio node that forms the radio area, based on information on a time resource capacity for radio communication with the one or more second radio nodes in each of a plurality of the division areas into which the radio area is divided, wherein the first radio node is an access point;
transmission circuitry, which, in operation, transmits, to at least one of a plurality of third radio nodes installed in the determined division area among the plurality of third radio nodes installed in the radio area, an indication for collecting the radio reception quality at the one or more second radio nodes located in the determined division area, wherein the transmission circuitry transmits the indication to the plurality of third radio nodes in accordance with a total transmission time of the access point; and
estimation circuitry, which, in operation, estimates positions of the one or more second radio nodes using information indicating the radio reception quality at the one or more second radio nodes, the information being collected by the at least one of the plurality of third radio nodes that has received the indication.

8. A position estimation method, comprising:
determining a division area where information including radio reception quality at one or more second radio nodes that move within a radio area is collected by a substitute for a first radio node that forms the radio area, based on information on a time resource capacity for radio communication with the one or more second radio nodes in each of a plurality of the division areas into which the radio area is divided, wherein the first radio node is an access point;
transmitting, to at least one of a plurality of third radio nodes installed in the determined division area among the plurality of third radio nodes installed in the radio area, an indication for collecting the radio reception quality at the one or more second radio nodes located in the determined division area, wherein the indication is transmitted to the plurality of third radio nodes in accordance with a total transmission time of the access point; and
estimating positions of the one or more second radio nodes using information indicating the radio reception quality at the one or more second radio nodes, the information being collected by the at least one of the plurality of third radio nodes that has received the indication.

* * * * *